United States Patent
Ito et al.

(10) Patent No.: US 10,748,264 B2
(45) Date of Patent: Aug. 18, 2020

(54) IMAGE PROCESSING APPARATUS AND IMAGE PROCESSING METHOD

(71) Applicant: SONY CORPORATION, Tokyo (JP)

(72) Inventors: Katsuhisa Ito, Tokyo (JP); Makibi Nakamura, Tokyo (JP); Kengo Hayasaka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 275 days.

(21) Appl. No.: 15/751,063

(22) PCT Filed: Aug. 26, 2016

(86) PCT No.: PCT/JP2016/074916
§ 371 (c)(1),
(2) Date: Feb. 7, 2018

(87) PCT Pub. No.: WO2017/043331
PCT Pub. Date: Mar. 16, 2017

(65) Prior Publication Data
US 2018/0232868 A1    Aug. 16, 2018

(30) Foreign Application Priority Data
Sep. 9, 2015    (JP) .................... 2015-177594

(51) Int. Cl.
*G06K 9/34*      (2006.01)
*G06T 5/50*      (2006.01)
(Continued)

(52) U.S. Cl.
CPC ............ *G06T 5/50* (2013.01); *G06K 9/00805* (2013.01); *G06K 9/3241* (2013.01); *G06K 9/346* (2013.01);
(Continued)

(58) Field of Classification Search
CPC ........... G06T 5/50; G06T 7/557; G06T 5/005; G06T 7/5993; G06T 2207/20221;
(Continued)

(56) References Cited

U.S. PATENT DOCUMENTS 8,331,617 B2 * 12/2012 Lim .................... G06K 9/00664
                                                            382/103
9,445,071 B2 *  9/2016 Hwang ................ H04N 13/111
(Continued)

FOREIGN PATENT DOCUMENTS

JP      2010-041586 A    2/2010
JP      2012-186781 A    9/2012
(Continued)

OTHER PUBLICATIONS

Mihara et al., Creation of Refocused Picture from which Unnecessary Materials Are Removed, IPSJ SIG Technical Report vol. 2015-CVIM-195 No. 52, Jan. 22-23, 2015, pp. 293-296, 195th Meeting, Nara, Japan.

*Primary Examiner* — Phuoc Tran
(74) *Attorney, Agent, or Firm* — Paratus Law Group, PLLC

(57) ABSTRACT

The present technique relates to an image processing apparatus and an image processing method capable of obtaining an obstacle-removed image in which an obstacle does not appear using disparity information. A removal section generates after-removal photographic images at a plurality of viewpoints by removing part of subjects from respective photographic images at the plurality of viewpoints using disparity information associated with the photographic images at the plurality of viewpoints. An image generation section generates an obstacle-removed image at a predetermined viewpoint by registering the after-removal photographic images at the plurality of viewpoints using the disparity information. The present technique is applicable to (Continued)

a case, for example, of generating an obstacle-removed image in which an obstacle does not appear using photographic images at a plurality of viewpoints.

18 Claims, 26 Drawing Sheets

(51) Int. Cl.
| | |
|---|---|
| *G06T 5/00* | (2006.01) |
| *H04N 5/222* | (2006.01) |
| *H04N 13/271* | (2018.01) |
| *H04N 5/225* | (2006.01) |
| *G06T 7/557* | (2017.01) |
| *H04N 13/254* | (2018.01) |
| *H04N 13/128* | (2018.01) |
| *H04N 13/122* | (2018.01) |
| *G06T 7/593* | (2017.01) |
| *H04N 13/106* | (2018.01) |
| *G06K 9/00* | (2006.01) |
| *G06K 9/32* | (2006.01) |
| *H04N 5/232* | (2006.01) |

(52) U.S. Cl.
CPC ............... *G06T 5/005* (2013.01); *G06T 7/557* (2017.01); *G06T 7/593* (2017.01); *H04N 5/2226* (2013.01); *H04N 5/2258* (2013.01); *H04N 5/23229* (2013.01); *H04N 13/106* (2018.05); *H04N 13/122* (2018.05); *H04N 13/128* (2018.05); *H04N 13/254* (2018.05); *H04N 13/271* (2018.05); *G06T 2207/10024* (2013.01); *G06T 2207/10052* (2013.01); *G06T 2207/20221* (2013.01); *G06T 2207/30252* (2013.01); *H04N 5/23206* (2013.01)

(58) Field of Classification Search
CPC . G06T 2207/10052; G06T 2207/10024; G06T 2207/30252; H04N 13/122; H04N 13/128; H04N 13/254; H04N 5/2258; H04N 13/271; H04N 5/2226; H04N 5/23229; H04N 13/106; H04N 5/23206; G06K 9/346; G06K 9/3241; G06K 9/00805
See application file for complete search history.

(56) References Cited

U.S. PATENT DOCUMENTS

| | | | |
|---|---|---|---|
| 2002/0061131 A1* | 5/2002 | Sawhney | G06T 15/205 382/154 |
| 2010/0166074 A1* | 7/2010 | Ho | H04N 19/597 375/240.16 |

FOREIGN PATENT DOCUMENTS

| | | |
|---|---|---|
| JP | 2014-010783 A | 1/2014 |
| WO | WO 2014/034444 A1 | 3/2014 |
| WO | WO 2014/064875 A1 | 5/2014 |
| WO | WO 2015/037211 A1 | 3/2015 |

\* cited by examiner

IMAGE PROCESSING APPARATUS AND IMAGE PROCESSING METHOD

CROSS REFERENCE TO PRIOR APPLICATION

This application is a National Stage Patent Application of PCT International Patent Application No. PCT/JP2016/074916 (filed on Aug. 26, 2016) under 35 U.S.C. § 371, which claims priority to Japanese Patent Application No. 2015-177594 (filed on Sep. 9, 2015), which are all hereby incorporated by reference in their entirety.

TECHNICAL FIELD

The present technique relates to an image processing apparatus and an image processing method, and particularly relates to an image processing apparatus and an image processing method capable of obtaining an obstacle-removed image in which an obstacle does not appear using, for example, disparity information.

BACKGROUND ART

There have been proposed a technique for detecting disparity information associated with a disparity using, for example, images at a plurality of viewpoints and a technique for synthesizing objects using disparity information (refer to, for example, PTL 1, PTL 2, and PTL 3).

CITATION LIST

Patent Literature

[PTL 1]
PCT Patent Publication No. WO2014/034444
[PTL 2]
PCT Patent Publication No. WO2014/064875
[PTL 3]
PCT Patent Publication No. WO2015/037211

SUMMARY

Technical Problem

Meanwhile, part of subjects often appear in a photographic image photographed by a camera as an obstacle to a desired subject desired by a user, depending on composition, situations, and the like. There is a demand to propose a technique for obtaining an obstacle-removed image in which such an obstacle does not appear.

Furthermore, there has not been proposed yet a technique for obtaining an obstacle-removed image using disparity information.

The present technique has been achieved in the light of these situations and an object of the present technique is to make it possible to obtain an obstacle-removed image using disparity information.

Solution to Problem

An image processing apparatus according to the present technique is an image processing apparatus including: a removal section that generates after-removal photographic images at a plurality of viewpoints by removing part of subjects from respective photographic images at the plurality of viewpoints using disparity information associated with the photographic images at the plurality of viewpoints; and an image generation section that generates an obstacle-removed image at a predetermined viewpoint by registering the after-removal photographic images at the plurality of viewpoints generated by the removal section using the disparity information.

An image processing method according to the present technique is an image processing method including: generating after-removal photographic images at a plurality of viewpoints by removing part of subjects from respective photographic images at the plurality of viewpoints using disparity information associated with the photographic images at the plurality of viewpoints; and generating an obstacle-removed image at a predetermined viewpoint by registering the after-removal photographic images at the plurality of viewpoints using the disparity information.

According to the present technique, after-removal photographic images at a plurality of viewpoints are generated by removing part of subjects from respective photographic images at the plurality of viewpoints using disparity information associated with the photographic images at the plurality of viewpoints, and an obstacle-removed image at a predetermined viewpoint is generated by registering the after-removal photographic images at the plurality of viewpoints using the disparity information.

It is to be noted that the image processing apparatus may be an independent apparatus or may be an internal block that constitutes one apparatus.

Furthermore, the image processing apparatus can be realized by causing a computer to execute a program. The program for causing the computer to function as the image processing apparatus can be provided by being transmitted via a transmission medium or by being recorded in a recording medium.

Advantageous Effect of Invention

According to the present technique, it is possible to obtain an obstacle-removed image.

It is to be noted that effects are not always limited to those described herein but may be any of effects described in the present disclosure.

DESCRIPTION OF EMBODIMENT

<Embodiment of Image Processing System to which Present Technique is Applied>

Figure 1:
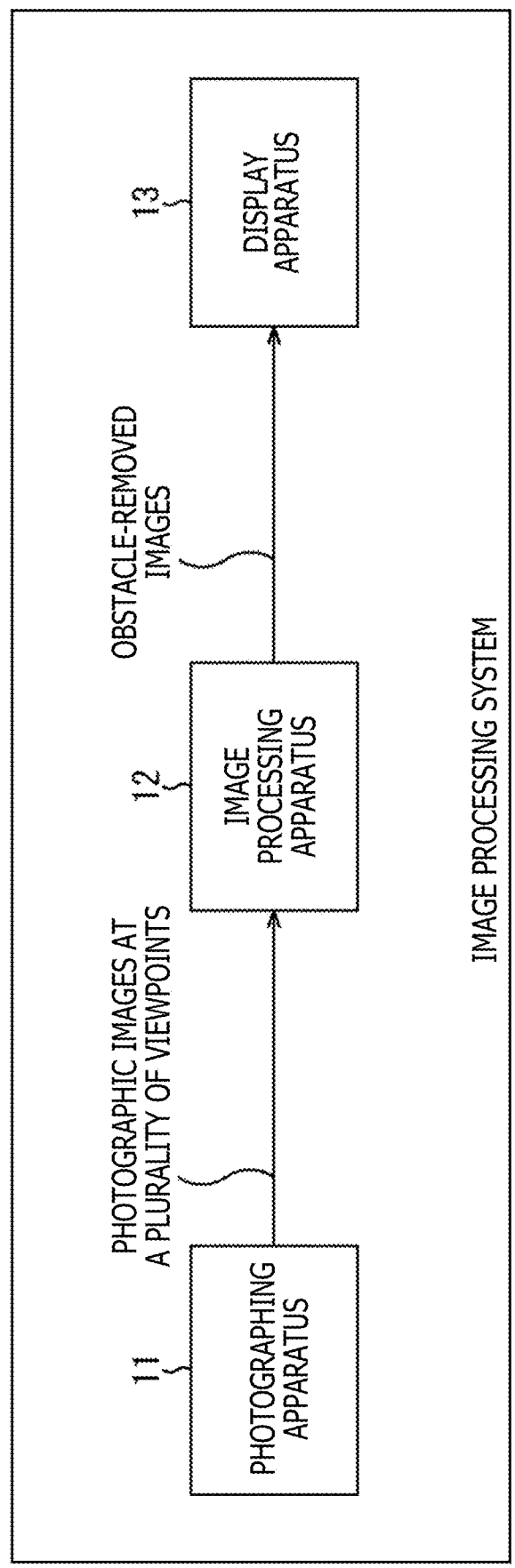
FIG. 1 is a block diagram depicting an example of a configuration of one embodiment of an image processing system to which the present technique is applied.

FIG. 1 is a block diagram depicting an example of a configuration of one embodiment of an image processing system to which the present technique is applied.

In FIG. 1, the image processing system includes a photographing apparatus 11, an image processing apparatus 12, and a display apparatus 13.

The photographing apparatus 11 photographs a subject from a plurality of viewpoints and supplies resultant photographic images at the plurality of viewpoints to the image processing apparatus 12.

The image processing apparatus 12 performs image processing using the photographic images at the plurality of viewpoints supplied from the photographing apparatus 11. The image processing apparatus 12 thereby generates an obstacle-removed image, in which part of a subject acting as an obstacle appearing in the photographic images does not appear, at a predetermined viewpoint, and supplies the obstacle-removed image to the display apparatus 13.

The display apparatus 13 displays the obstacle-removed image supplied from the image processing apparatus 12. The display apparatus 13 also displays a predetermined GUI (Graphical User Interface) and the like.

Here, the display apparatus 13 can be configured with a touch panel or the like. In this case, the display apparatus 13 can accept user's operation (input) in addition to displaying the obstacle-removed image and the like.

It is to be noted that, in FIG. 1, the photographing apparatus 11, the image processing apparatus 12, and the display apparatus 13 that constitute the image processing system can be all implemented in an independent apparatus such as a portable terminal, for example, a digital (still/video) camera or a smartphone.

Alternatively, the photographing apparatus 11, the image processing apparatus 12, and the display apparatus 13 can be individually implemented in independent apparatuses, separately.

In another alternative, arbitrary two apparatuses out of the photographing apparatus 11, the image processing apparatus 12, and the display apparatus 13 and the remaining one apparatus can be individually implemented in independent apparatuses, separately.

For example, the photographing apparatus 11 and the display apparatus 13 can be implemented in a portable terminal owned by a user, while the image processing apparatus 12 can be implemented in a cloud server.

In yet another alternative, part of blocks of the image processing apparatus 12 can be implemented in a cloud server, while remaining blocks of the image processing apparatus 12, the photographing apparatus 11, and the display apparatus 13 can be implemented in a portable terminal.

<Example of Configuration of Photographing Apparatus 11>

Figure 2:
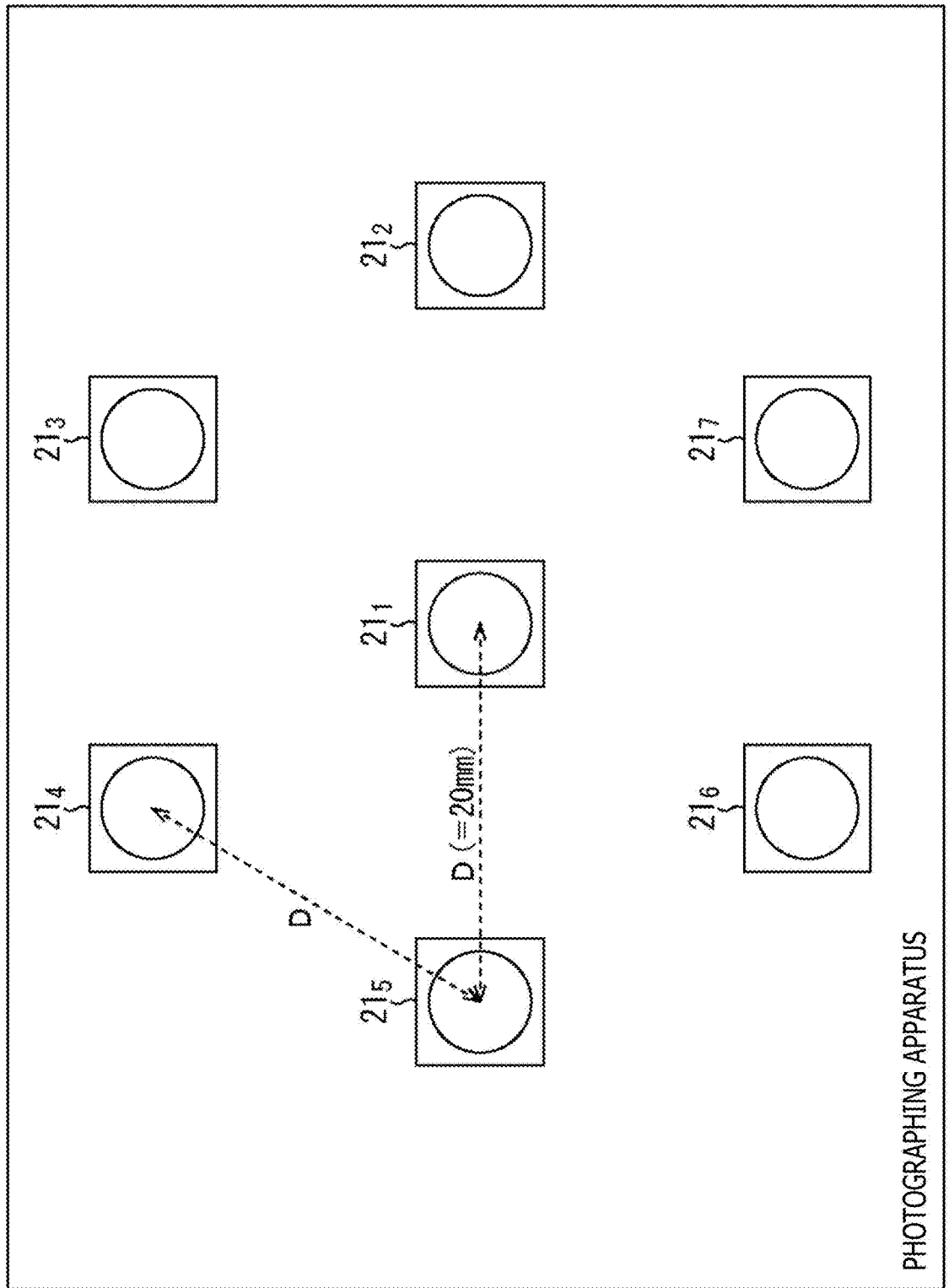
FIG. 2 is a plan view depicting an example of a configuration of a photographing apparatus 11.

FIG. 2 is a plan view depicting an example of a configuration of the photographing apparatus 11.

The photographing apparatus 11 includes a plurality of camera units $21_i$, and the plurality of camera units $21_i$ photograph photographic images at a plurality of viewpoints.

In FIG. 2, the photographing apparatus 11 includes a plurality of, for example, seven camera units $21_1$, $21_2$, $21_3$, $21_4$, $21_5$, $21_6$, and $21_7$. Those seven camera units $21_1$ to $21_7$ are disposed on a two-dimensional plane.

Furthermore, in FIG. 2, the seven camera units $21_1$ to $21_7$ are disposed such that one of the camera units $21_1$ to $21_7$, for example, the camera unit $21_1$ is set as a center and the six other camera units $21_2$ to $21_7$ configure a regular hexagon around the camera unit $21_1$.

Therefore, in FIG. 2, a distance between (optical axes of) an arbitrary camera unit $21_i$ (i=1, 2, ..., 7) out of the seven camera units $21_1$ to $21_7$ and another camera unit $21_j$ (j=1, 2, ..., 7) closest to the camera unit $21_i$ is the same distance D.

As the distance D between the camera units $21_i$ and $21_j$, approximately 20 mm, for example, can be adopted. In this case, the photographing apparatus 11 can be configured at a magnitude generally equal to a card size of an IC card or the like.

It is to be noted that the number of camera units $21_i$ that constitute the photographing apparatus 11 is not limited to seven. As the number, a number equal to or greater than two and equal to or smaller than six or a number equal to or greater than eight can be adopted.

Moreover, the plurality of camera units $21_i$ in the photographing apparatus 11 can not only be disposed to configure a regular polygon such as the regular hexagon described above but also be disposed at arbitrary positions.

Furthermore, the plurality of camera units $21_i$ can be disposed not on the two-dimensional plane but in such a manner as to differ in position in a depth direction.

Here, the camera unit $21_1$ disposed at the center out of the camera units $21_1$ to $21_7$ will be hereinafter also referred to as "reference camera unit $21_1$," and the camera units $21_2$ to $21_7$ disposed around the reference camera unit $21_1$ will be hereinafter also referred to as "peripheral camera units $21_2$ to $21_7$."

Figure 3:
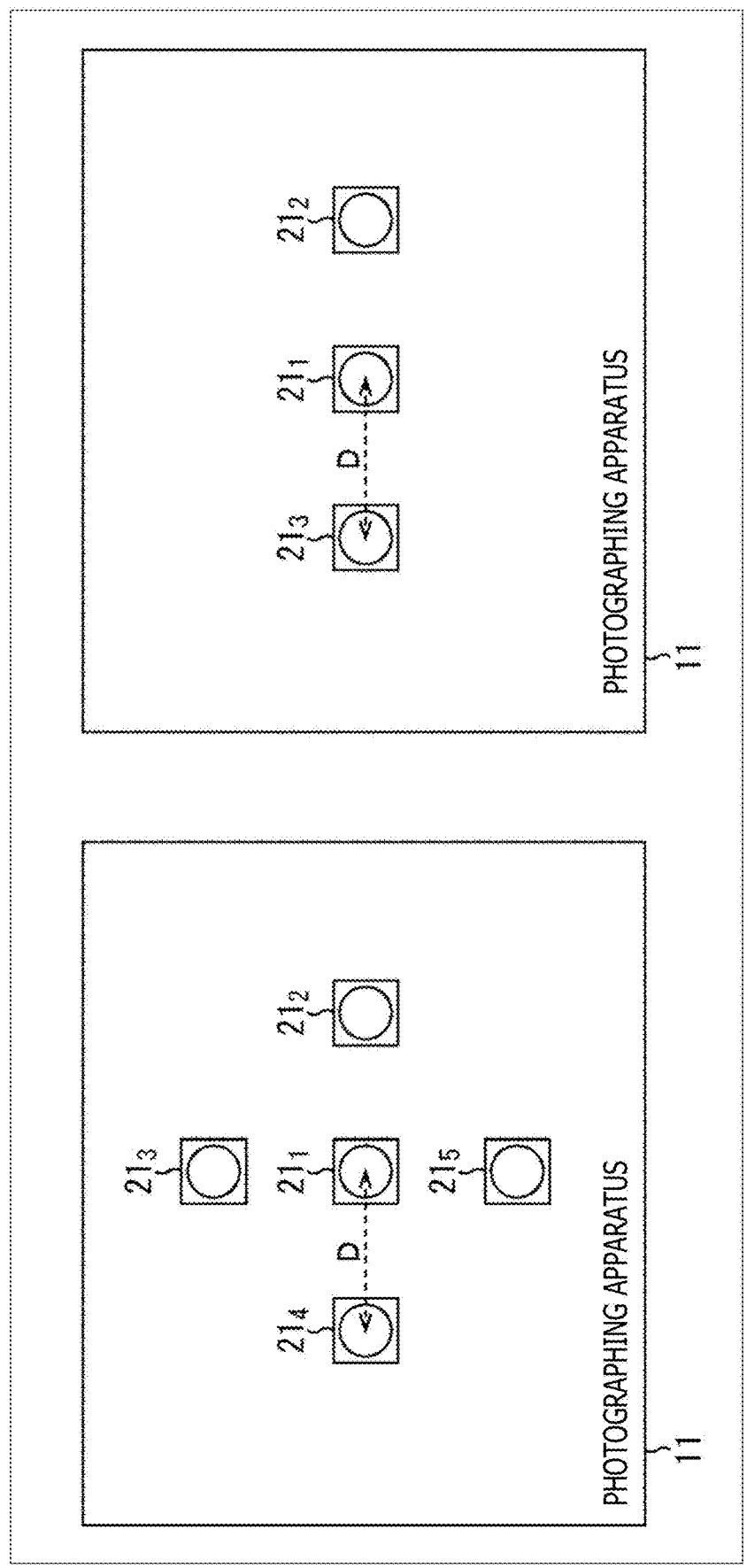
FIG. 3 is a plan view depicting another example of the configuration of the photographing apparatus 11.

FIG. 3 is a plan view depicting another example of the configuration of the photographing apparatus 11.

As depicted in FIG. 3, the photographing apparatus 11 can be configured by disposing a plurality of, for example, five camera units $21_1$ to $21_5$ or three camera units $21_1$ to $21_3$ on a two-dimensional plane.

In a case where the photographing apparatus 11 is configured with the five camera units $21_1$ to $21_5$, the peripheral camera units $21_2$, $21_3$, $21_4$, and $21_5$ can be disposed, for example, about the reference camera unit $21_1$, i.e., rightward, upward, leftward, and downward of the reference camera unit $21_1$, individually.

The peripheral camera units $21_2$ to $21_5$ can be each disposed apart from the reference camera unit $21_1$ by the same distance D.

In a case where the photographing apparatus 11 is configured with the three camera units $21_1$ to $21_3$, the peripheral camera units $21_2$ and $21_3$ can be disposed, for example, about the reference camera unit $21_1$, i.e., rightward and leftward or upward and downward of the reference camera unit $21_1$, individually.

The peripheral camera units $21_2$ and $21_3$ can be each disposed apart from the reference camera unit $21_1$ by the same distance D.

Here, unless specified others, the photographing apparatus 11 is hereinafter assumed to be configured with, for example, the seven camera units $21_1$ to $21_7$ as depicted in FIG. 2.

<Example of Configuration of Image Processing Apparatus 12>

Figure 4:
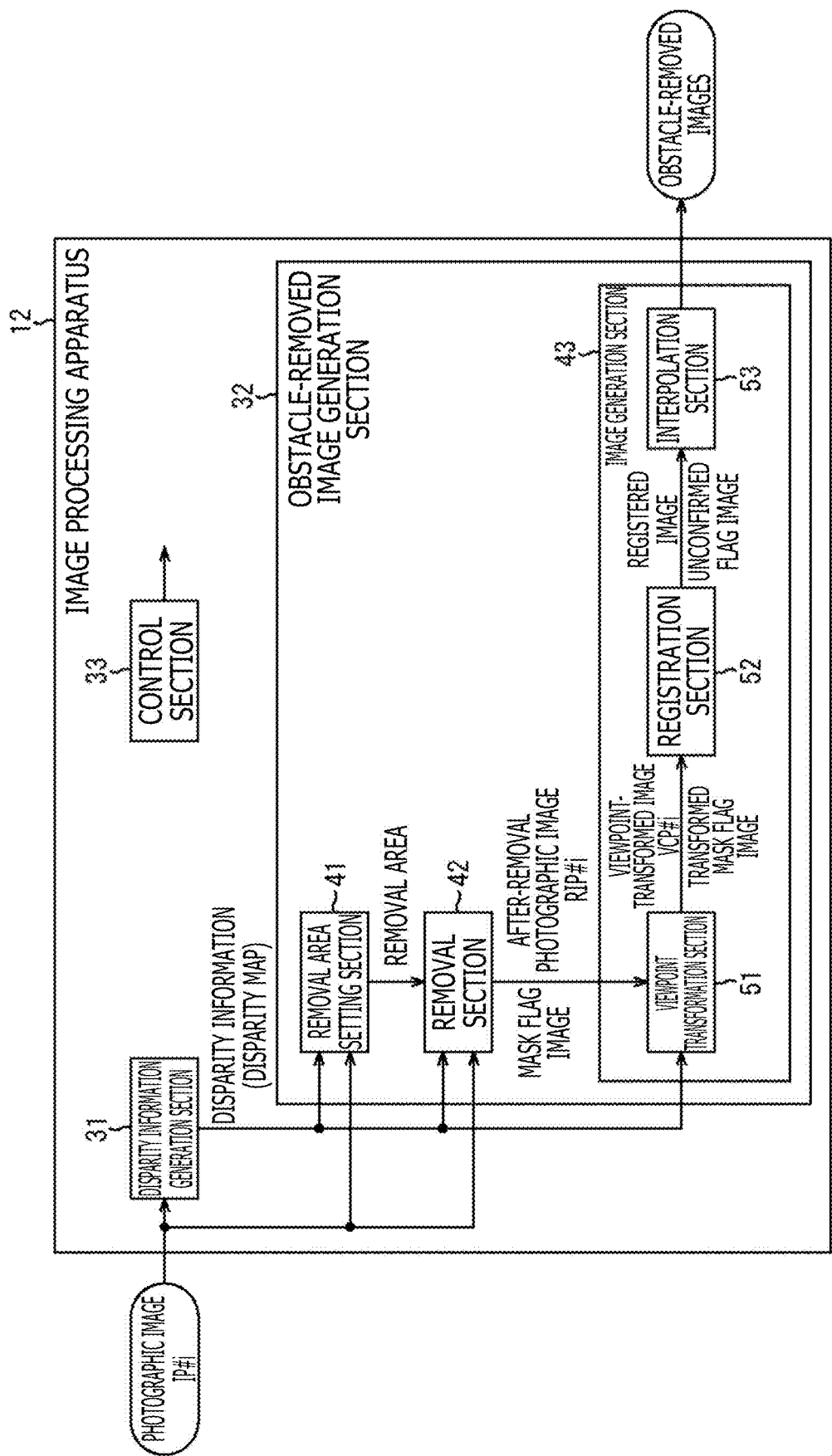
FIG. 4 is a block diagram depicting an example of a configuration of an image processing apparatus 12.

FIG. 4 is a block diagram depicting an example of a configuration of the image processing apparatus 12 depicted in FIG. 1.

In FIG. 4, the image processing apparatus 12 includes a disparity information generation section 31, an obstacle-removed image generation section 32, and a control section 33.

Photographic images IP1 to IP7 at seven viewpoints photographed by the camera units $21_1$ to $21_7$ are supplied from the photographing apparatus 11 to the image processing apparatus 12.

In the image processing apparatus 12, the photographic images IP#i (where #i=1, 2, . . . 7) are supplied to the disparity information generation section 31 and the obstacle-removed image generation section 32.

The disparity information generation section 31 generates (determines) disparity information associated with each photographic image IP#i supplied from the photographing apparatus 11 using the photographic image IP#i, and supplies the disparity information to the obstacle-removed image generation section 32.

In other words, the disparity information generation section 31 determines the disparity information between each photographic image IP#i and another photographic image IP#j for each photographic image IP#i supplied from the photographing apparatus 11, generates a disparity map in which the disparity information is entered, and supplies the disparity map to the obstacle-removed image generation section 32.

Here, as the disparity information, it is possible to adopt a distance (depth) corresponding to the disparity in addition to a disparity itself. In the present embodiment, the disparity, for example, is assumed to be adopted as the disparity information from between the disparity and the distance. In this case, a disparity of each pixel in each photographic image IP#i is entered in the disparity map of the photographic image IP#i to correspond to (coordinates of) the pixel.

Furthermore, the disparity information generation section 31 can generate the disparity map not only from the photographic image IP#i but also by measuring a distance to (depth of) each subject appearing in the photographic image IP#i using, for example, a distance sensor that measures the distance.

The obstacle-removed image generation section 32 generates an obstacle-removed image, in which part of subjects acting as an obstacle appearing in each photographic image IP#i supplied from the photographing apparatus 11 do not appear, at a predetermined viewpoint using the photographic image IP#i and the disparity information supplied from the disparity information generation section 31, and supplies the obstacle-removed image to the display apparatus 13 (FIG. 1).

In other words, part of the subjects often appear as an obstacle to a desired subject desired by a user in each photographic image IP#i photographed by the photographing apparatus 11, depending on, for example, composition or situations on the spot.

The obstacle-removed image generation section 32 generates the obstacle-removed image in which the obstacle does not appear (image as if photographing is made in a state in which the obstacle is not present) from each photographic image IP#i in which the obstacle appears.

The obstacle image generation section 32 includes a removal area setting section 41, a removal section 42, and an image generation section 43.

The photographic images IP#i are supplied to the removal area setting section 41 from the photographing apparatus 11, and the disparity maps are supplied thereto from the disparity information generation section 31.

The removal area setting section 41 sets a removal area using each photographic image IP#i from the photographing apparatus 11, each disparity map from the disparity information generation section 31, and the like as needed, and supplies (information representing) the removal area to the removal section 42.

The removal area means herein an area in which an obstacle is present in a real space in which each photographic image IP#i is photographed.

The removal area is supplied to the removal section 42 from the removal area setting section 41. In addition, each photographic image IP#i is supplied to the removal section 42 from the photographing apparatus 11, and each disparity map is supplied thereto from the disparity information generation section 31.

The removal section 42 removes the obstacle, which is present in the removal area and appears in each photographic image IP#i supplied from the photographing apparatus 11, from the photographic image IP#i using each disparity map supplied from the disparity information generation section 31 and the removal area supplied from the removal area setting section 41. The removal section 42 thereby generates an after-removal photographic image RIP#i from which the obstacle is removed.

Here, the after-removal photographic image RIP#i is an image such that, for example, pixels in which the obstacle appears in each photographic image IP#i have no pixel values (an image such that the pixel values of the pixels in which the obstacle appears are "0" in the present embodiment for the sake of convenience).

The removal section 42 removes, as the pixels in which the obstacle appears, pixels in each photographic image IP#i corresponding to real space points belonging to the removal area supplied from the removal area setting section 41 among real space points in the real space in which the photographic image IP#i is photographed. In other words, the removal section 42 sets the pixel values of the pixels in which the obstacle appears to, for example, "0" in this embodiment, thereby generating the after-removal photographic image RIP#i.

The removal section 42 generates the after-removal photographic image RIP#i and also generates a mask flag image for each after-removal photographic image RIP#i, and supplies the after-removal photographic image RIP#i and the mask flag image to the image generation section 43.

The mask flag image for the after-removal photographic image RIP#i means herein an image that represents whether or not each pixel in the after-removal photographic image RIP#i has a pixel value. Each pixel in the mask flag image has a pixel value of, for example, a 1-bit mask flag that represents whether or not a pixel at the same position as that of the pixel in the after-removal photographic image RIP#i has a pixel value. Therefore, the mask flag image can be restated as an image that represents pixels in which the obstacle appears (or pixels in which the obstacle does not appear) in each photographic image IP#i.

Moreover, the image in which the pixel values of the pixels in which the obstacle appears are set to "0" among the pixels in each photographic image IP#i is adopted herein as the after-removal photographic image RIP#i. Alternatively, as the after-removal photographic image RIP#i, the photographic image IP#i itself can be adopted.

The removal section 42 generates the mask flag image that represents the pixels in which the obstacle appears, for the after-removal photographic image RIP#i. Owing to this, even if the photographic image IP#i itself is adopted as the after-removal photographic image RIP#i, referring to the mask flag image makes it possible to handle the pixels in which the obstacle appears in the after-removal photographic image RIP#i that is the photographic image IP#i itself as the pixels having no pixel values, that is, handle the after-removal photographic image RIP#i that is the photographic image IP#i itself as an image from which the obstacle is removed.

The after-removal photographic images RIP#i and the mask flag images are supplied to the image generation section 43 from the removal section 42. In addition, the disparity maps are supplied thereto from the disparity information generation section 31.

The image generation section 43 generates an obstacle-removed image at a predetermined viewpoint (viewed from the predetermined viewpoint) using the disparity maps from the disparity information generation section 31 and the after-removal photographic images RIP#i and the mask flag images from the removal section 42, and supplies the obstacle-removed image to the display apparatus 13 (FIG. 1).

In other words, the image generation section 43 generates the obstacle-removed image at the predetermined viewpoint by registering the after-removal photographic images RIP#i using the disparity maps.

The image generation section 43 includes a viewpoint transformation section 51, a registration section 52, and an interpolation section 53.

The viewpoint transformation section 51 transforms each after-removal photographic image RIP#i and each mask flag image supplied from the removal section 42 into a viewpoint-transformed image VCP#i and a transformed mask flag image, respectively by geometric transformation (image registration) using each disparity map supplied from the disparity information generation section 31, and supplies the viewpoint-transformed image VCP#i and the transformed mask flag image to the registration section 52.

The registration section 52 registers the viewpoint-transformed images VCP#i supplied from the viewpoint transformation section 51 using the transformed mask flag images also supplied from the viewpoint transformation section 51, thereby generating the registered image at the predetermined viewpoint (viewed from the predetermined viewpoint).

Furthermore, the registration section 52 generates an unconfirmed flag image that represents whether each pixel in the registered image is a missing pixel that is a pixel-value missing pixel, and supplies the registered image and the unconfirmed flag image to the interpolation section 53.

Here, a pixel value of each pixel in the unconfirmed flag image is a 1-bit unconfirmed flag representing, for example, whether a pixel at the same position in the registered image as that of the pixel in the unconfirmed flag image is a missing pixel.

The interpolation section 53 recognizes a missing pixel in the registered image supplied from the registration section 52 using the unconfirmed flag image also supplied from the registration section 52. Then, the interpolation section 53 interpolates the missing pixel in the registered image using pixel values of pixels located near the missing pixel, thereby generates the obstacle-removed image at the predetermined viewpoint, and supplies the obstacle-removed image to the display apparatus 13 (FIG. 1).

The control section 33 exercises control over the entire image processing apparatus 12. Furthermore, the control section 33 exercises display control over the display apparatus 13 in such a manner that a predetermined GUI (Graphical User Interface) and the like are displayed on the display apparatus 13. Moreover, the control section 33 performs various processes in response to user's operation on the touch panel or the like serving as the display apparatus 13.

<Example of Photographic Image IP#i>

Figure 5:
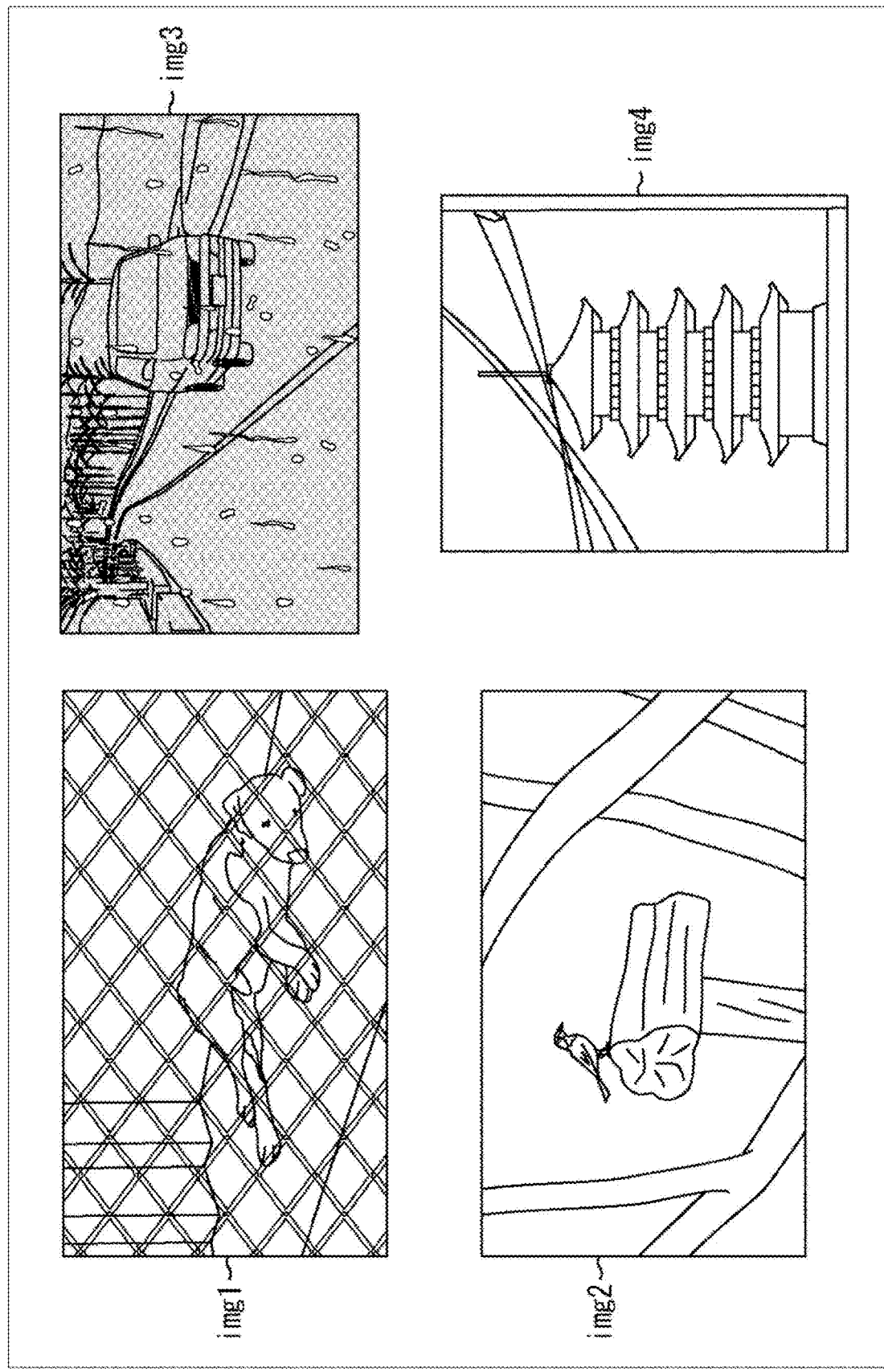
FIG. 5 depicts examples of photographic images IP#i photographed by the photographing apparatus 11.

FIG. 5 depicts examples of the photographic images IP#i photographed by the photographing apparatus 11.

In other words, FIG. 5 depicts images img1, img2, img3, and img4 as the examples of the photographic images IP#i.

In the image img1, an animal appears over a wire net.

As for the image img1, a desired subject desired by the user is the animal and the wire net appearing forward of the animal is an obstacle to the desired subject.

In the image img2, a bird appears over tree branches.

As for the image img2, a desired subject is the bird and the tree branches appearing forward of the bird are an obstacle to the desired subject.

In the image img3, a street scene appears over a glass onto which raindrops are attached.

As for the image img3, a desired subject is the street scene and the raindrops appearing forward of the street scene are an obstacle to the desired subject.

In the image img4, a tower appears over electric wires.

As for the image img4, a desired subject is the tower and the electric wires appearing forward of the tower are an obstacle to the desired subject.

In the image processing apparatus 12 (FIG. 4), the obstacle-removed image in which the obstacle, for example, the wire net, the tree branches, the raindrops, or the electric wires do not appear is generated from the photographic images IP#i such as the images img1 to img4.

<Principle of Generating Obstacle-Removed Image>

Figure 6:
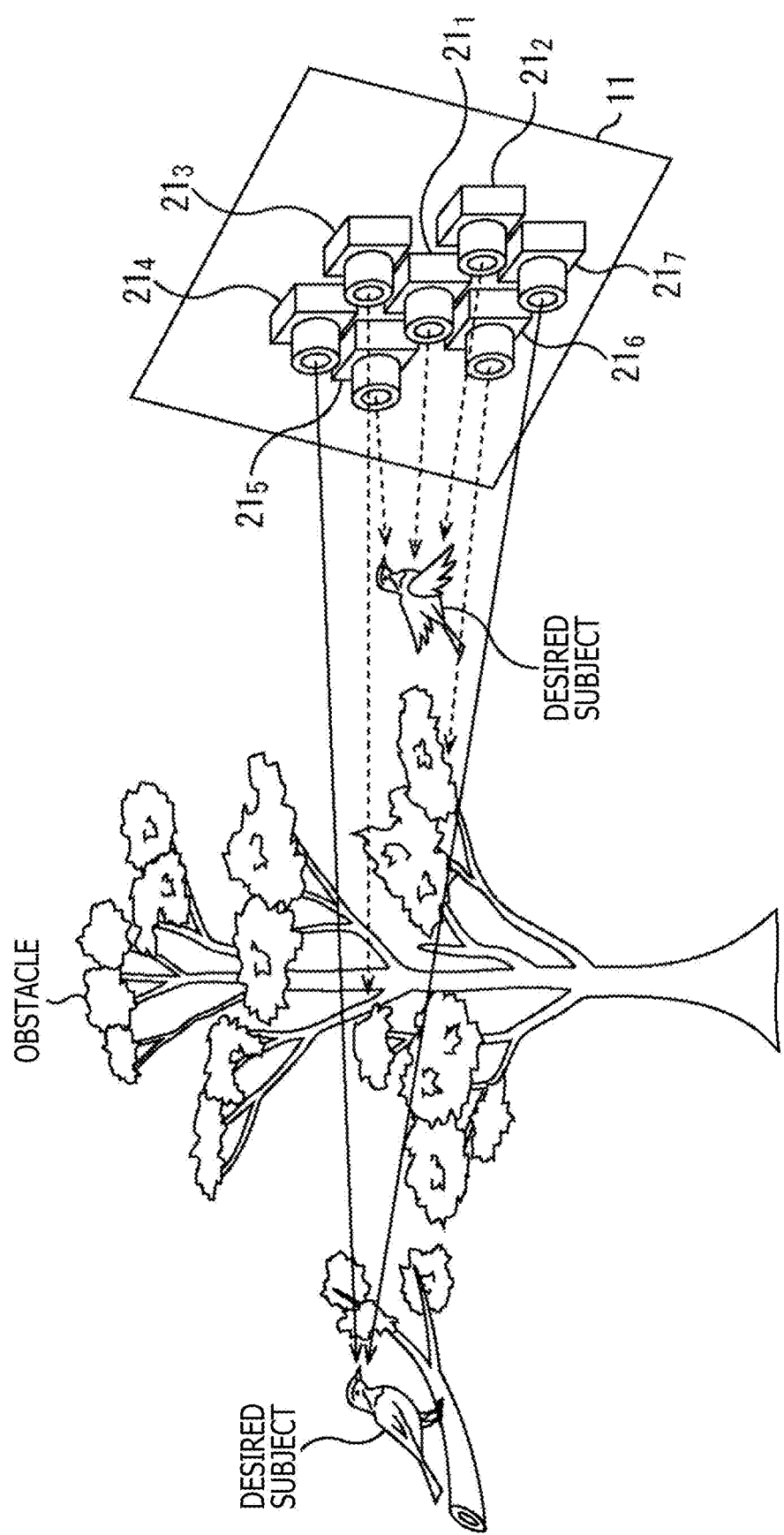
FIG. 6 is an explanatory diagram of a principle of generating an obstacle-removed image by the image processing apparatus 12.

FIG. 6 is an explanatory diagram of a principle of generating the obstacle-removed image by the image processing apparatus 12.

In the photographing apparatus 11, the plurality of, for example, seven camera units $21_1$ to $21_7$ photograph photographic images IP1 to IP7, respectively.

In generation of the obstacle-removed image, the obstacle-removed image in which the obstacle does not appear is generated by collecting pixel values of pixels other than pixels in which the obstacle appears from the photographic images IP1 to IP7 photographed by the seven camera units $21_1$ to $21_7$, respectively, that is, the photographic images IP1 to IP7 at seven viewpoints.

It is desired herein to photograph photographic images IP#i at three or more viewpoints by the photographing apparatus 11 in a case where the disparity map (disparity information) is generated from each photographic image IP#i.

In other words, if the obstacle is present forward of the desired subject, and an invisible portion of the desired subject hidden by the obstacle in a certain photographic image IP#i does not appear in photographic images at a plurality of viewpoints that are at least two or more different viewpoints, it is impossible to determine the disparity information, and occlusion occurs.

To suppress occurrence of the occlusion in a case where the disparity information is determined (generated) from each photographic image IP#i, it is necessary for the invisible portion of the desired subject that is hidden by the obstacle and that is present in the certain photographic image to appear in the photographic images at least at two or more different viewpoints. Therefore, it is necessary for the photographing apparatus 11 to photograph at least the photographic image in which the invisible portion of the desired subject hidden by the obstacle is present and the photographic images at the two viewpoints in which the portion appears, i.e., to photograph at least the photographic images at the three viewpoints.

It is to be noted that if the disparity information associated with the invisible portion of the desired subject hidden by the obstacle in the certain photographic image IP#i is obtained by some sort of method, the photographing apparatus 11 may photograph the photographic images IP#i at least at two viewpoints.

Figure 7:
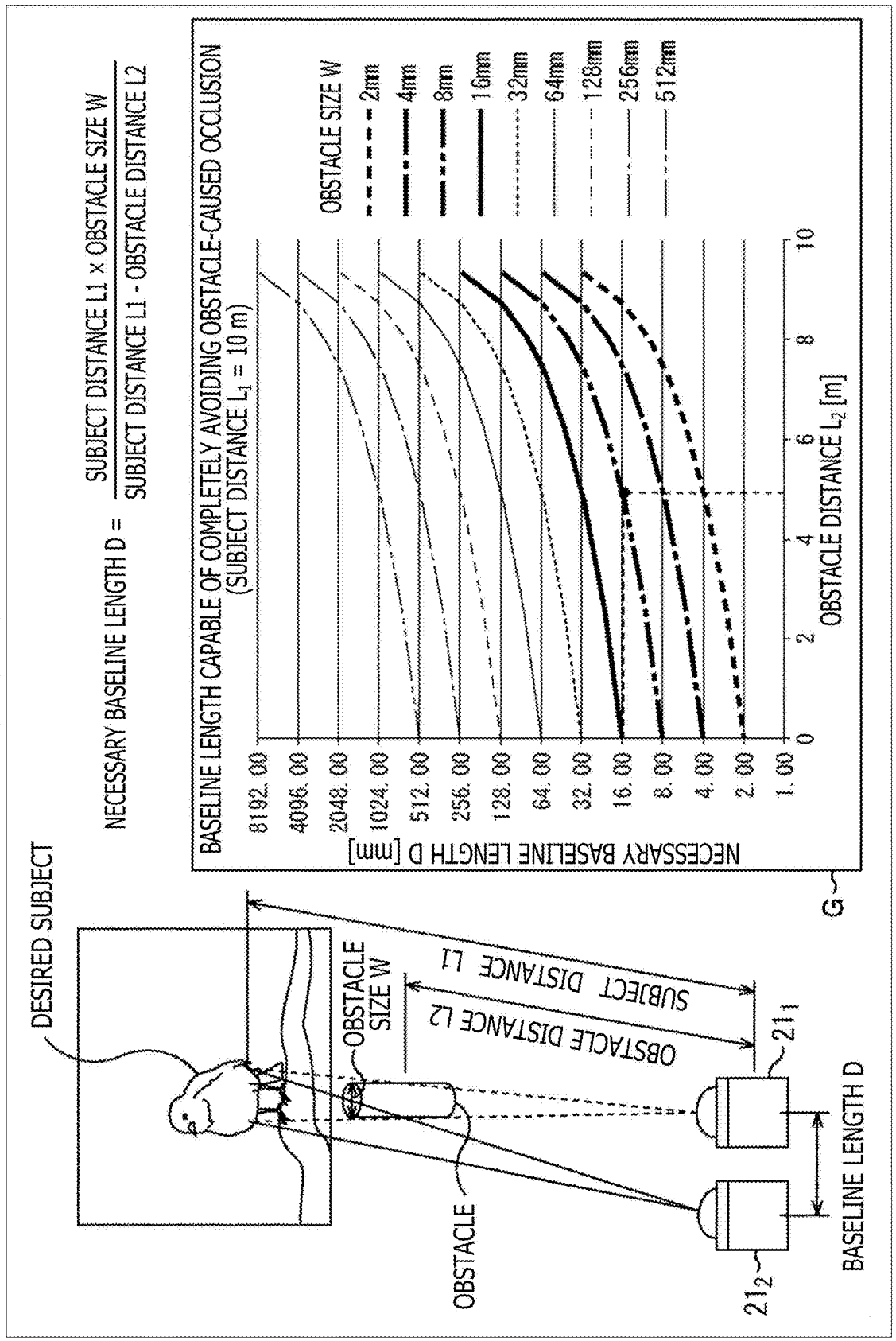
FIG. 7 is an explanatory diagram of conditions for generating the obstacle-removed image.

FIG. 7 is an explanatory diagram of conditions for generating the obstacle-removed image.

In the generation of the obstacle-removed image, an image in which the obstacle appearing in the photographic images does not appear (image as if photographing is performed in a state in which the obstacle is not present) is generated as the obstacle-removed image.

It is necessary for the invisible portion of the desired subject hidden by the obstacle (hereinafter, also referred to as "hidden portion of the desired subject") in the photographic images to appear in the obstacle-removed image. For this purpose, it is necessary for the invisible portion of the desired subject that is hidden by the obstacle and that is present in the photographic image IP#i at a certain viewpoint to appear in a photographic image IP#i' at any of the other viewpoints.

Conditions for generating the obstacle-removed image in which the hidden portion of the desired subject appears are determined by a position relationship among the camera unit $21_i$, the obstacle, and the desired subject, a size of the obstacle, and a baseline length that is a distance between optical axes of the camera units $21_i$ and $21_{i'}$ as different viewpoints.

For brevity of explanation, it is now assumed that the photographing apparatus 11 includes the two camera units $21_1$ and $21_2$, and the two camera units $21_1$ and $21_2$ are disposed side by side in a horizontal direction.

It is also assumed that the baseline length between the two camera units $21_1$ and $21_2$, that is, the distance between the optical axes of the camera units $21_1$ and $21_2$ is represented by D.

Furthermore, as depicted in FIG. 7, it is assumed that the obstacle is present forward of the desired subject in the real space, and a distance from the photographing apparatus 11 to the desired subject and a distance from the photographing apparatus 11 to the obstacle are represented by L1 and L2, respectively.

Moreover, it is assumed that a horizontal width of the obstacle is represented by W.

In this case, a minimum baseline length D for generating the obstacle-removed image in which (entirety of) the hidden portion of the desired subject is visible is represented by Equation $D=(L1\times W)/(L1-L2)$.

A graph G of FIG. 7 represents a relationship between the distance L2 to the obstacle and the minimum baseline length D represented by Equation $D=(L1\times W)/(L1-L2)$ and necessary for the hidden portion to appear in the obstacle-removed image.

For example, in a case where the distance L1 to the desired subject and the distance L2 to the obstacle are 10 m and 5 m, respectively, and the size (width) of the obstacle is 8 mm, the minimum baseline length D is 16 mm.

In this case, therefore, disposing the camera units $21_1$ and $21_2$ to be apart from each other by 16 mm or more in the horizontal direction makes it possible to generate the obstacle-removed image in which the entirety of the hidden portion of the desired subject is visible using the photographic images IP1 and IP2 photographed by the camera units $21_1$ and $21_2$.

Figure 8:
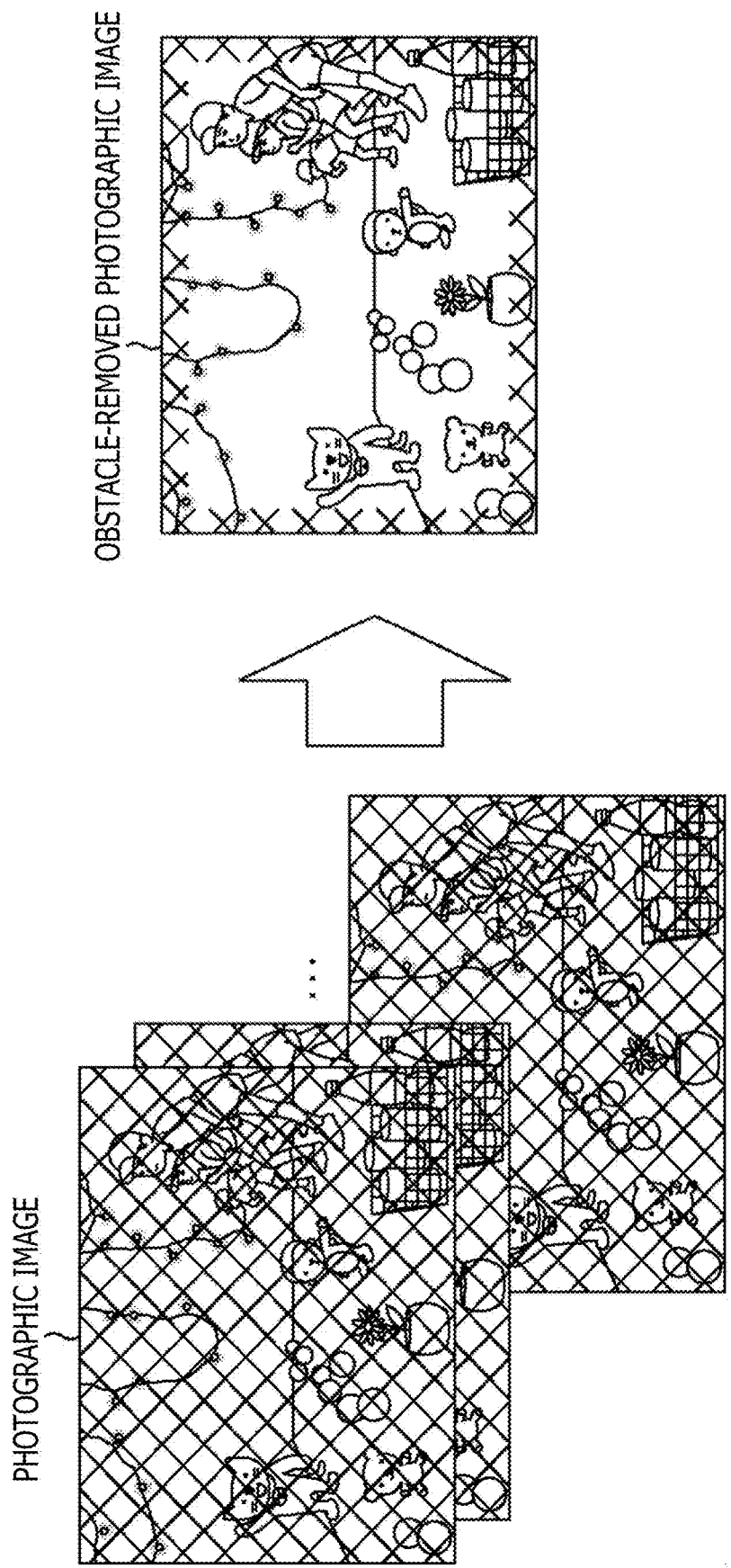
FIG. 8 depicts a state of generating the obstacle-removed image using photographic images at a plurality of viewpoints by an obstacle-removed image generation section 32.

FIG. 8 depicts a state of generating the obstacle-removed image using photographic images at a plurality of viewpoints by the obstacle-removed image generation section 32.

As depicted in FIG. 8, the obstacle-removed image generation section 32 generates the obstacle-removed image at a predetermined viewpoint from photographic images at a plurality of viewpoints.

In FIG. 8, the wire net appears as the obstacle forward of the desired subject (group) in the photographic images. The wire net appearing in the photographic images does not, however, appear in the obstacle-removed image and the invisible and hidden portion hidden by the wire net in the photographic images appears in the obstacle-removed image.

It is to be noted that while the wire net remains on surroundings in the obstacle-removed image in FIG. 8, this is because there is no photographic image in which the invisible and hidden portion hidden by the surrounding wire net appears.

When the obstacle-removed image of FIG. 8 is displayed on the display apparatus 13 (FIG. 1), trimming is performed to cut off surrounding portions of the obstacle-removed image in which the wire net appears and the obstacle-removed image after the trimming can be then displayed.

<Processing by Image Processing System>

Figure 9:
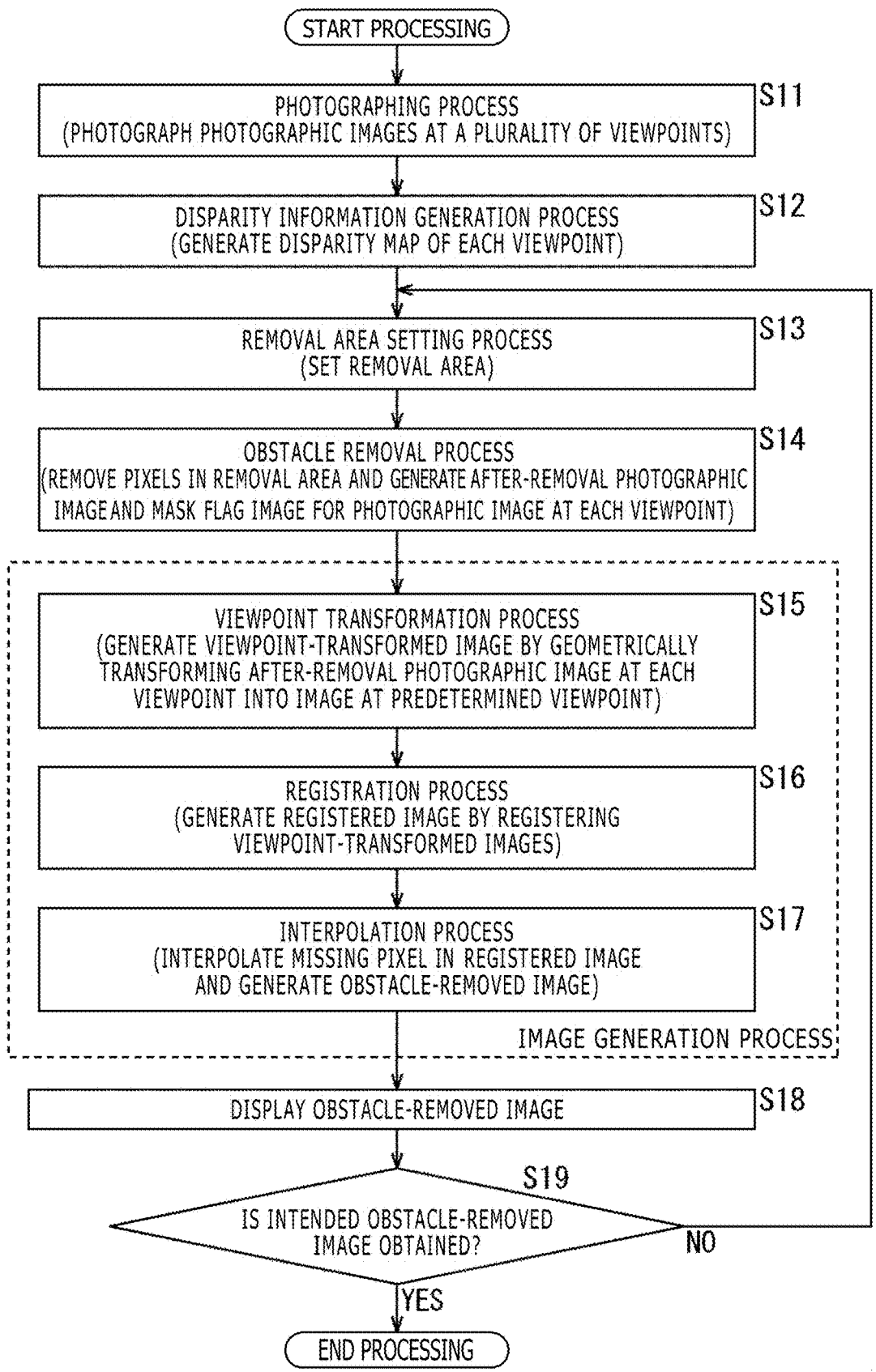
FIG. 9 is a flowchart for explaining an example of processing by the image processing system.

FIG. 9 is a flowchart for explaining an example of processing by the image processing system depicted in FIG. 1.

In Step S11, the photographing apparatus 11 performs a photographing process. In the photographing process, the camera units $21_1$ to $21_7$ photograph photographic images at a plurality of viewpoints, for example, photographic images IP1 to IP7 at seven viewpoints.

The photographing apparatus 11 supplies the photographic images IP#i obtained as a result of the photographing process to the image processing apparatus 12; processing goes from Step S11 to Step S12.

In Step S12, the disparity information generation section 31 of the image processing apparatus 12 (FIG. 4) performs a disparity information generation process.

In the disparity information generation process, the disparity information generation section 31 generates the disparity information associated with each photographic image IP#i supplied from the photographing apparatus 11 using the photographic image IP#i for each viewpoint vp#i of the photographic image IP#i, and generates the disparity map in which the disparity information is entered.

The disparity information at a certain viewpoint vp#i can be determined using a principle of triangulation by performing stereo matching, multi-baseline stereo, or the like between the photographic image IP#i at the viewpoint vp#i and a photographic image IP#i' at another viewpoint vp#i'.

The disparity information generation section 31 supplies the disparity map of each viewpoint vp#i to the obstacle-removed image generation section 32; the processing goes from Step S12 to Step S13.

In Step S13, the removal area setting section 41 of the obstacle-removed image generation section 32 performs a removal area setting process.

In the removal area setting process, the removal area setting section 41 sets the removal area representing an area in the real space in which the obstacle appearing in each photographic image IP#i supplied from the photographing apparatus 11 to the image processing apparatus 12 is present, using the photographic image IP#i, each disparity map supplied from the disparity information generation section 31 to the obstacle-removed image generation section 32, and the like as needed.

The removal area setting section 41 supplies the removal area to the removal section 42; the processing goes from Step S13 to Step S14.

In Step S14, the removal section 42 performs an obstacle removal process.

In the obstacle removal process, the removal section 42 generates the after-removal photographic image RIP#i by removing the obstacle in the removal area that appears in each photographic image IP#i supplied from the photographing apparatus 11 to the image processing apparatus 12 from the photographic image IP#i, using each disparity map supplied from the disparity information generation section 31 to the obstacle-removed image generation section 32 and the removal area supplied from the removal area setting section 41. Furthermore, in the obstacle removal process, the removal section 42 generates each mask flag image representing the pixels, in which the obstacle appears in the removal area, in the photographic image IP#i to correspond to the after-removal photographic image RIP#i.

The removal section 42 supplies each after-removal photographic image RIP#i and each mask flag image to the image generation section 43; the processing goes to Step S15.

In Step S15 to S17, the image generation section 43 performs an image generation process for generating the obstacle-removed image at the predetermined viewpoint using each disparity map supplied from the disparity information generation section 31 to the obstacle-removed image generation section 32 and each after-removal photographic image RIP#i and each mask flag image supplied from the removal section 42.

In other words, in Step S15, the viewpoint transformation section 51 of the image generation section 43 performs a viewpoint transformation process.

In the viewpoint transformation process, the viewpoint transformation section 51 geometrically transforms each after-removal photographic image RIP#i and each mask flag image supplied from the removal section 42 into the viewpoint-transformed image VCP#i viewed from the predetermined viewpoint and the transformed mask flag image, respectively, using the disparity map of each viewpoint vp#i supplied from the disparity information generation section 31.

The viewpoint transformation section 51 supplies the viewpoint-transformed image VCP#i and the transformed mask flag image for each viewpoint vp#i to the registration section 52; the processing goes from Step S15 to Step S16.

In Step S16, the registration section 52 performs a registration process.

In the registration process, the registration section 52 generates the registered image at the predetermined viewpoint by registering the viewpoint-transformed image VCP#i for each viewpoint vp#i supplied from the viewpoint transformation section 51 using the transformed mask flag image for each viewpoint vp#i supplied from the viewpoint transformation section 51 (transformed mask flag image corresponding to the viewpoint-transformed image VCP#i for each viewpoint vp#i).

Furthermore, in the registration process, the registration section 52 generates the unconfirmed flag image that represents whether or not each pixel in the registered image is a missing pixel that is a pixel-value missing pixel, using, for example, the transformed mask flag image for each viewpoint vp#i.

The registration section 52 supplies the registered image and the unconfirmed flag image to the interpolation section 53; the processing goes from Step S16 to Step S17.

In Step S17, the interpolation section 53 performs an interpolation process.

In the interpolation process, the interpolation section 53 recognizes the missing pixel in the registered image supplied from the registration section 52 using the unconfirmed flag image supplied from the registration section 52, and generates the obstacle-removed image at the predetermined viewpoint by interpolating the missing pixel.

The interpolation section 53 supplies the obstacle-removed image to the display apparatus 13 (FIG. 1); the processing goes from Step S17 to Step S18.

In Step S18, the display apparatus 13 displays the obstacle-removed image supplied from the interpolation section 53; the processing goes to Step S19.

In Step S19, the control section 33 (FIG. 4) determines whether nor not the user intended obstacle-removed image is obtained.

In the case where it is determined in Step S19 that the user intended obstacle-removed image is not obtained, that is, in the case where the user carries out operation for generating the obstacle-removed image over again, the processing returns to Step S13 and similar processing is repeated subsequently.

Furthermore, in the case where it is determined in Step S19 that the user intended obstacle-removed image is obtained, that is, in the case where the user carries out operation for confirming the obstacle-removed image displayed in Step S18 just before Step S19, the processing is ended.

<Generation of Disparity Maps>

Figure 10:
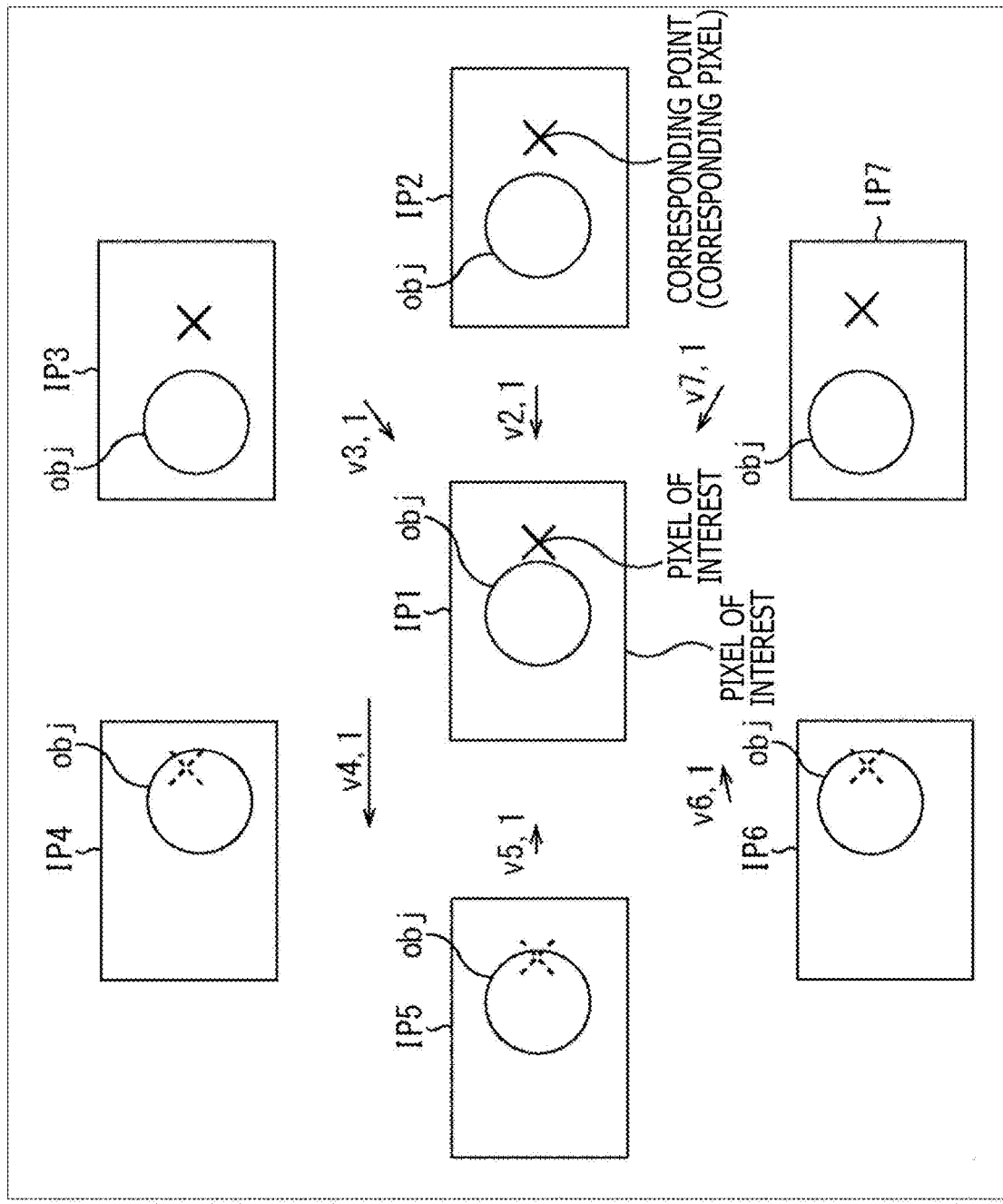
FIG. 10 is an explanatory diagram of an example of generating disparity maps by a disparity information generation section 31.

FIG. 10 is an explanatory diagram of an example of generating disparity maps by the disparity information generation section 31 depicted in FIG. 4.

In other words, FIG. 10 depicts an example of the photographic images IP1 to IP7 photographed by the camera units $21_1$ to $21_7$ of the photographing apparatus 11.

In FIG. 10, a predetermined object obj appears as a foreground forward of a predetermined background in the photographic images IP1 to IP7. The photographic images IP1 to IP7 have different viewpoints. Owing to this, positions of the object obj (positions thereof on the photographic images) appearing in the photographic images IP2 to IP7 deviate from a position of the object obj appearing in the photographic image IP1 each by as much as a difference in viewpoint.

For example, in the case where the disparity map of the viewpoint vp1 of the photographic image IP1 is generated, the disparity information generation section 31 assumes the photographic image IP1 as a notable image of interest IP1. Furthermore, the disparity information generation section 31 sequentially selects each pixel in the image of interest IP1 as a pixel of interest, and detects a corresponding pixel (corresponding point) corresponding to the pixel of interest from each of the other photographic images IP2 to IP7.

Examples of a method of detecting the corresponding pixel corresponding to the pixel of interest in the image of interest IP1 from each of the photographic images IP2 to IP7 include a method of using the principle of triangulation such as the stereo matching or multi-baseline stereo as described above.

Here, a vector representing a positional deviation between the pixel of interest in the image of interest IP1 and the corresponding pixel in the photographic image IP#i will be referred herein as "disparity vector v#i,1."

The disparity information generation section 31 determines disparity vectors v2,1 to v7,1 for the photographic images IP2 to IP7, respectively. In addition, the disparity information generation section 31 makes a decision by a majority vote on, for example, magnitudes of the disparity vectors v2,1 to v7,1, and determines the magnitude of a disparity vector v#i,1 decided by the majority vote as a disparity of (a position of) the pixel of interest.

Here, as described with reference to FIG. 2, in the case where the distance between the reference camera unit $21_1$ photographing the image of interest IP1 and each of the peripheral camera units $21_2$ to $21_7$ photographing the photographic images IP2 to IP7 is equally distance D and the real space point appearing in the pixel of interest in the image of interest IP1 also appears in the photographic images IP2 to IP7, the photographing apparatus 11 determines vectors different in direction but equal in magnitude as the disparity vectors v2,1 to v7,1.

In other words, in this case, the disparity vectors v2,1 to v7,1 are the vectors in directions of viewpoints vp2 to vp7 of the other photographic images IP2 to IP7 with respect to a viewpoint vp1 of the image of interest IP1, and equal in magnitude.

It is to be noted that, however, that the photographic images IP2 to IP7 possibly include an image to which occlusion occurs, that is, an image in which the real space point appearing in the pixel of interest in the image of interest IP1 is hidden by the foreground and does not appear.

It is difficult to detect a correct pixel as the corresponding pixel corresponding to the pixel of interest in the image of interest IP1 for the photographic image IP#i in which the real space point appearing in the pixel of interest does not appear (hereinafter, also referred to as "occlusion image").

Owing to this, for the occlusion image IP#i, the disparity information generation section 31 determines the disparity vector v#i,1 different in magnitude from a disparity vector v#j,1 of the photographic image IP#j in which the real space point appearing in the pixel of interest in the image of interest IP1 appears.

In the photographic images IP2 to IP7, the images to which occlusion occurs for the pixel of interest are estimated to be fewer than the images to which occlusion occurs. Therefore, the disparity information generation section 31 makes a decision by a majority vote on the magnitudes of the disparity vectors v2,1 to v7,1 as described above, and determines the magnitude of the disparity vector v#i,1 decided by the majority vote as the disparity of the pixel of interest.

In FIG. 10, among the disparity vectors v2,1 to v7,1, the three disparity vectors v2,1, v3,1, and v7,1 are equal in magnitude. In addition, a disparity vector equal in magnitude to each of the disparity vectors v4,1, v5,1, and v6,1 is not present.

Owing to this, the disparity information generation section 31 determines the magnitude of the three disparity vectors v2,1, v3,1, and v7,1 as the disparity of the pixel of interest.

It is to be noted that a direction of the disparity of the pixel of interest in the image of interest IP1 from the arbitrary photographic image IP#i can be recognized from a position relationship between the viewpoint vp1 of the image of interest IP1 (position of the camera unit $21_1$) and the viewpoint vp#i of the photographic image IP#i (position of the camera unit $21_i$).

The disparity information generation section 31 sequentially selects each pixel in the image of interest IP1 as the pixel of interest and determines the disparity of the pixel of interest. Then, the disparity information generation section 31 generates a map in which the disparity of each pixel in the image of interest IP1 is entered as the disparity map to correspond to the position (xy coordinates) of the pixel. Therefore, the disparity map is a map (table) in which the position of each pixel is associated with the disparity of the pixel.

The disparity information generation section 31 can generate the disparity map of the viewpoint vp#i of each of the other photographic images IP#i similarly to the disparity map of the viewpoint vp#1.

It is to be noted, however, that in generation of the disparity map of each of the viewpoints vp#i other than the viewpoint vp#1, the disparity information generation section 31 makes a decision by a majority vote on the disparity vectors by adjusting the magnitudes of the disparity vectors on the basis of a position relationship between the viewpoint vp#i of the photographic image IP#i and the viewpoint vp#j of each of the photographic images IP#j other than the photographic image IP#i (position relationship between the camera units $21_i$ and $21_j$).

In other words, as for the photographing apparatus 11 depicted in FIG. 2, in the case where the disparity information generation section 31 generates the disparity map with, for example, the photographic image IP5 assumed as the image of interest IP5, a disparity vector obtained between the image of interest IP5 and the photographic image IP2 is twice as large in magnitude as a disparity vector obtained between the image of interest IP5 and the photographic image IP1.

The reason is as follows. The baseline length that is the distance between the optical axes of the camera unit $21_5$ photographing the image of interest IP5 and the camera unit $21_1$ photographing the photographic image IP1 is the distance D, while the baseline length between the camera unit $21_5$ photographing the image of interest IP5 and the camera unit $21_2$ photographing the photographic image IP2 is a distance 2L.

In the light of the above, if the distance D that is the baseline length between the reference camera unit $21_1$ and the other camera unit $21_i$ is assumed as a reference baseline length, the disparity information generation section 31 makes a decision the majority vote on the disparity vectors by adjusting the magnitudes of the disparity vectors such that each baseline length can be converted into the reference baseline length D.

In other words, the baseline length D between, for example, the camera unit $21_5$ photographing the image of interest IP5 and the reference camera unit $21_1$ photographing the photographic image IP1 is equal to the reference baseline length D. Therefore, the disparity information generation section 31 adjusts the magnitude of the disparity vector obtained between the image of interest IP5 and the photographic image IP1 such that the magnitude is multiplied by one.

Furthermore, the baseline length 2D between, for example, the camera unit $21_5$ photographing the image of interest IP5 and the camera unit $21_2$ photographing the photographic image IP2 is equal to a twofold of the reference baseline length D. Therefore, the disparity information generation section 31 adjusts the magnitude of the disparity vector obtained between the image of interest IP5 and the photographic image IP2 such that the magnitude is multiplied by ½ (by a multiple of a value of a ratio of the reference baseline length D to the baseline length 2D between the camera units $21_5$ and $21_2$).

Similarly, the disparity information generation section 31 adjusts the magnitude of the disparity vector obtained between the image of interest IP5 and each of the other photographic images IP#i such that the magnitude is multiplied by the value of the ratio of the reference baseline length D to the baseline length between the camera units $21_5$ and $21_1$.

The disparity information generation section 31 makes a decision by a majority vote on the disparity vectors using the magnitude-adjusted disparity vectors.

It is to be noted that the disparity information generation section 31 can determine the disparity of (each pixel in) each photographic image IP#i by, for example, pixel accuracy of the photographic images photographed by the photographing apparatus 11. Alternatively, the disparity information generation section 31 can determine the disparity of (each pixel in) each photographic image IP#i by, for example, accuracy indicating a distance equal to or narrower than a distance between the pixels (for example, quarter pixel accuracy or the like) that is accuracy finer than the pixels of the photographic image IP#i.

In a case of determining the disparity by the accuracy equal to or finer than the pixel accuracy, the disparity by the accuracy equal to or finer than the pixel accuracy can be used as it is or can be used after omission, round-out, or round-off or the like of figures after the decimal point of the disparity by the accuracy equal to or finer than the pixel accuracy to express the disparity as an integer.

In generation of the obstacle-removed image, the accuracy of the disparities generated by the disparity information generation section 31 greatly influences accuracy of the removal of the obstacle appearing in the photographic images and that of reproduction of the invisible portion hidden by the obstacle in the photographic images.

It is, therefore, desirable to adopt a method that can obtain highly accurate disparities in the generation of the disparities by the disparity information generation section 31.

<Removal Area Setting Process>

Figure 11:
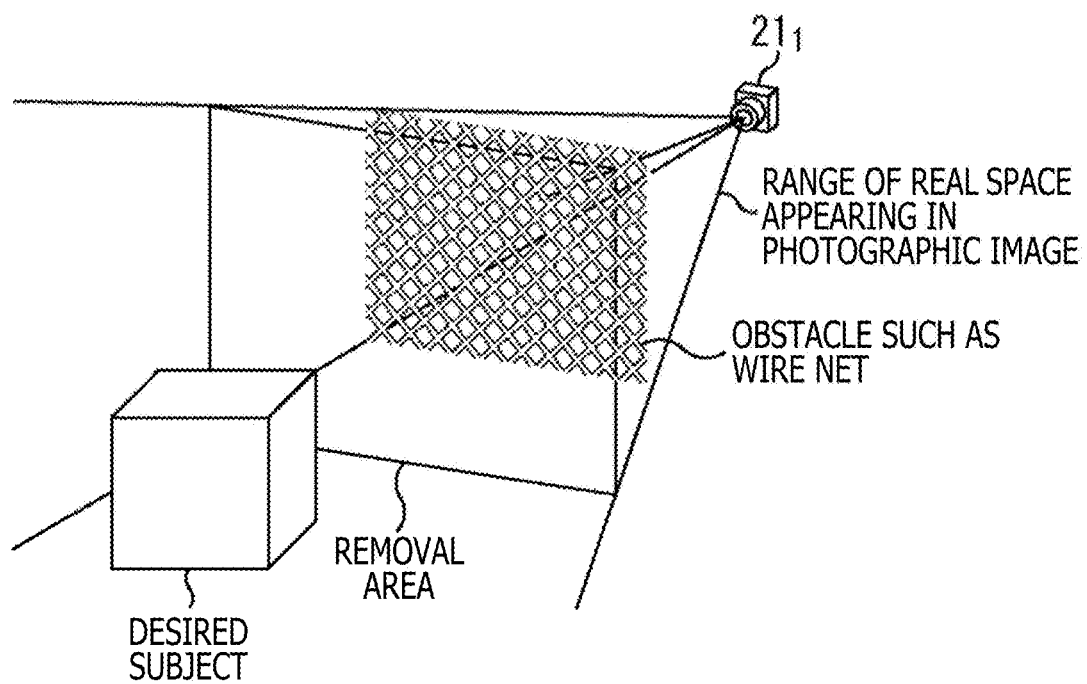
FIG. 11 is an explanatory diagram of an example of setting a removal area by a removal area setting section 41.

FIG. 11 is an explanatory diagram of an example of setting the removal area by the removal area setting section 41 depicted in FIG. 4.

For example, the wire net acting as the obstacle appearing in the image img1, the raindrops attached onto the glass and acting as the obstacle appearing in the image img3, or the like in FIG. 5 are distributed in a two-dimensional plane shape in a real space.

The removal area setting section 41 can set a predetermined two-dimensional plane in the real space to the removal area for removing the obstacle distributed in the two-dimensional plane shape in the real space as described above.

The removal area setting section 41 can set the removal area by moving the two-dimensional plane serving as the removal area in response to user's operation.

Alternatively, the removal area setting section 41 can automatically set the removal area.

Figure 12:
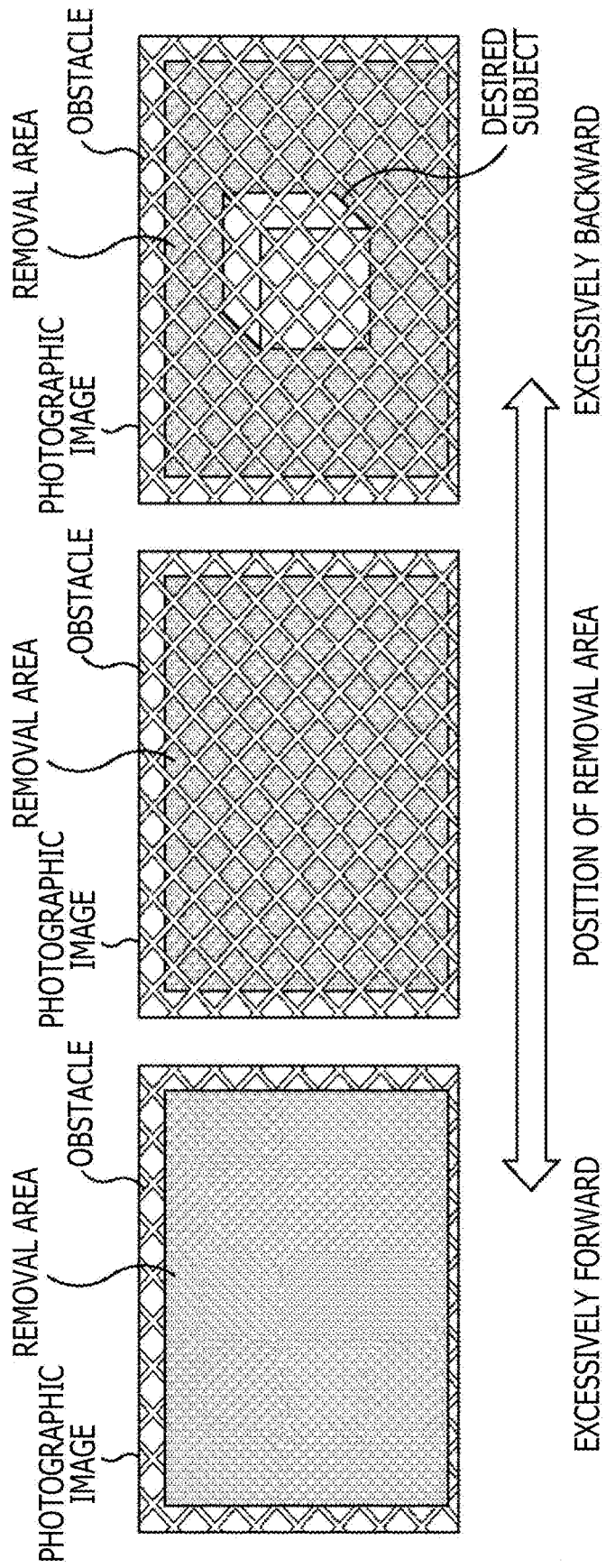
FIG. 12 depicts display examples of a GUI displayed on a display apparatus 13 by a control section 33.

FIG. 12 depicts display examples of a GUI displayed on the display apparatus 13 by the control section 33 in the case where the removal area is set by moving the two-dimensional plane serving as the removal area in response to user's operation.

The control section 33 superimposes (the GUI of) the removal area that is the two-dimensional plane onto the photographic image (for example, the photographic image IP1 photographed by the camera unit $21_1$), and controls the resultant image to be displayed on the display apparatus 13.

In FIG. 12, the desired subject and the wire net acting as the obstacle forward of the desired subject appear in the photographic images.

The control section 33 moves (the GUI of) the two-dimensional plane serving as the removal area in a depth direction in response to user's operation.

In the first photographic image from the left in FIG. 12, the removal area is disposed forward of the desired subject and yet forward of the obstacle present forward of the desired subject. Owing to this, both the desired subject and (part of) the wire net acting as the obstacle are hidden by the removal area and become invisible.

Whether the subject appearing in the photographic image is hidden by the removal area and becomes invisible can be determined from a position relationship between a position of the subject in the depth direction obtained from the disparity map and a position of the two-dimensional plane serving as the removal area in the depth direction.

In the third photographic image from the left (first photographic image from the right) in FIG. 12, the removal area is disposed in rear of the wire net acting as the obstacle and yet in rear of the desired subject present in rear of the wire net. Owing to this, both the desired subject and the wire net acting as the obstacle are visible.

In the second photographic image from the left in FIG. 12, the removal area is disposed at the position of the wire net acting as the obstacle. Owing to this, the desired subject in rear of the wire net acting as the obstacle is hidden by the removal area and becomes invisible, while the wire net acting as the obstacle is displayed in a state of being visible as if the wire net is disposed on the two-dimensional plane serving as the removal area.

The user carries out operation for moving the removal area in the depth direction in the real space while viewing the GUI displayed on the display apparatus 13 as depicted in FIG. 12, and can set the two-dimensional plane serving as the removal area at a position at which the removal area can encompass the wire net acting as the obstacle.

Figure 13:
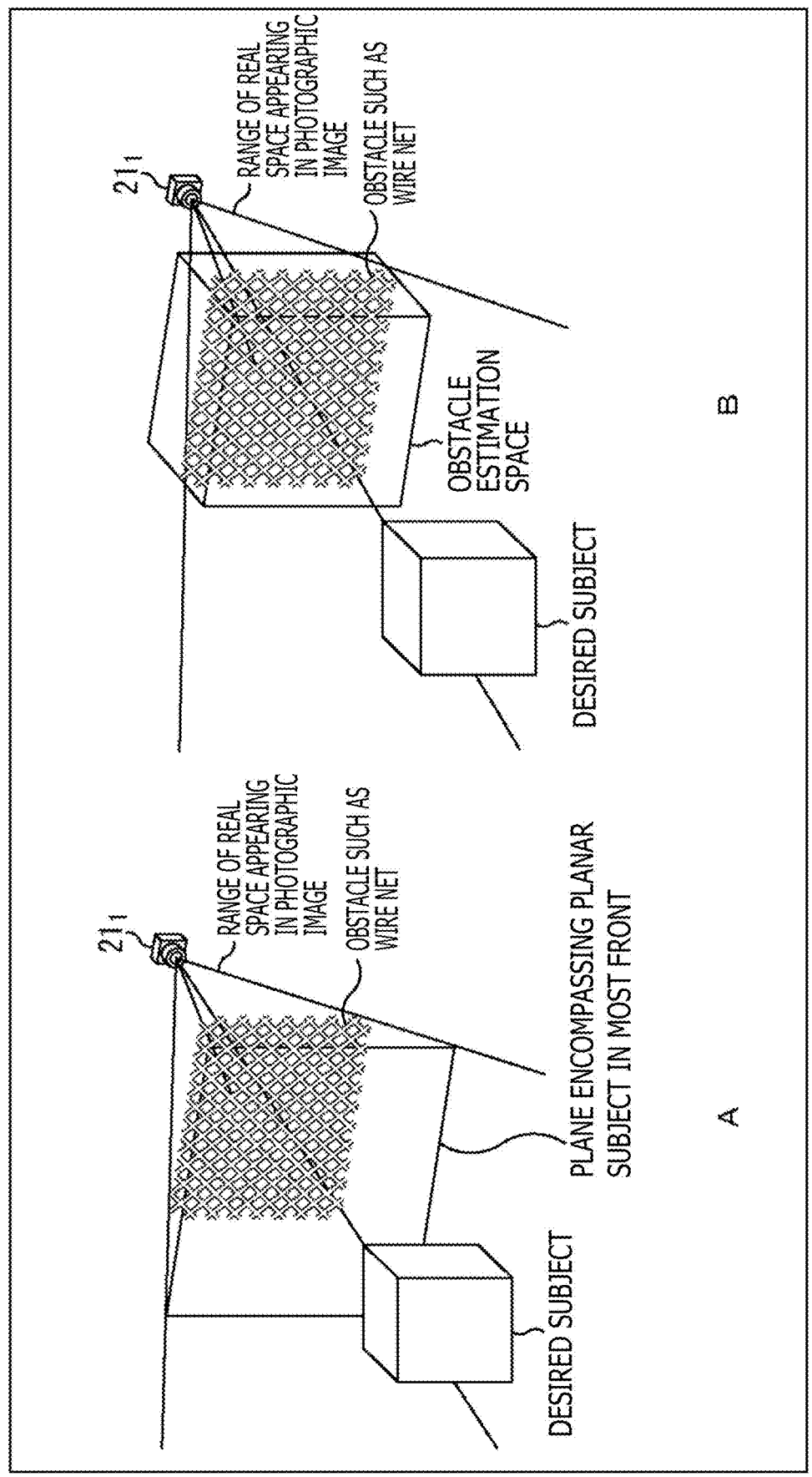
FIG. 13 is an explanatory diagram of an example of a method of automatically setting a two-dimensional plane to serve as a removal area.

FIG. 13 is an explanatory diagram of an example of a method of automatically setting the two-dimensional plane to serve as the removal area.

The removal area setting section 41 can set the removal area using the disparity map.

A of FIG. 13 depicts a state of setting the two-dimensional plane that encompasses the subject that is, for example, located in the most front and distributed in a planar shape in the real space to the removal area using the disparity map.

In A of FIG. 13, the subject located in the most front and distributed in the planar shape in the real space appearing in the photographic image is estimated as the obstacle, and the two-dimensional plane that encompasses such a subject distributed in the planar shape is set to the removal area.

The real space point corresponding to each pixel in the photographic image IP#i, that is, a position, in the real space, of the subject appearing in each pixel in the photographic image IP#i (for example, a position with reference to the photographing apparatus 11) can be determined from the position (xy coordinates) of the pixel in the photographic image IP#i and the disparity of the pixel.

Therefore, the removal area setting section 41 determines the real space point corresponding to each pixel in the photographic image IP#i. In the case where a collection (group) of the real space points distributed in the planar shape is present among the real space points, the removal area setting section 41 can set the two-dimensional plane in the most front in the two-dimensional plane in which such a collection of real space points is distributed to the removal area.

As described above, setting the two-dimensional plane in the most front in the two-dimensional plane in which the collection of real space points is distributed to the removal area makes it possible for the removal area setting section 41 to set the two-dimensional plane that encompasses the position at which, for example, the wire net acting as the obstacle and appearing in the image img1 in FIG. 5 is present or the raindrops attached onto the glass, acting as the obstacle, and appearing in the image img3 in FIG. 5 is present, to the removal area.

The removal area setting section 41 can determine the two-dimensional plane in which the collection of real space points is distributed by, for example, main component analysis.

B of FIG. 13 is an explanatory diagram of a method of determining the two-dimensional plane in which the collection of real space points is distributed by the main component analysis.

The removal area setting section 41 determines the real space point corresponding to each pixel in the photographic image IP#i using (the disparity entered in) the disparity map, and a thin rectangular prism-like space as an obstacle estimation space in which the obstacle is estimated to be present in the real space appearing in the photographic image IP#i.

Then, the removal area setting section 41 performs the main component analysis on the real space points in the obstacle estimation space, and determines a first main component and a second main component.

Furthermore, the removal area setting section 41 determines coordinates of an average (center of gravity) of the real space points in the obstacle estimation space, and determines a two-dimensional plane for which an axis that passes through the average coordinates and that is in a direction of the first main component is specified as an x-axis and an axis that passes through the average coordinates and that is in a direction of the second main component is specified as a y-axis, as a removal area candidate.

The removal area setting section 41 determines the two-dimensional plane as the removal area candidate while, for example, moving the obstacle estimation space from the most front in the depth direction in the real space appearing in the photographic image IP#i.

Moreover, the removal area setting section 41 determines a dispersion of the real space points in the obstacle estimation space with respect to the two-dimensional plane serving as the removal area candidate (for example, a sum of distances between the two-dimensional plane serving as the removal area candidate and the real space points in the obstacle estimation space).

In the case where the dispersion of the real space points in the obstacle estimation space with respect to the two-dimensional plane serving as the removal area candidate is equal to or smaller than a predetermined threshold, the removal area setting section 41 sets the two-dimensional plane serving as the removal area candidate to the removal area.

Figure 14:
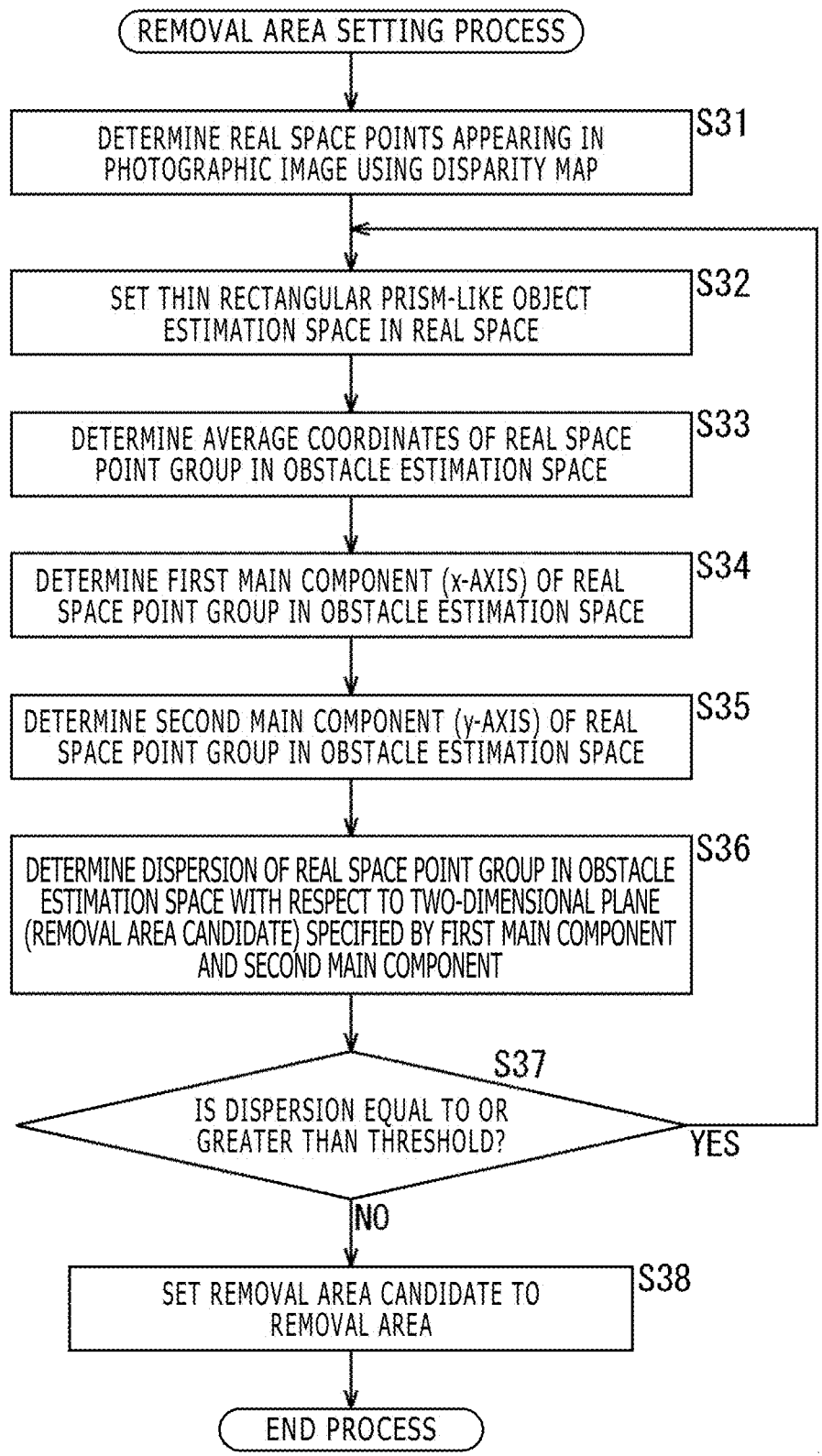
FIG. 14 is a flowchart for explaining an example of a removal area setting process for setting the removal area using a disparity map.

FIG. 14 is a flowchart for explaining an example of the removal area setting process for setting the removal area using the disparity map, as described with reference to FIG. 13.

In Step S31, the removal area setting section 41 determines real space points in the real space appearing in the photographic image IP#i at the certain viewpoint vp#i, that is, determines the real space point corresponding to each pixel in the photographic image IP#i using the disparity map of the certain viewpoint vp#i; the processing goes to Step S32.

In Step S32, the removal area setting section 41 sets the obstacle estimation space, for example, at the most front position in the real space appearing in the photographic image IP#i; the processing goes to Step S33.

In Step S33, the removal area setting section 41 determines the average coordinates of the real space point group in the obstacle estimation space; the processing goes to Step S34.

In Step S34, the removal area setting section 41 determines the first main component by performing the main component analysis on the real space point group in the obstacle estimation space, and determines the axis passing through the average coordinates in the direction of the first main component as the x-axis; the processing goes to Step S35.

In Step S35, the removal area setting section 41 determines the second main component orthogonal to the first main component by performing the main component analysis on the real space point group in the obstacle estimation space, and determines the axis passing through the average coordinates in the direction of the second main component as the y-axis; the processing goes to Step S36.

In Step S36, the removal area setting section 41 determines the two-dimensional plane specified by the x-axis (first main component) determined in previous Step S34 and the y-axis (second main component) determined in previous Step S35, as the removal area candidate.

Furthermore, the removal area setting section 41 determines the dispersion of the real space points in the obstacle estimation space with respect to the two-dimensional plane serving as the removal area candidate; the processing goes to Step S37.

In Step S37, the removal area setting section 41 determines whether or not the dispersion of the real space points in the obstacle estimation space with respect to the removal area candidate is equal to or greater than a threshold.

In the case where it is determined in Step S37 that the dispersion of the real space points in the obstacle estimation space with respect to the removal area candidate is equal to or greater than the threshold, that is, (at least part of) the real space points in the obstacle estimation space are not considered to be distributed in the planar shape, the processing returns to Step S32.

In Step S32, the removal area setting section 41 sets a new obstacle estimation space, for example, at a position moved from the current position of the obstacle estimation space by a predetermined distance in the depth direction, and repeats the similar processing.

Further, in the case where it is determined in Step S37 that the dispersion of the real space points in the obstacle estimation space with respect to the removal area candidate is not equal to or greater than the threshold, that is, the real space points in the obstacle estimation space are considered to be distributed in the planar shape, the processing goes to Step S38.

In Step S38, the removal area setting section 41 sets the two-dimensional plane serving as the removal area candidate to the removal area, and ends the removal area setting process.

Figure 15:
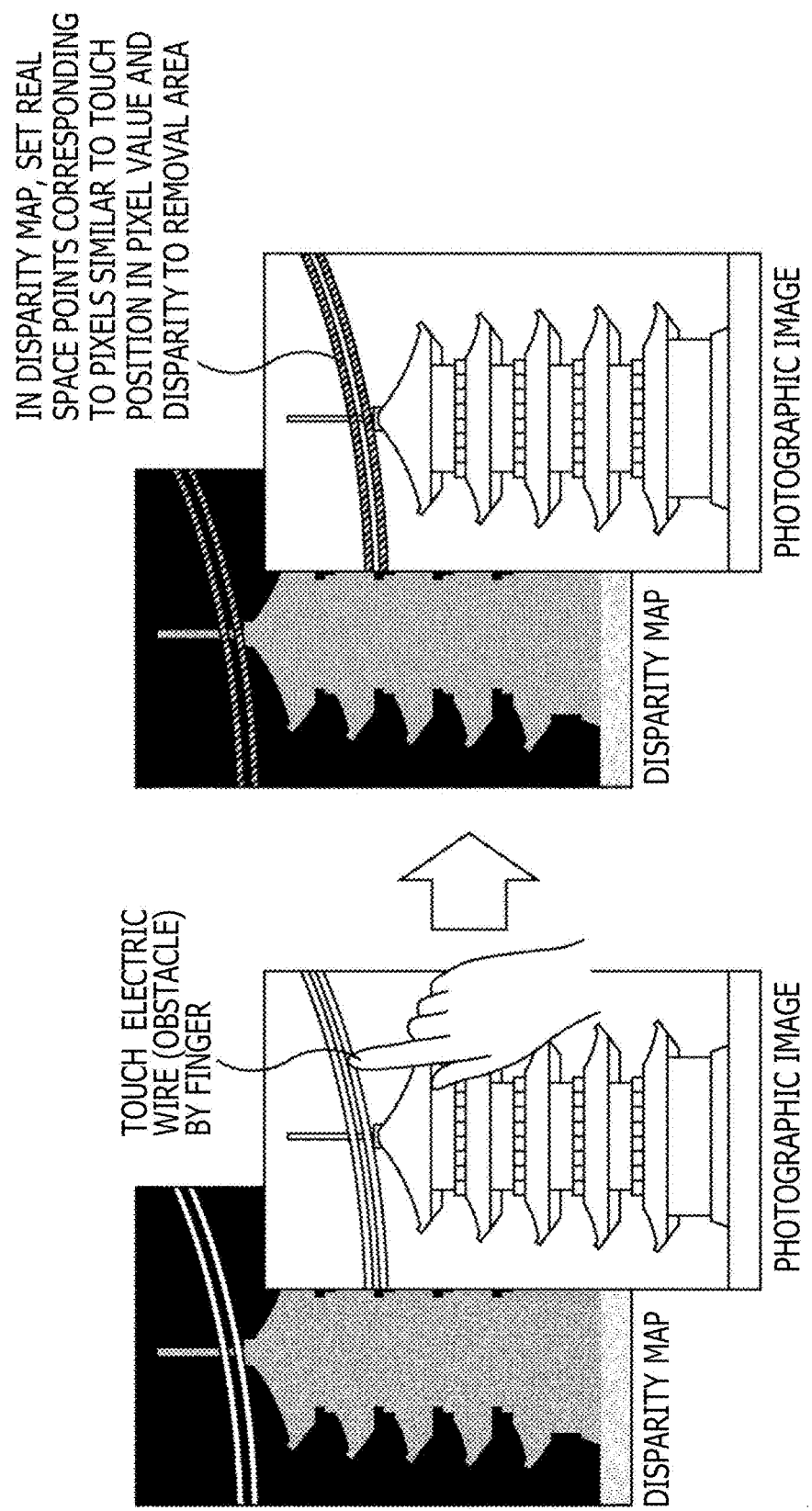
FIG. 15 is an explanatory diagram of another example of setting the removal area by the removal area setting section 41.

FIG. 15 is an explanatory diagram of another example of setting the removal area by the removal area setting section 41 depicted in FIG. 4.

The removal area setting section 41 can not only set the two-dimensional plane as the removal area but also sets an area occupied in the real space by the subject designated by the user as the removal area.

In other words, the removal area setting section 41 can set, for example, real space points corresponding to pixels similar to pixels designated by the user in the photographic image in one of or both of the pixel value and the disparity, to the removal area.

In FIG. 15, a tower acting as the desired subject appears in the photographic images, and an electric wire acting as the obstacle appears forward of the tower in the photographic images.

The control section 33 (FIG. 4) can display the photographic image described above on the display apparatus 13.

In this case, the user can designate the obstacle by, for example, touching part of the obstacle appearing in the photographic image displayed on the display apparatus 13 by a finger, a pointing device, or the like.

The removal area setting section 41 detects the pixels similar to the pixels in the photographic image designated by the user by touching (hereinafter, also referred to as "touch pixels") in one of or both of the pixel value and the disparity from the photographic image, and sets the area formed by the real space points corresponding to such pixels to the removal area.

In this case, as depicted in FIG. 15, the control section 33 can control the photographic image to be displayed on the display apparatus 13 in such a manner that the pixels corresponding to the real space points that form the removal area are clear, for example, colors or luminance of the pixels are changed. Similarly, the control section 33 can control the disparity map to be displayed on the display apparatus 13 in such a manner that the pixels corresponding to the real space points that form the removal area are clear.

In the disparity map of FIG. 15, a horizontal axis and a vertical axis represent pixel positions and the disparity of the pixel at each position is represented by shading.

The user can confirm the removal area (whether the removal area is set in the area of the obstacle) while viewing the photographic image and the disparity map displayed in such a manner that the pixels corresponding to the real space points that form the removal area are clear.

<Obstacle Removal Process>

Figure 16:
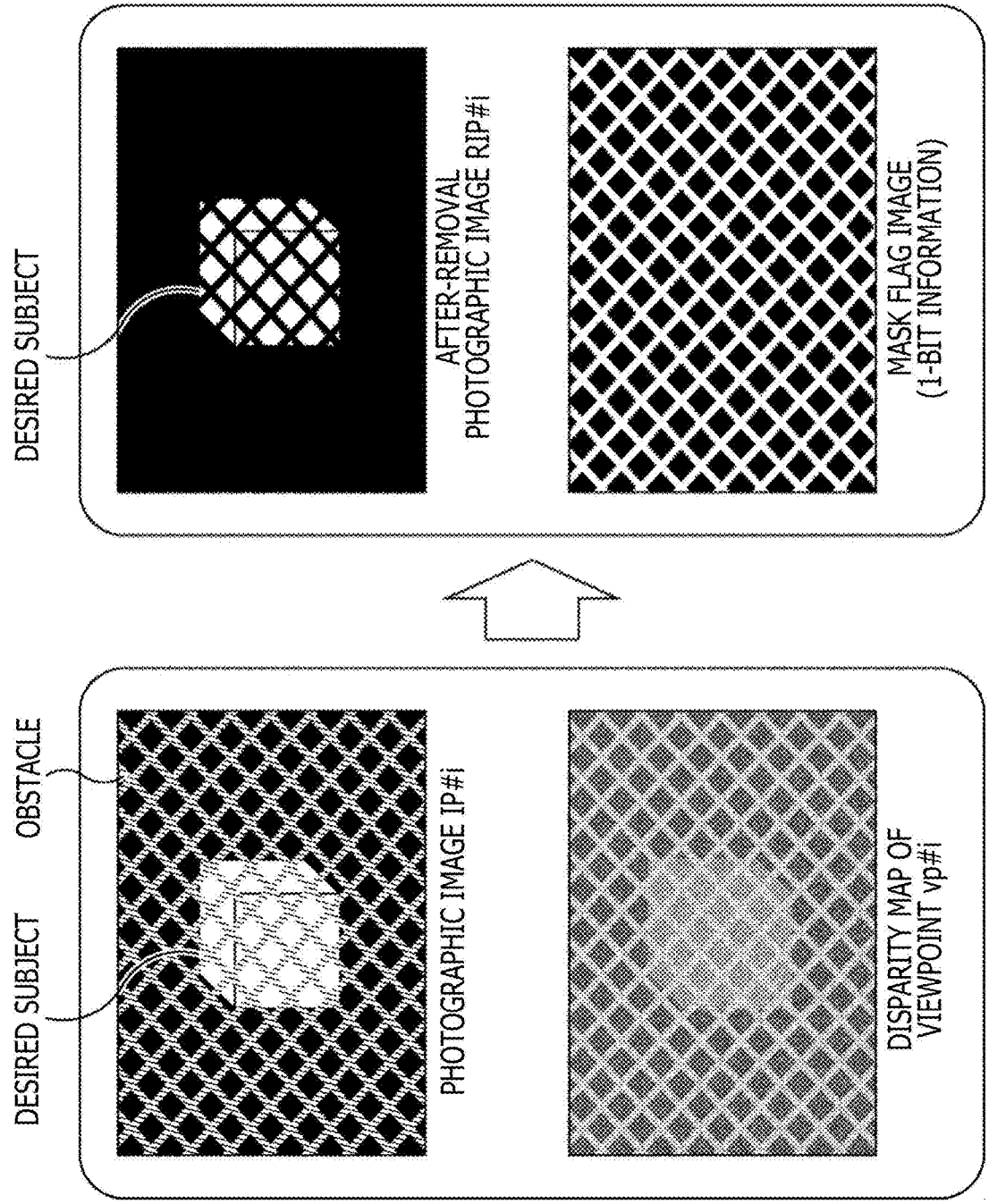
FIG. 16 is an explanatory diagram of an outline of an example of an obstacle removal process by a removal section 42.

FIG. 16 is an explanatory diagram of an outline of an example of the obstacle removal process by the removal section 42 (FIG. 4).

The removal section 42 generates the after-removal photographic image RIP#i obtained by removing the obstacle in the removal area that appears in each photographic image IP#i supplied from the photographing apparatus 11 from the photographic image IP#i and the mask flag image, using the disparity map of each viewpoint vp#i supplied from the disparity information generation section 31 and the removal area supplied from the removal area setting section 41.

In the photographic image IP#i of FIG. 16, the desired subject appears and the wire net acting as the obstacle also appears forward of the desired subject.

Now, in a case where the removal area setting section 41 sets the two-dimensional plane in which the real space points at which the wire net acting as the obstacle is located are distributed to the removal area, the removal section 42 generates the after-removal photographic image RIP#i obtained by removing the pixels of the photographic image IP#i corresponding to the real space points within the removal area among the real space points of the subjects in the real space appearing in the photographic image IP#i as obstacle pixels in which the obstacle appears.

Furthermore, the removal section 42 generates the mask flag image having the pixel value of the 1-bit mask flag that represents whether or not each pixel at the same position as that of the pixel in the after-removal photographic image RIP#i is present, that is, the mask flag image representing each pixel acting as the obstacle pixel in the photographic image IP#i, for the after-removal photographic image RIP#i.

In the mask flag image, the mask flag as the pixel value of each pixel at the same position as that of each obstacle pixel is set to, for example, "1" that represents the obstacle pixel, while the mask flag as the pixel value of each pixel at the same position as that of each pixel that is not the obstacle pixel is set to, for example, "0" that represents the pixel that is not the obstacle pixel.

In the mask flag image of FIG. 16, portions depicted in white represent that the pixels in the photographic image IP#i are the obstacle pixels and portions depicted in black represent that the pixels in the photographic image IP#i are not the obstacle pixels.

When it is assumed herein that 8 bits of an R (Red) value, 8 bits of a G (Green) value, and 8 bits of a B (Blue) value, that is, 24 bits in total are allocated to each pixel value in the photographic image IP#i, the pixel value of each pixel in the after-removal photographic image RIP#i includes 24 bits similarly to the pixel value of each pixel in the photographic image IP#i.

However, as for the after-removal photographic image RIP#i, the pixel value of each pixel therein is extended from 24 bits by 1 bit to 25 bits, so that the pixel value (mask flag) of the mask flag image can be set to the 25th bit. In this case, the mask flag image includes the 25th bit in the pixel value of each pixel in the after-removal photographic image RIP#i.

Figure 17:
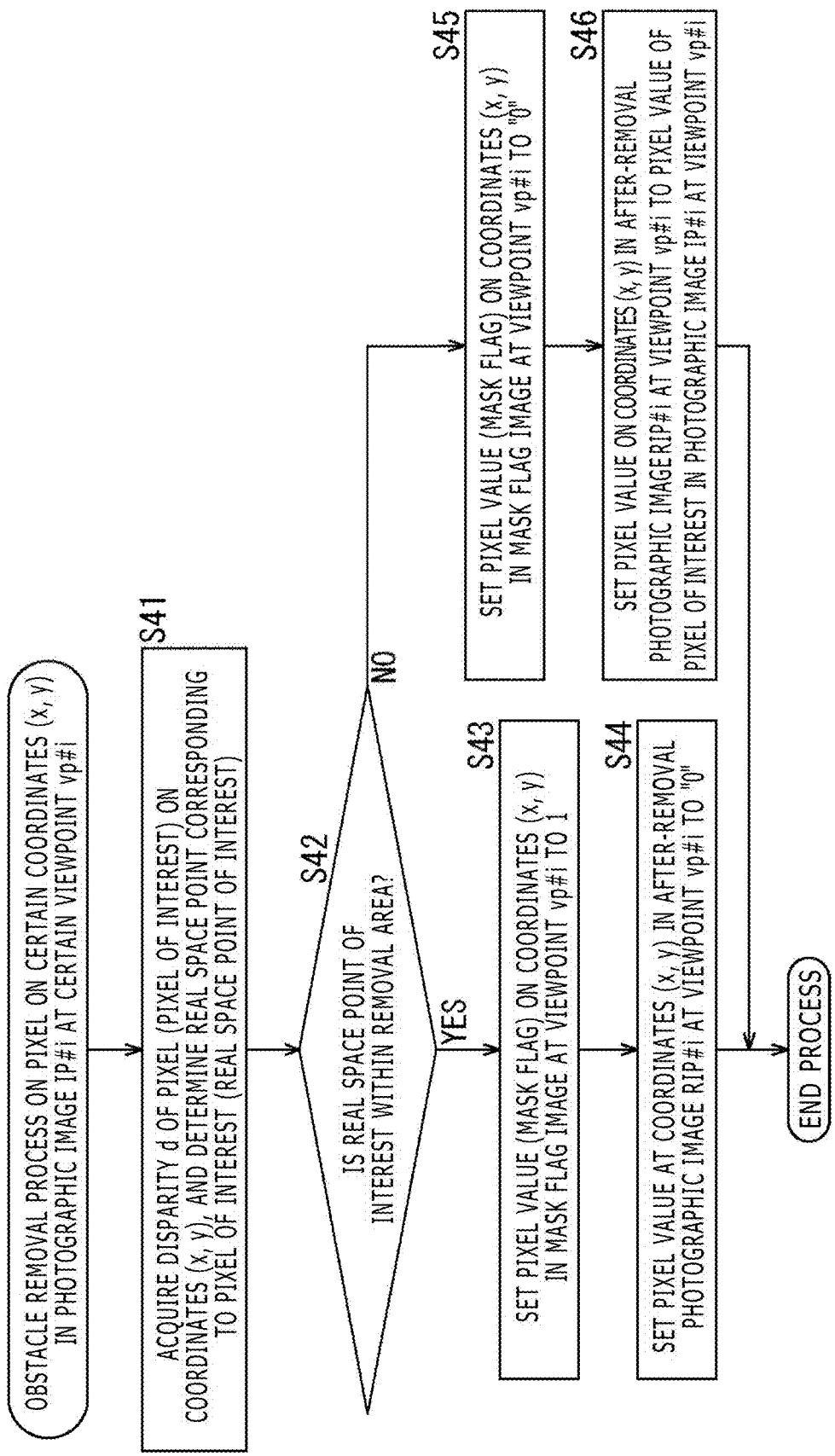
FIG. 17 is a flowchart for explaining an example of the obstacle removal process by the removal section 42.

FIG. 17 is a flowchart for explaining an example of the obstacle removal process by the removal section 42.

The flowchart of FIG. 17 represents herein the obstacle removal process performed with a pixel on certain coordinates (x, y) in the photographic image IP#i at one viewpoint vp#i assumed as the pixel of interest.

The obstacle removal process of FIG. 17 is performed while all the pixels in the photographic image at all viewpoints are each assumed as the pixel of interest.

Furthermore, the coordinates (x, y) in the photographic image IP#i means coordinates in a two-dimensional coordinate system for which it is assumed, for example, that an upper left point in the photographic image IP#i is an origin and the horizontal direction and a perpendicular direction are the x-axis and the y-axis, respectively.

In Step S41, the removal section 42 acquires a disparity d of the pixel of interest that is the pixel on the coordinates (x, y) in the photographic image IP#i at the viewpoint vp#i from the disparity map. Furthermore, the removal section 42 determines the real space point corresponding to the pixel of interest (real space point appearing in the pixel of interest) as the real space point of interest from the coordinates (x, y) of the pixel of interest and the disparity d of the pixel of interest; processing goes from Step S41 to Step S42.

In Step S42, the removal section 42 determines whether the real space point of interest is within the removal area.

In a case where it is determined in Step S42 that the real space point of interest is within the removal area, the processing, that is, in a case where the real space point of interest is a point on the subject acting as the obstacle, the processing goes to Step S43.

In Step S43, the removal section 42 sets the mask flag that is the pixel value on the coordinates (x, y) in the mask flag image (mask flag image for the after-removal photographic image RIP#i) at the viewpoint vp#i to "1" that represents that the pixel of interest is the obstacle pixel; the processing goes to Step S44.

In Step S44, the removal section 42 sets the pixel value on the coordinates (x, y) in the after-removal photographic image RIP#i at the viewpoint vp#i to "0" that represents removal of the obstacle pixel; the removal section 42 ends the obstacle removal process.

It is to be noted herein that it is not always necessary to set the pixel value of the obstacle pixel to "0" in the after-removal photographic image RIP#i. Nevertheless, it is desirable to set the pixel value of the obstacle pixel in the after-removal photographic image RIP#i to "0" from the viewpoint of preventing occurrence of color mixture in the registration process by the registration section 52 in a later stage.

On the other hand, in a case where it is determined in Step S42 that the real space point of interest is not within the removal area, the processing, that is, in a case where the real space point of interest is not the point on the obstacle, the processing goes to Step S45.

In Step S45, the removal section 42 sets the mask flag that is the pixel value on the coordinates (x, y) in the mask flag image at the viewpoint vp#i to "0" that represents that the pixel of interest is not the obstacle pixel; the processing goes to Step S46.

In Step S46, the removal section 42 sets the pixel value on the coordinates (x, y) in the after-removal photographic image RIP#i at the viewpoint vp#i to the pixel value of the pixel of interest; the removal section 42 ends the obstacle removal process.

<Viewpoint Transformation Process>

Figure 18:
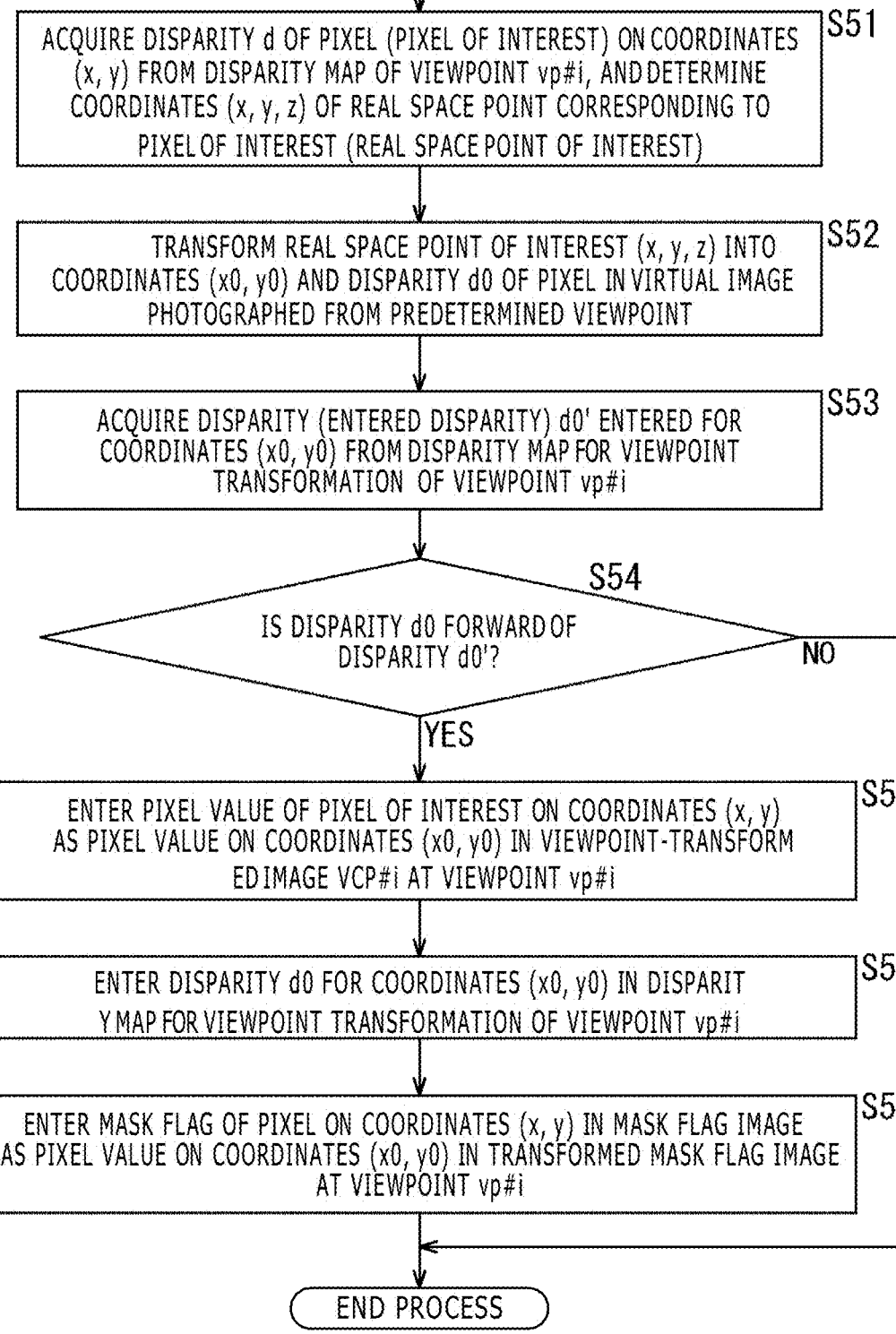
FIG. 18 is a flowchart for explaining an example of a viewpoint transformation process by a viewpoint transformation section 51.

FIG. 18 is a flowchart for explaining an example of the viewpoint transformation process by the viewpoint transformation section 51 (FIG. 4).

The flowchart of FIG. 18 represents herein the viewpoint transformation process performed with a pixel on certain coordinates (x, y) in the after-removal photographic image RIP#i at one viewpoint vp#i assumed as the pixel of interest.

The viewpoint transformation process of FIG. 18 is performed while all the pixels in the after-removal photographic image at all viewpoints are each assumed as the pixel of interest.

In Step S51, the viewpoint transformation section 51 acquires the disparity d of the pixel of interest on the coordinates (x, y) in the after-removal photographic image RIP#i at the viewpoint vp#i from the disparity map. Furthermore, the removal section 42 determines the real space point corresponding to the pixel of interest (real space point appearing in the pixel of interest) as the real space point of interest from the coordinates (x, y) of the pixel of interest and the disparity d of the pixel of interest; processing goes from Step S51 to Step S52.

Coordinates of the real space point are represented herein by a three-dimensional coordinate system for which it is assumed that an optical axis direction of (the camera unit $21_i$ of) the photographing apparatus 11 is a z-axis and a two-dimensional plane orthogonal to the z-axis is an xy plane. Furthermore, the real space point on coordinates (x, y, z) is also denoted by "real space point (x, y, z)."

In Step S52, the viewpoint transformation section 51 transforms the real space point of interest (x, y, z) into coordinates $(x_0, y_0)$ and a disparity $d_0$ of a pixel in a virtual image that is a virtual image photographed from the predetermined viewpoint; the processing goes to Step S53.

Here, as the predetermined viewpoint, the viewpoint vp#i of any of the camera units $21_i$ that constitute the photographing apparatus 11, for example, the viewpoint vp1 of the reference camera unit $21_1$ can be adopted.

Alternatively, as the predetermined viewpoint, a viewpoint different from the viewpoint vp#i of any of the camera units $21_i$ that constitute the photographing apparatus 11 can be adopted.

In Step S52, the coordinates $(x_0, y_0)$ and the disparity $d_0$ of the pixel in which the real space point of interest (x, y, z) appears are determined when the real space point of interest (x, y, z) is photographed from the predetermined viewpoint.

In Step S53, the viewpoint transformation section 51 acquires an entered disparity $d_0'$ that is a disparity entered for the coordinates $(x_0, y_0)$ from the disparity map for viewpoint transformation of the viewpoint vp#i; the processing goes to Step S54.

The disparity map for viewpoint transformation of the viewpoint vp#i means herein a disparity map used for the viewpoint transformation process on the after-removal photographic image RIP#i at the viewpoint vp#i. An entity of the disparity map for viewpoint transformation of the viewpoint vp#i is a storage area. The storage area serving as the disparity map for viewpoint transformation of the viewpoint vp#i is secured before the viewpoint transformation process on the after-removal photographic image RIP#i at the viewpoint vp#i is started. An initial value of the entered disparity $d_0'$ (of each pixel) in the disparity map for viewpoint transformation of the viewpoint vp#i is set to, for example, "0" (infinity).

In Step S54, the viewpoint transformation section 51 determines whether the disparity $d_0$ of the coordinates $(x_0, y_0)$ on the virtual image is forward of the entered disparity $d_0'$ entered for (each pixel on) the coordinates $(x_0, y_0)$ in the disparity map for viewpoint transformation of the viewpoint vp#i.

When it is determined in Step S54 that the disparity $d_0$ is not forward of the entered disparity $d_0'$, that is, in a case where the real space point of interest (x, y, z) at the disparity $d_0$ and the real space point at the entered disparity $d_0'$ are present as subjects that possibly appear in the pixel on the coordinates $(x_0, y_0)$ on the virtual image, the real space point of interest (x, y, z) at the disparity $d_0$ is not forward of the real space point at the entered disparity $d_0'$, and the real space point at the disparity $d_0$ does not, therefore, appear in the pixel on the coordinates $(x_0, y_0)$ on the virtual image, then the viewpoint transformation process (on the pixel of interest) is ended.

On the other hand, in a case where it is determined in Step S54 that the disparity $d_0$ is forward of the entered disparity $d_0'$, that is, in a case where the real space point of interest (x, y, z) at the disparity $d_0$ and the real space point at the entered disparity $d_0'$ are present as subjects that possibly appear in the pixel on the coordinates $(x_0, y_0)$ on the virtual image, the real space point of interest (x, y, z) at the disparity $d_0$ is forward of the real space point at the entered disparity $d_0'$, and the real space point at the disparity $d_0$, therefore, possibly appears in the pixel on the coordinates $(x_0, y_0)$ on the virtual image, then the processing goes to Step S55.

In Step S55, the viewpoint transformation section 51 enters, as a pixel value of the pixel on the coordinates $(x_0, y_0)$ in the viewpoint-transformed image VCP#i at the viewpoint vp#i, the pixel value of the pixel of interest on the coordinates (x, y) in the after-removal photographic image RIP#i at the viewpoint vp#i corresponding to the real space point of interest (x, y, z); the processing goes to Step S56.

The viewpoint-transformed image VCP#i at the viewpoint vp#i means herein an image in which the subject appearing in the after-removal photographic image RIP#i at the viewpoint vp#i is photographed from the predetermined viewpoint (image that could be obtained when the subject is photographed from the predetermined viewpoint). An entity of the viewpoint-transformed image VCP#i at the viewpoint vp#i is a storage area. The storage area serving as the viewpoint-transformed image VCP#i at the viewpoint vp#i is secured before the viewpoint transformation process on the after-removal photographic image RIP#i at the viewpoint vp#i is started, similarly to the disparity map for viewpoint transformation of the viewpoint vp#i. An initial value of the pixel value of each pixel in the viewpoint-transformed image VCP#i at the viewpoint vp#i is set to, for example, "0."

In Step S56, the viewpoint transformation section 51 enters the disparity $d_0$ of the pixel on the coordinates $(x_0, y_0)$ on the virtual image, that is, the disparity $d_0$ of the pixel on the coordinates $(x_0, y_0)$ in the viewpoint-transformed image VCP#i at the viewpoint vp#i, for the coordinates $(x_0, y_0)$ in the disparity map for viewpoint transformation of the viewpoint vp#i in such a manner as to overwrite the disparity $d_0$ on the entered disparity $d_0'$ that is already entered.

The disparity $d_0$ forward of the entered disparity $d_0'$ that is already entered is entered for the coordinates $(x_0, y_0)$ in the disparity map for viewpoint transformation of the viewpoint vp#i as an alternative to the entered disparity $d_0'$.

Then, the processing goes from Step S56 to Step S57. The viewpoint transformation section 51 enters, as a pixel value on the coordinates $(x_0, y_0)$ in the transformed mask flag image at the viewpoint vp#i, the mask flag as the pixel value on the coordinates (x, y) in the mask flag image at the viewpoint vp#i, and ends the viewpoint transformation process.

According to the processing in Step S57, the mask flag image at the viewpoint vp#i is transformed into the transformed mask flag image at the viewpoint vp#i in response to transformation of the after-removal photographic image RIP#i at the viewpoint vp#i into the viewpoint-transformed image VCP#i viewed from the predetermined viewpoint vp#i in Step S55.

An entity of the transformed mask flag image at the viewpoint vp#i is a storage area. The storage area serving as the transformed mask flag image at the viewpoint vp#i is secured before the viewpoint transformation process on the after-removal photographic image RIP#i at the viewpoint vp#i is started, similarly to the disparity map for viewpoint transformation of the viewpoint vp#i. An initial value of the pixel value (mask flag) of each pixel in the transformed mask flag image at the viewpoint vp#i is set to, for example, "1" that represents the obstacle pixel (pixel in which the obstacle appears).

It is to be noted that the disparity map for viewpoint transformation of the viewpoint vp#i is a disparity map used to transform the after-removal photographic image RIP#i at the viewpoint vp#i into the viewpoint-transformed image VCP#i viewed from the predetermined viewpoint vp#i, so that it is unnecessary to hold the disparity map for the viewpoint transformation of the viewpoint vp#i after end of the viewpoint transformation process.

Moreover, as described with reference to FIG. 16, when it is assumed that 8 bits of the R value, 8 bits of the G value, and 8 bits of the B value, that is, 24 bits in total are allocated to each pixel value in the photographic image IP#i, the pixel value of each pixel in the viewpoint-transformed image VCP#i at the viewpoint vp#i includes 24 bits similarly to the pixel value of each pixel in the photographic image IP#i.

Similarly to the after-removal photographic image RIP#i described with reference to FIG. 16, as for the viewpoint-transformed image VCP#i at the viewpoint vp#i, the pixel value is extended from 24 bits by 1 bit to 25 bits, so that the pixel value of the transformed mask flag image can be set to the 25th bit. In this case, the transformed mask flag image includes the 25th bit that is the pixel value of each pixel in the viewpoint-transformed image VCP#i at the viewpoint vp#i.

<Registration Process>

Figure 19:
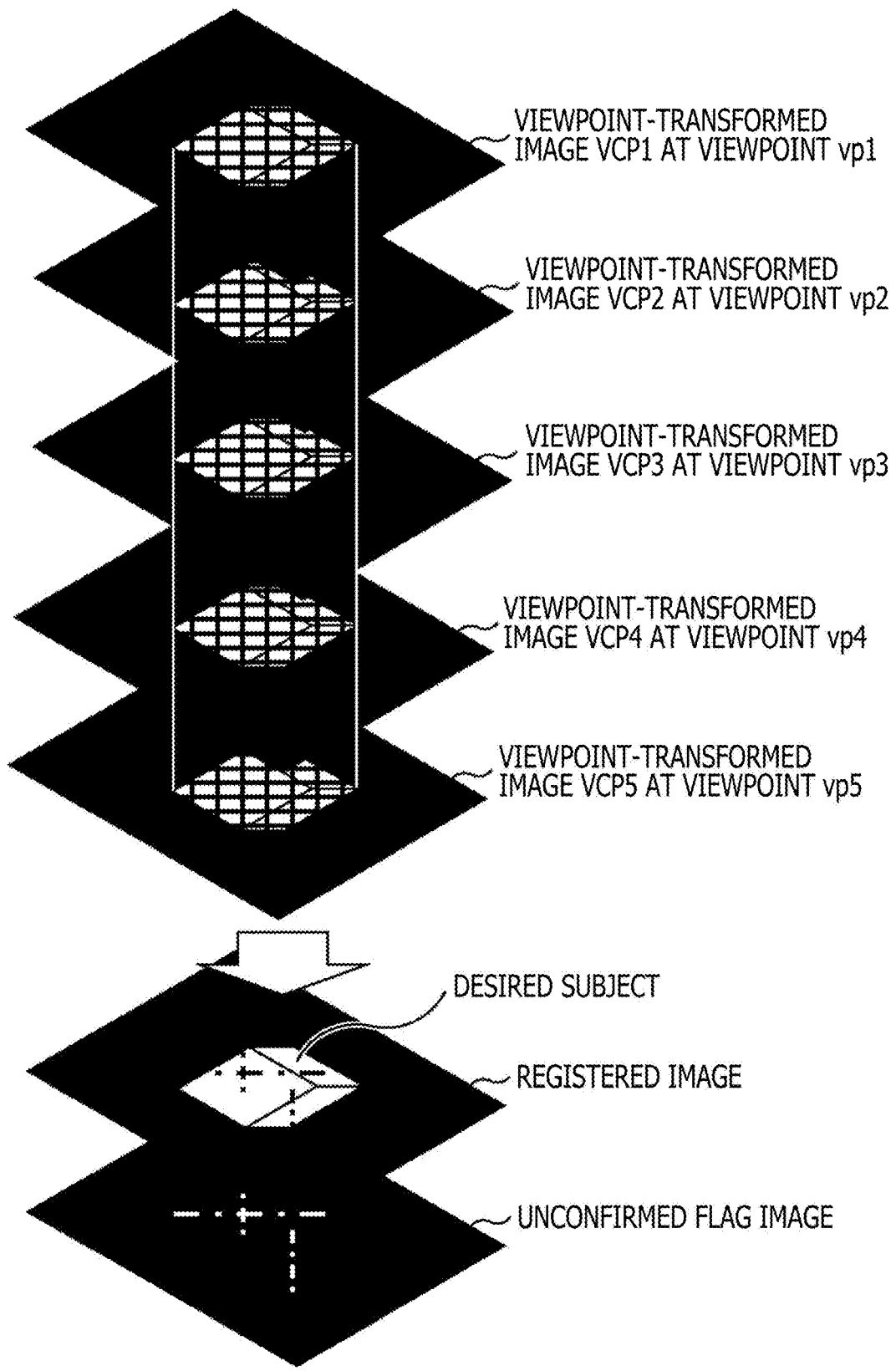
FIG. 19 is an explanatory diagram of an outline of a registration process by a registration section 52.

FIG. 19 is an explanatory diagram of an outline of the registration process by the registration section 52 (FIG. 4).

Besides, it is assumed in FIG. 19 that the photographing apparatus 11 is configured with the five camera units $21_1$ to $21_5$ as depicted, for example, in FIG. 3, and the photographic images IP1 to IP5 at the five viewpoints are photographed.

Furthermore, it is assumed hereinafter that the viewpoint vp1 of the reference camera unit $21_1$, for example, is adopted as the predetermined viewpoint in the viewpoint transformation process by the viewpoint transformation section 51.

The viewpoint-transformed images VCP1 to VCP5 at the viewpoints vp1 to vp5 are obtained by the viewpoint transformation process performed by the viewpoint transformation section 51.

The viewpoint-transformed images VCP1 to VCP5 at the viewpoints vp1 to vp5 are all the image photographed from the predetermined viewpoint (image at the predetermined viewpoint). If the same real space point that is not the obstacle is viewed from the viewpoints vp1 to vp5, the same real space point appears in respective pixels in the viewpoint-transformed images VCP1 to VCP5 at the same position at the viewpoints vp1 to vp5.

The registration section 52 registers the viewpoint-transformed images VCP1 to VCP5 at the viewpoints vp1 to vp5, thereby generating an image in which the subjects appearing in the photographic images IP1 to IP5 except for the obstacle are viewed from the predetermined viewpoint (the viewpoint vp1 in this example) as the registered image at the predetermined viewpoint.

The registered image at the predetermined viewpoint is the obstacle-removed image in which the obstacle does not appear when the desired subject is viewed from the predetermined viewpoint.

In registration of the viewpoint-transformed images VCP1 to VCP5 at the viewpoints vp1 to vp5 by the registration section 52, a pixel value of a pixel of interest in the registered image is determined using one or more pixels at the same position as that of the pixel of interest in the respective viewpoint-transformed images VCP1 to VCP5.

It is to be noted herein that, for example, a certain real space point on the desired subject appears in the pixel at a predetermined position in the viewpoint-transformed image VCP#i at the certain viewpoint vp#i, while the same real space point is often hidden by the obstacle and does not appear in the pixel at the predetermined position in a viewpoint-transformed image VCP#i' at another viewpoint vp#i'.

The registration section 52 recognizes the obstacle pixel in which the obstacle appears in the viewpoint-transformed image VCP#i at the viewpoint vp#i from the transformed mask flag image at the viewpoint vp#i. The registration section 52 then determines the pixel value of the pixel of interest in the registered image at the predetermined viewpoint using pixels that are not the obstacle pixels out of the pixels at the same position as that of the pixel of interest in the respective viewpoint-transformed images VCP1 to VCP5 at the viewpoints vp1 to vp5.

It is to be noted that in a case where the pixels at the same position as that of the pixel of interest have no pixel values in the respective viewpoint-transformed images VCP1 to VCP5 at the viewpoints vp1 to vp5, that is, for example, in a case where all the pixels at the same position as that of the pixel of interest in the respective viewpoint-transformed images VCP1 to VCP5 at the viewpoints vp1 to vp5 are obstacle pixels, then the pixel of interest in the registered image becomes a missing pixel that is a pixel-value missing pixel.

The registration section 52 generates the registered image and also generates the unconfirmed flag image that represents whether each pixel in the registered image is the missing pixel that is the pixel-value missing pixel. The pixel value of each pixel in the unconfirmed flag image is the 1-bit unconfirmed flag representing whether the pixel at the same position in the registered image as that of the pixel in the unconfirmed flag image is a missing pixel.

Figure 20:
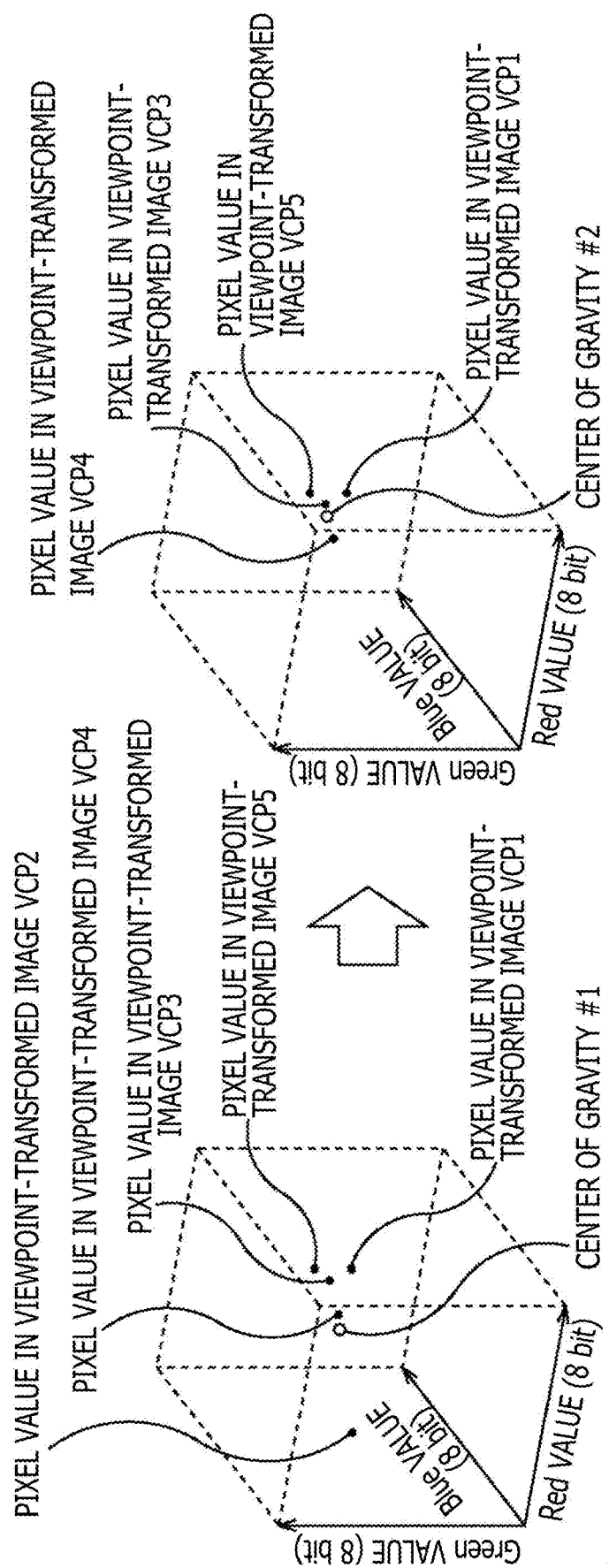
FIG. 20 is an explanatory diagram of a method of determining a pixel value of a pixel of interest in a registered image in the registration process by the registration section 52.

FIG. 20 is an explanatory diagram of an example of a method of determining the pixel value of the pixel of interest in the registered image in the registration process by the registration section 52 (FIG. 4).

In the registration process, the pixel value of the pixel of interest in the registered image at the predetermined viewpoint is determined using the pixels that are not the obstacle pixels out of the pixels at the same position as that of the pixel of interest in the respective viewpoint-transformed images VCP1 to VCP5 at the viewpoints vp1 to vp5.

In the registration process, for example, an average value or the like of the pixel values of the pixels that are not the obstacle pixels out of the pixels at the same position as that of the pixel of interest in the respective viewpoint-transformed images VCP1 to VCP5 at the viewpoints vp1 to vp5 can be determined as the pixel value of the pixel of interest in the registered image at the predetermined viewpoint.

Alternatively, in the registration process, for example, one of the pixels that are not the obstacle pixels (hereinafter, also referred to as "non-obstacle pixels") out of the pixels at the same position as that of the pixel of interest in the respective viewpoint-transformed images VCP1 to VCP5 at the viewpoints vp1 to vp5 can be selected as a selected pixel and a pixel value of the selected pixel can be determined as the pixel value of the pixel of interest in the registered image at the predetermined viewpoint.

A method of determining the pixel value of the selected pixel as the pixel value of the pixel of interest in the registered image at the predetermined viewpoint as described above will now be referred to as "selected pixel scheme."

FIG. 20 is the explanatory diagram of the selected pixel scheme.

Besides, in FIG. 20, it is assumed that the pixels at the same position as that of the pixel of interest in the respective viewpoint-transformed images VCP1 to VCP5 at the viewpoints vp1 to vp5 are all non-obstacle pixels.

In the selected pixel scheme, a center of gravity #1, in an RGB color space, of the pixel values of the non-obstacle pixels at the same position as that of the pixel of interest in the respective viewpoint-transformed images VCP1 to VCP5 at the viewpoints vp1 to vp5 is determined.

In addition, for example, the non-obstacle pixel having the pixel value closest to the center of gravity #1 is selected as the selected pixel among the non-obstacle pixels at the same position as that of the pixel of interest in the respective viewpoint-transformed images VCP1 to VCP5 at the viewpoints vp1 to vp5, and the pixel value of the selected pixel is determined as the pixel value of the pixel of interest in the registered image at the predetermined viewpoint.

Alternatively, in the selected pixel scheme, the non-obstacle pixel having the pixel value farthest from the center of gravity #1 is excluded from the non-obstacle pixels at the same position as that of the pixel of interest in the respective viewpoint-transformed images VCP1 to VCP5 at the viewpoints vp1 to vp5. In addition, in the selected pixel scheme, a center of gravity #2 of the pixel values of the remaining non-obstacle pixels is determined, the remaining non-obstacle pixels being obtained after excluding the non-obstacle pixel having the pixel value farthest from the center of gravity #1 from the non-obstacle pixels at the same position as that of the pixel of interest in the respective viewpoint-transformed images VCP1 to VCP5 at the viewpoints vp1 to vp5.

In addition, for example, the non-obstacle pixel having the pixel value closest to the center of gravity #2 is selected as the selected pixel among the non-obstacle pixels at the same position as that of the pixel of interest in the respective viewpoint-transformed images VCP1 to VCP5 at the viewpoints vp1 to vp5, and the pixel value of the selected pixel is determined as the pixel value of the pixel of interest in the registered image at the predetermined viewpoint.

<Interpolation Process>

Figure 21:
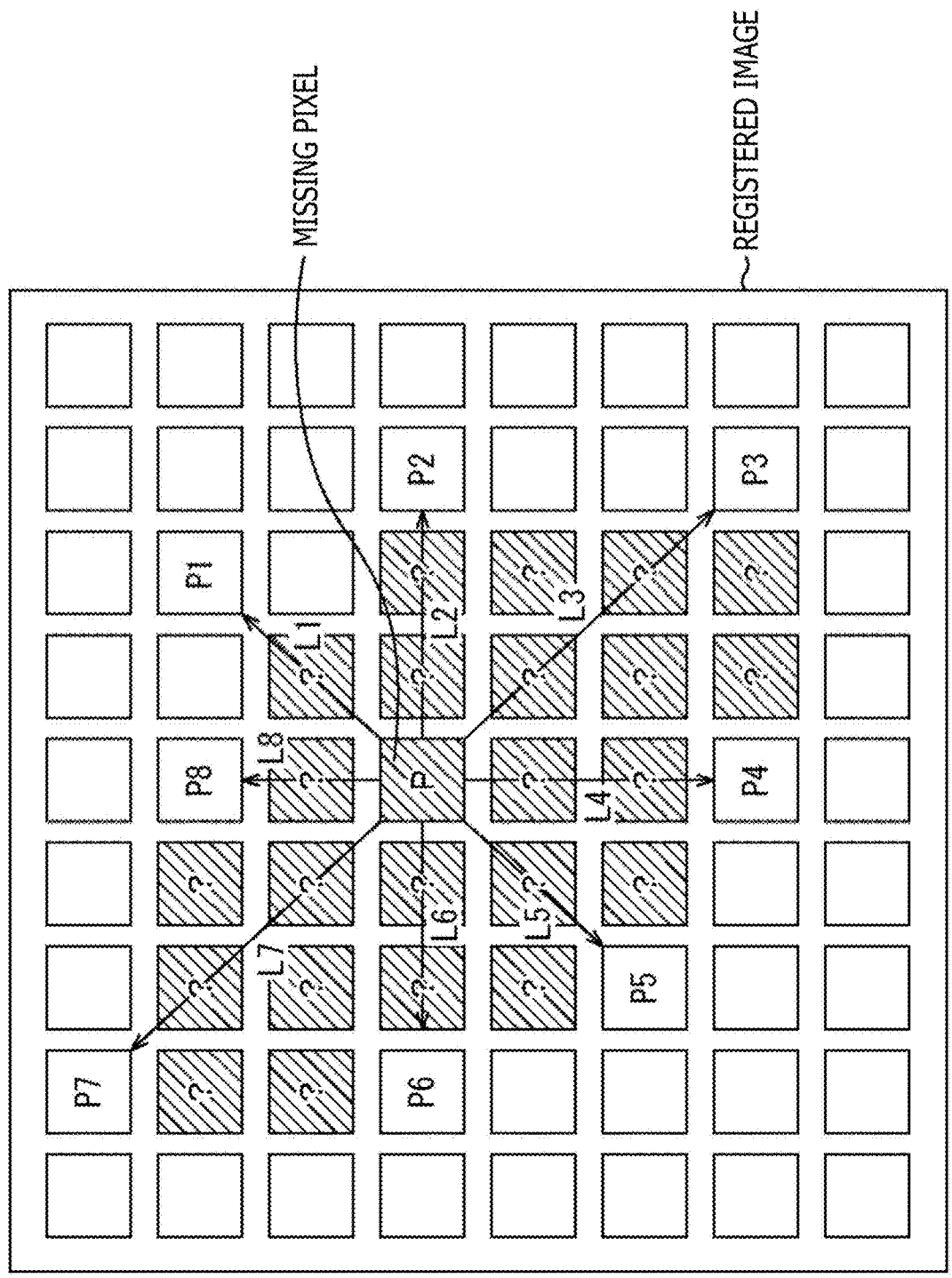
FIG. 21 is an explanatory diagram of an interpolation process by an interpolation section 53.

FIG. 21 is an explanatory diagram of the interpolation process by the interpolation section 53 (FIG. 4).

In the interpolation process, the interpolation section 53 recognizes a missing pixel in the registered image using the unconfirmed flag image. Then, the interpolation section 53 interpolates the missing pixel in the registered image using pixel values of pixels located near the missing pixel, thereby generating the obstacle-removed image at the viewpoint vp#1 as the predetermined viewpoint.

For example, when one or more non-missing pixels that are not missing pixels are present among the adjacent pixels adjacent to and located around the missing pixel, that is, the pixels adjacent on upper, lower, left, right, upper left, lower left, upper right, and lower right sides, the interpolation section 53 can determine an average value or a central value of, for example, the pixel values of the pixels that are the adjacent pixels and the non-missing pixels as a pixel value of the missing pixel.

Furthermore, for example, when the non-missing pixel is not present among the adjacent pixels adjacent to and located around the missing pixel, the interpolation section 53 can interpolate the missing pixel using, for example, pixel values of non-missing pixels present in surrounding directions of the missing pixel.

In other words, the interpolation section 53 can determine the pixel value of the missing pixel by, for example, weighted addition of the pixel values of the non-missing pixels in equiangular directions around the missing pixel.

FIG. 21 depicts an example of a method of determining the pixel value of the missing pixel by the weighted addition of the pixel values of the non-missing pixels in the equiangular directions around the missing pixel.

When the pixel value of the missing pixel is determined by the weighted addition of the pixel values of the non-missing pixels in the equiangular directions around the missing pixel, eight non-missing pixels $P_1$ to $P_8$ closest to the missing pixel P and present in, for example, eight 45-degree equiangular directions around the missing pixel P are detected as interpolation pixels used for interpolation of the missing pixel P.

In addition, a value corresponding to a distance between the missing pixel P and each interpolation pixel $P_k$ (where k=1, 2, . . . , 8) is assumed as a weight, and a weight-added value of the pixel values of the interpolation pixels $P_k$ is determined as the pixel value of the missing pixel P.

In other words, if it is assumed that the pixel values of the missing pixel P and each interpolation pixel $P_k$ are denoted by P and $P_k$, respectively, and that the distance between the missing pixel P and each interpolation pixel $P_k$ is denoted by $L_k$, the pixel value P of the missing pixel P is determined in accordance with, for example, Equation $P=(P_1/L_1+P_2/L_2+ \ldots +P_8/L_8)/(1/L_1+1/L_2+ \ldots +1/L_8)$.

It is to be noted that when the pixel value of the missing pixel is determined by the weighted addition of the pixel values of the non-missing pixels in the equiangular directions around the missing pixel, the pixels used as the interpolation pixels are not limited to the eight non-missing pixels in the equiangular directions around the missing pixel. In other words, for example, four or 16 non-missing pixels in the equiangular directions around the missing pixel can be adopted as the interpolation pixels.

It is desirable herein that the number of non-missing pixels used as the interpolation pixels is larger.

Moreover, when the pixel value of the missing pixel P has the R value, the B value, and the G value, the R value, the B value, and the G value as the pixel value of the missing pixel P are determined for respective color components.

As described above, the image processing system depicted in FIG. 1 generates the obstacle-removed image at the predetermined viewpoint by generating the after-removal photographic images by removing part of the subjects from the photographic images at the plurality of viewpoints using the disparity information generated from the photographic images, and registering the after-removal photographic images using the disparity information. The image processing system can, therefore, obtain the obstacle-removed image in which the obstacle does not appear using the disparity information.

It is to be noted that the image processing apparatus 12 in the image processing system depicted in FIG. 1 can not only generate the obstacle-removed image in which the obstacle does not appear from the plurality of photographic images as described above, but also can perform refocusing for generating an image in which an arbitrary subject such as the desired subject is brought into focus from the plurality of photographic images.

Performing refocusing at a time of generating the obstacle-removed image makes it possible to obtain the obstacle-removed image in which the desired subject is brought into focus and in which the obstacle does not appear even when the photographic images in which the desired subject is brought out of focus are picked up.

During sports watching, for example, there is no avoiding photographing subjects over a wire net. In the photographing over the wire net, the wire net is often brought into focus and desired subjects such as sports players playing sports are often brought out of focus.

In this way, even if photographic images in which the wire net is brought into focus and the desired subjects are in a so-called out-of-focus state are obtained, it is possible to obtain the obstacle-removed image in which the desired subjects are brought into focus and the wire net acting as the obstacle does not appear.

It is to be noted that part of the image processing by the image processing apparatus 12 can be performed in a server such as a cloud and remaining image processing can be performed in a user-side client.

For example, the client can transmit the photographic images at the plurality of viewpoints to the server, and the server can generate highly accurate disparity maps and provide the disparity maps to the client.

The client can set the removal area using each disparity map and transmit the removal area to the server. The server can generate the obstacle-removed image using the photographic images and the removal area from the client as well as the previously generated disparity maps, and provide the obstacle-removed image to the client.

In the client, the obstacle-removed image supplied from the server is displayed. Then, when the obstacle-removed image is not the user intended image, processing is repeated from setting of the removal area in the client.

In this case, the server performs the disparity information generation process in Step S12, the obstacle removal process in Step S14, the viewpoint transformation process in Step S15, the registration process in Step S16, and the interpolation process in Step S17 depicted in FIG. 9. The client performs the other processes (Steps S11, S13, S18, and S19) depicted in FIG. 9.

<Outline of Image Processing on Photographic Images IP1 to IP5 at Five Viewpoints Vp1 to Vp5>

Figure 22:
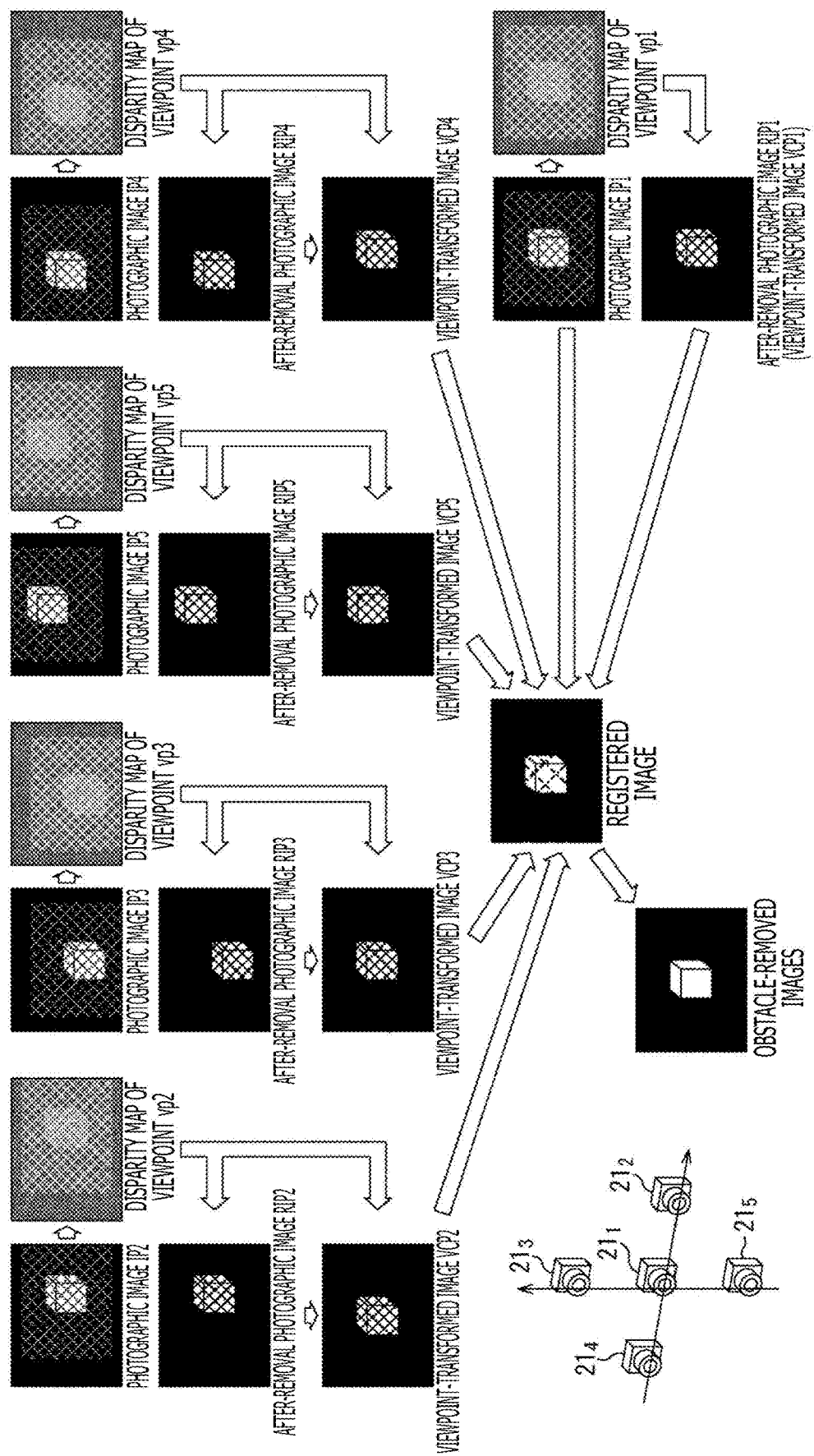
FIG. 22 is an explanatory diagram of an outline of image processing by the image processing apparatus 12 on photographic images IP1 to IP5 at five viewpoints vp1 to vp5.

FIG. 22 is an explanatory diagram of an outline of image processing by the image processing apparatus 12 on the photographic images IP1 to IP5 at five viewpoints vp1 to vp5 when the photographing apparatus 11 is configured with, for example, the five camera units $21_1$ to $21_5$ as depicted in FIG. 3, and photographs the photographic images IP1 to IP5 at the five viewpoints vp1 to vp5.

The image processing apparatus 12 generates the disparity maps for the respective photographic images IP1 to IP5.

Furthermore, the image processing apparatus 12 generates the after-removal photographic images RIP1 to RIP5 from the respective photographic images IP1 to IP5 using the disparity maps. Moreover, the image processing apparatus 12 transforms the after-removal photographic images RIP1 to RIP5 into the viewpoint-transformed images VCP1 to VCP5 viewed from, for example, the viewpoint vp1 of the photographic image IP1 as the predetermined viewpoint. When the predetermined viewpoint is the viewpoint vp1, the viewpoint-transformed image VCP1 (theoretically) coincides with the after-removal photographic image RIP1.

The image processing apparatus 12 generates the registered image by registering the viewpoint-transformed images VCP1 to VCP5, and generates the obstacle-removed image which is viewed from the viewpoint vp1 as the predetermined viewpoint and in which the obstacle does not appear by interpolating the missing pixel in the registered image.

<Outline of Image Processing on Photographic Images IP1 to IP3 at Three Viewpoints Vp1 to Vp3>

Figure 23:
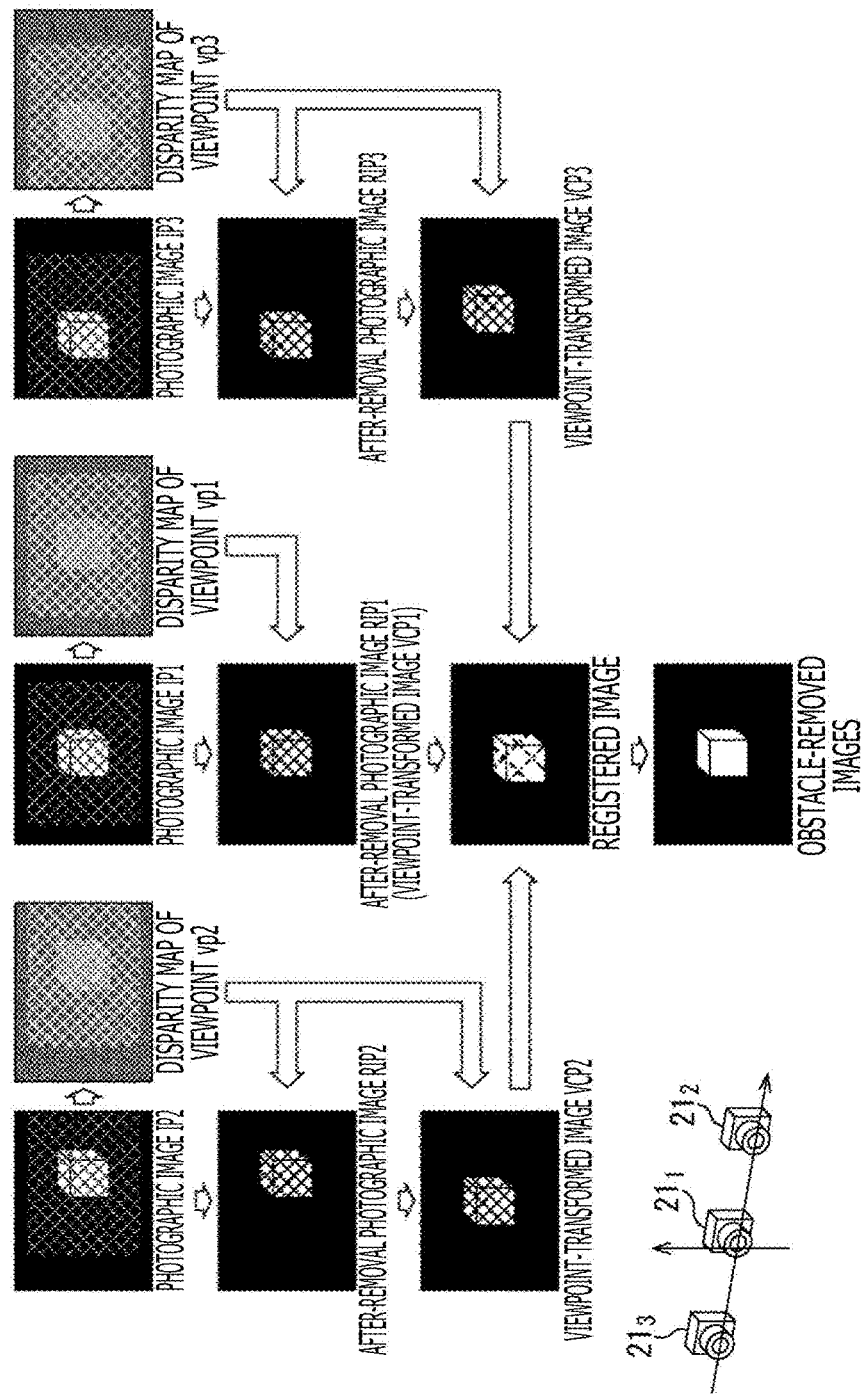
FIG. 23 is an explanatory diagram of an outline of image processing by the image processing apparatus 12 on photographic images IP1 to IP3 at three viewpoints vp1 to vp3.

FIG. 23 is an explanatory diagram of an outline of image processing by the image processing apparatus 12 on the photographic images IP1 to IP3 at three viewpoints vp1 to vp3 when the photographing apparatus 11 is configured with, for example, the three camera units $21_1$ to $21_3$ as depicted in FIG. 3, and photographs the photographic images IP1 to IP3 at the three viewpoints vp1 to vp3.

The image processing apparatus 12 generates the disparity maps for the respective photographic images IP1 to IP3.

Furthermore, the image processing apparatus 12 generates the after-removal photographic images RIP1 to RIP3 from the respective photographic images IP1 to IP3 using the disparity maps. Moreover, the image processing apparatus 12 transforms the after-removal photographic images RIP1 to RIP3 into the viewpoint-transformed images VCP1 to VCP3 viewed from, for example, the viewpoint vp1 of the photographic image IP1 as the predetermined viewpoint. Incidentally, when the predetermined viewpoint is the viewpoint vp1, the viewpoint-transformed image VCP1 coincides with the after-removal photographic image RIP1.

The image processing apparatus 12 generates the registered image by registering the viewpoint-transformed images VCP1 to VCP3, and generates the obstacle-removed image which is viewed from the viewpoint vp1 as the predetermined viewpoint and in which the obstacle does not appear by interpolating the missing pixel in the registered image.

<Explanation of Computer to which Present Technique is Applied>

Next, a series of image processing by the image processing apparatus 12 described above can be either performed by hardware or performed by software. When a series of image processing is performed by the software, a program constituting the software is installed into a general-purpose computer or the like.

Figure 24:
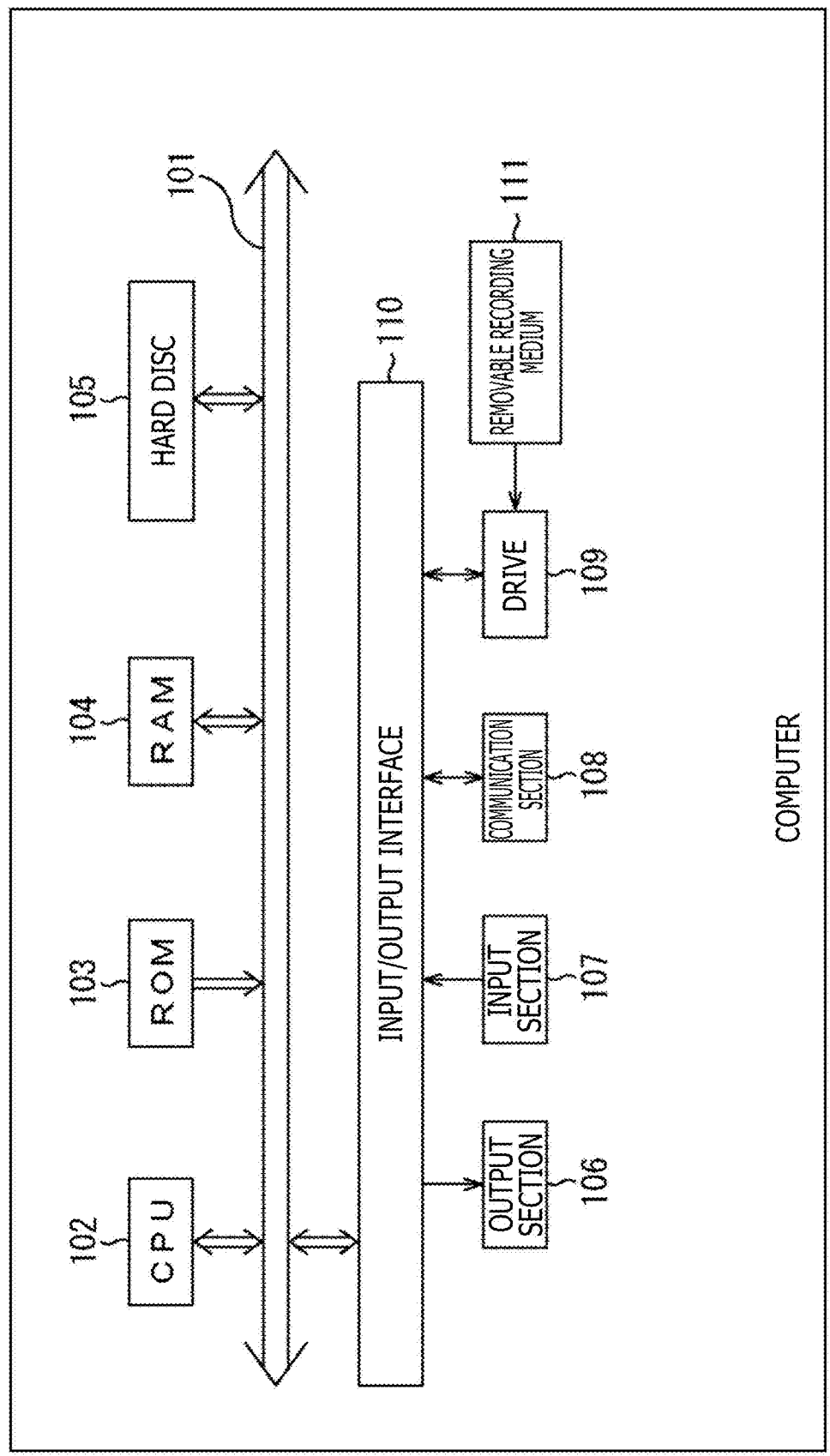
FIG. 24 is a block diagram depicting an example of a configuration of one embodiment of a computer to which the present technique is applied.

FIG. 24 is a block diagram depicting an example of a configuration of one embodiment of a computer into which a program for executing a series of processing described above is installed.

The program can be recorded in advance in a hard disc 105 or a ROM 103 serving as a recording medium built in the computer.

Alternatively, the program can be stored (recorded) in a removable recording medium 111. Such a removable recording medium 111 can be provided as so-called packaged software. Here, examples of the removable recording medium 111 include a flexible disc, a CD-ROM (Compact Disc Read Only Memory), an MO (Magneto Optical) disc, a DVD (Digital Versatile Disc), a magnetic disc, and a semiconductor memory.

It is to be noted that the program can be not only installed into the computer from the removable recording medium 111 described above, but also installed into the built-in hard disc 105 by downloading the program into the computer via a communication network or a broadcasting network. In other words, the program can be transferred to the computer from a download site, for example, wirelessly via an artificial satellite for digital satellite broadcasting, or transferred to the computer therefrom, for example, wiredly via a network such as a LAN (Local Area Network) or the Internet.

The computer incorporates a CPU (Central Processing Unit) 102, and an input/output interface 110 is connected to the CPU 102 via a bus 101.

When a command is input to the CPU 102 via the input/output interface 110 by user's operating an input section 107, the CPU 102 executes the program stored in the ROM (Read Only Memory) 103 in response to the command. Alternatively, the CPU 102 executes the program stored in the hard disc 105 upon loading the program into a RAM (Random Access Memory) 104.

The CPU 102 thereby performs processing according to the flowcharts described above or performs processing performed by the configurations of the block diagrams described above. The CPU 102 then causes processing results to be, for example, output from an output section 106 or transmitted from a communication section 108 via the input/output interface 110, or recorded in the hard disc 105 as needed.

It is to be noted that the input section 107 is configured with a keyboard, a mouse, a microphone, and the like. Furthermore, the output section 106 is configured with an LCD (Liquid Crystal Display), a loudspeaker, and the like.

<Example of Application>

The technique according to the present disclosure can be applied to various products. For example, the technique according to the present disclosure may be realized as an apparatus mounted in any type of vehicles such as a motor vehicle, an electric vehicle, a hybrid electric vehicle, and a two-wheeled vehicle.

Figure 25:
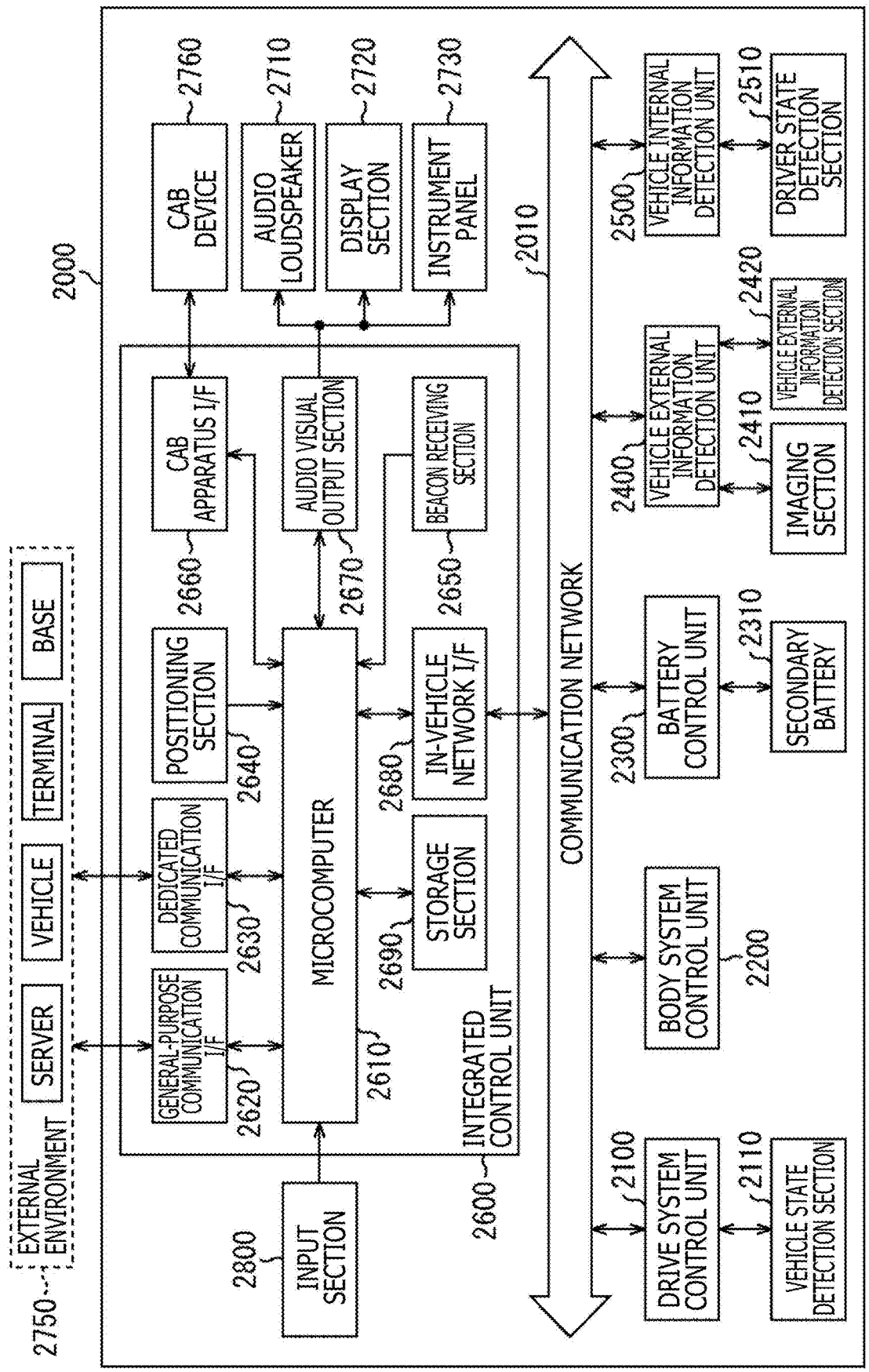
FIG. 25 is a block diagram depicting an example of a schematic configuration of a vehicle control system.

FIG. 25 is a block diagram depicting an example of a schematic configuration of a vehicle control system 2000 to which the technique according to the present disclosure can be applied. The vehicle control system 2000 includes a plurality of electronic control units connected to one another via a communication network 2010. In the example depicted in FIG. 25, the vehicle control system 2000 includes a drive system control unit 2100, a body system control unit 2200, a battery control unit 2300, a vehicle external information detection unit 2400, a vehicle internal information detection unit 2500, and an integrated control unit 2600. The communication network 2010 that connects the plurality of control units may be an in-vehicle communication network compliant with an arbitrary standard, for example, a CAN (Controller Area Network), a LIN (Local Interconnect Network), a LAN (Local Area Network) or a FlexRAY (registered trademark).

Each control unit includes a microcomputer that performs a computing process in accordance with any of various programs, a storage section that stores the program executed by the microcomputer, parameters for use in various computation, and the like, and a drive circuit that drives devices under various controls. Each control unit includes a network I/F for holding communication with the other control units via the communication network 2010, and a communication I/F for holding communication by wired communication or wireless communication with devices, sensors, or the like inside or outside of the vehicle. FIG. 25 depicts, as functional constituent elements of the integrated control unit 2600, a microcomputer 2610, a general-purpose communication I/F 2620, a dedicated communication I/F 2630, a positioning section 2640, a beacon receiving section 2650, a cab apparatus I/F 2660, an audio visual output section 2670, an in-vehicle network I/F 2680, and a storage section 2690. Likewise, the other control units each include a microcomputer, a communication I/F, a storage section, and the like.

The drive system control unit 2100 controls operations performed by apparatuses associated with a vehicle drive system in accordance with various programs. For example, the drive system control unit 2100 functions as a controller over a driving force generator such as an internal combustion engine or a driving motor for generating a driving force of the vehicle, a driving force transmission mechanism for transmitting the driving force to wheels, a steering mechanism adjusting a steering angle of the vehicle, a brake that generates a braking force of the vehicle, and the like. The drive system control unit 2100 may function as a controller over an ABS (Antilock Brake System), an ESC (Electronic Stability Control), or the like.

A vehicle state detection section 2110 is connected to the drive system control unit 2100. The vehicle state detection section 2110 includes, for example, at least one of a gyroscope that detects an angular velocity of an axial rotation motion of a vehicle body, an acceleration sensor that detects an acceleration of the vehicle, and a sensor that detects a manipulated variable of an accelerator pedal, a manipulated variable of a brake pedal, a steering angle of a steering wheel, an engine speed, a wheel rotational speed, and the like. The drive system control unit 2100 performs a computing process using a signal input from the vehicle state detection section 2110, and controls the internal combustion engine, the driving motor, an electric power steering apparatus, the brake, and the like.

The body system control unit 2200 controls operations performed by various apparatuses provided in the vehicle body in accordance with various programs. For example, the body system control unit 2200 functions as a controller over a keyless entry system, a smart key system, a power window apparatus, and various lamps such as headlamps, back lamps, brake lamps, winkers, and fog lamps. In this case, radio waves or various switch signals transmitted from a mobile machine that acts as an alternative to a key can be input to the body system control unit 2200. The body system control unit 2200 receives the input radio waves or signals and exercises control over a door lock apparatus, the power window apparatus, the lamps, and the like of the vehicle.

The battery control unit 2300 exercises control over a secondary battery 2310 that is an electric power supply source for the driving motor in accordance with various programs. For example, information such as a battery temperature, a battery output voltage, or a battery remaining capacity is input to the battery control unit 2300 from a battery apparatus including the secondary battery 2310. The battery control unit 2300 performs a computing process using these signals, and exercises temperature regulation control over the secondary battery 2310 or control over a cooling unit or the like provided in the battery apparatus.

The vehicle external information detection unit 2400 detects information associated with the outside of the vehicle that mounts the vehicle control system 2000. For example, at least one of an imaging section 2410 and a vehicle external information detection section 2420 is connected to the vehicle external information detection unit 2400. The imaging section 2410 includes at least one of a ToF (Time Of Flight) camera, a stereo camera, a monocular camera, an infrared camera, and another camera. The vehicle external information detection section 2420 includes, for example, an environmental sensor for detecting current weather or a meteorological phenomenon, or a surrounding information detection sensor for detecting another vehicle, an obstacle, a pedestrian, or the like surrounding the vehicle that mounts the vehicle control system 2000.

The environmental sensor may be at least one of, for example, a raindrop sensor that detects rainy weather, a fog sensor that detects a fog, a sunlight sensor that detects a degree of sunlight, and a snow sensor that detects snow weather. The surrounding information detection sensor may be at least one of an ultrasonic sensor, a radar apparatus, and an LIDAR (Light Detection and Ranging, Laser Imaging Detection and Ranging) apparatus. The imaging section 2410 and the vehicle external information detection section 2420 may be provided either as sensors or apparatuses independent of each other or as an apparatus obtained by integrating a plurality of sensors or apparatuses.

Figure 26:
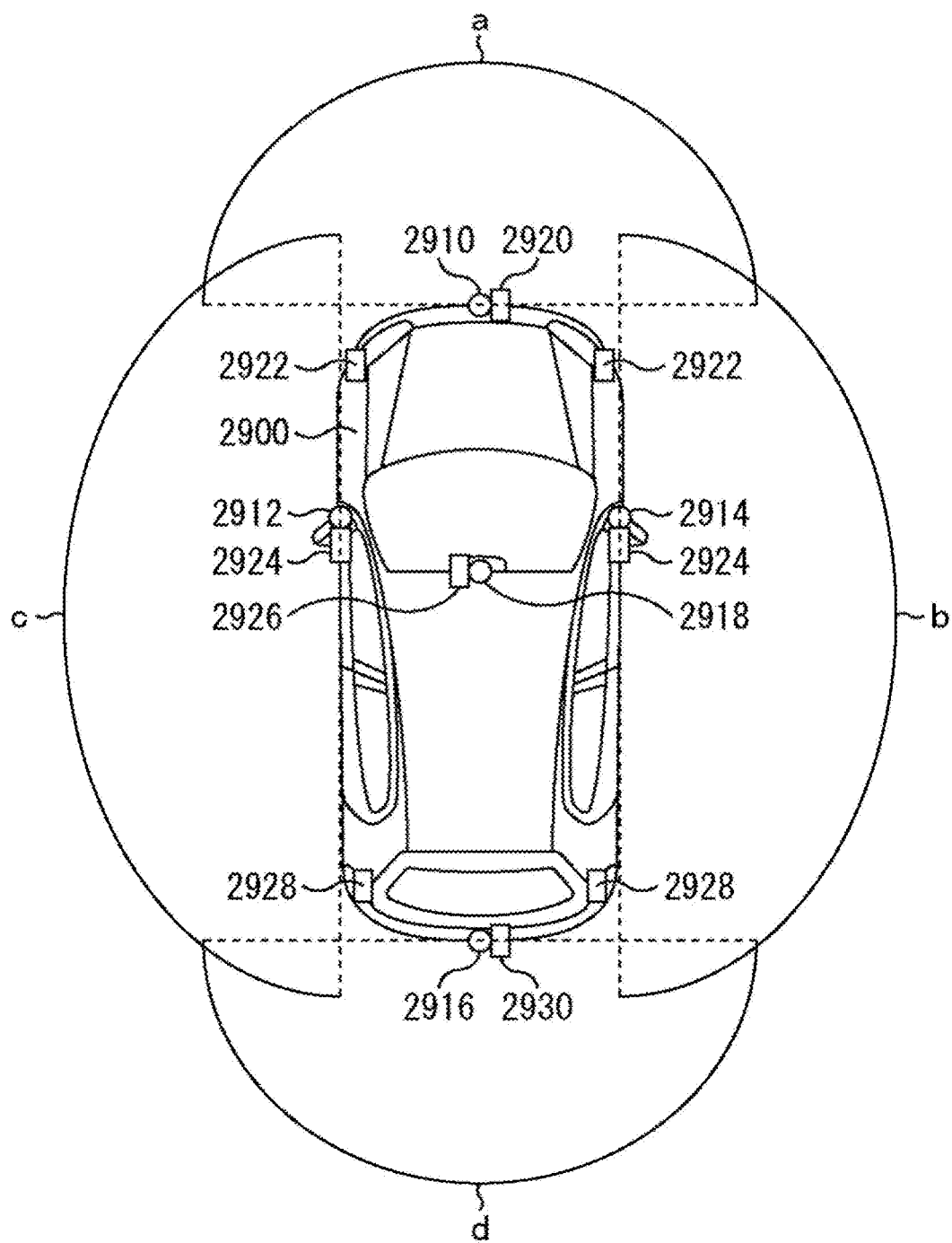
FIG. 26 is an explanatory diagram depicting an example of installation positions of a vehicle external information detection section and an imaging section.

Here, FIG. 26 illustrates an example of installation positions of the imaging section 2410 and the vehicle external information detection section 2420. An imaging section 2910, 2912, 2914, 2916, or 2918 is provided at a position that is at least one of, for example, a front nose, a sideview mirror, a rear bumper, a back door, and an upper portion of a cab windshield of a vehicle 2900. The imaging section 2910 provided on the front nose and the imaging section 2918 provided in the upper portion of the cab windshield mainly acquire front images of the vehicle 2900. The imaging sections 2912 and 2914 provided on the sideview mirrors mainly acquire side images of the vehicle 2900. The imaging section 2916 provided on the rear bumper or the back door mainly acquires a rear image of the vehicle 2900. The imaging section 2918 provided in the upper portion of the cab windshield is mainly used to detect a preceding vehicle, a pedestrian, an obstacle, a traffic light, a traffic sign, a traffic lane, or the like.

It is to be noted that FIG. 26 depicts examples of imaging ranges of the respective imaging sections 2910, 2912, 2914, and 2916. An imaging range a denotes the imaging range of the imaging section 2910 provided on the front nose, imaging ranges b and c denote the imaging ranges of the imaging sections 2912 and 2914 provided on the sideview mirrors, respectively, and an imaging range d denotes the imaging range of the imaging section 2916 provided on the rear bumper or the back door. For example, image data picked up by the imaging sections 2910, 2912, 2914, and 2916 is registered, thereby obtaining a bird's-eye view image of the vehicle 2900 viewed from above.

Vehicle external information detection sections 2920, 2922, 2924, 2926, 2928, and 2930 provided in any of a front portion, a rear portion, a side portion, a corner, and the upper portion of the cab windshield of the vehicle 2900 may be, for example, ultrasonic sensors or radar apparatuses. The vehicle external information detection sections 2920, 2926, and 2930 provided on any of the front nose, the rear bumper, the back door, and the upper portion of the cab windshield of the vehicle 2900 may be, for example, LIDAR apparatuses. These vehicle external information detection sections 2920 to 2930 are used mainly to detect a preceding vehicle, a pedestrian, an obstacle or the like.

Reference is made back to FIG. 25, and explanation will be continued. The vehicle external information detection unit 2400 causes the imaging section 2410 to pick up a vehicle external image and receives picked-up image data. The vehicle external information detection unit 2400 also receives detection information from the vehicle external information detection section 2420 connected thereto. If the vehicle external information detection section 2420 is the ultrasonic sensor, the radar apparatus, or the LIDAR apparatus, the vehicle external information detection unit 2400 causes the vehicle external information detection section 2420 to transmit an ultrasonic wave, an electromagnetic wave or the like and receives information associated with a received reflected wave. The vehicle external information detection unit 2400 may perform an object detection process or a distance detection process on a person, a vehicle, an obstacle, a sign, a character on a road surface, or the like on the basis of the received information. The vehicle external information detection unit 2400 may perform an environment recognition process for recognizing rainy weather, a fog, a road surface condition, or the like on the basis of the received information. The vehicle external information detection unit 2400 may calculate a distance to a vehicle external object on the basis of the received information.

Furthermore, the vehicle external information detection unit 2400 may perform an image recognition process or the distance detection process for recognizing a person, a vehicle, an obstacle, a sign, a character on the road surface, or the like on the basis of the received image data. The vehicle external information detection unit 2400 may perform a process such as a distortion correction or positioning on the received image data, and synthesize image data picked up by the different imaging sections 2410 to generate a bird's-eye view image or a panorama image. The vehicle external information detection unit 2400 may perform a viewpoint transformation process using the image data picked up by the different imaging sections 2410.

The vehicle internal information detection unit 2500 detects vehicle internal information. For example, a driver state detection section 2510 detecting a driver state is connected to the vehicle internal information detection unit 2500. The driver state detection section 2510 may include a camera that images a driver, a biological sensor that detects biological information associated with the driver, a microphone that collects sound in a cabin, or the like. The biological sensor is provided on, for example, a seat surface or the steering wheel, and detects biological information associated with a passenger seated on the seat or the driver who grips the steering wheel. The vehicle internal information detection unit 2500 may calculate a degree of fatigue or a degree of concentration of the driver or discriminate whether or not the driver is dozing off on the basis of the detection information input from the driver state detection section 2510. The vehicle internal information detection unit 2500 may perform a process such as a noise cancelling process on a collected audio signal.

The integrated control unit 2600 exercises control over entire operations in the vehicle control system 2000 in accordance with various programs. An input section 2800 is connected to the integrated control unit 2600. The input section 2800 is realized by an apparatus, for example, a touch panel, a button, a microphone, a switch, or a lever, on which a passenger can perform an input operation. The input section 2800 may be, for example, a remote controller that uses an infrared ray or another radio wave, or may be an external connection apparatus such as a cellular telephone or a PDA (Personal Digital Assistant) corresponding to operation on the vehicle control system 2000. The input section 2800 may be, for example, a camera, and in this case, the passenger can input information by a gesture. Furthermore, the input section 2800 may include an input control circuit or the like that generates an input signal on the basis of information input by the passenger or the like using the abovementioned input section 2800 and that outputs the input signal to the integrated control unit 2600. The passenger or the like inputs various data to the vehicle control system 2000 or instructs the vehicle control system 2000 to perform a processing operation by operating this input section 2800.

The storage section 2690 may include a RAM (Random Access Memory) that stores various programs executed by the microcomputer and a ROM (Read Only Memory) that stores various parameters, computing results, sensor values, and the like. Furthermore, the storage section 2690 may be realized by a magnetic storage device, a semiconductor storage device, an optical storage device, a magneto-optical storage device, or the like such as an HDD (Hard Disc Drive).

The general-purpose communication I/F 2620 is a general-purpose communication I/F that intermediates in communication with various apparatuses present in an external environment 2750. The general-purpose communication I/F 2620 may implement a cellular communication protocol such as GSM (registered trademark) (Global System of Mobile communications), WiMAX, LTE (Long Term Evolution) or LTE-A (LTE-Advanced), or the other wireless communication protocol such as a wireless LAN (also referred to as "Wi-Fi (registered trademark)"). The general-purpose communication I/F 2620 may be connected to an apparatus (for example, an application server or a control server) present on an external network (for example, the Internet, a cloud network, or an operator specific network) via a base station or an access point, for example. Moreover, the general-purpose communication I/F 2620 may be connected to a terminal (for example, a terminal of a pedestrian or of a shop, or an MTC (Machine Type Communication) terminal) present near the vehicle using, for example, P2P (Peer To Peer) technology.

The dedicated communication I/F 2630 is a communication I/F that supports a communication protocol developed for use in the vehicle. The dedicated communication I/F 2630 may implement a standard protocol such as WAVE (Wireless Access in Vehicle Environment) that is a combination between a lower layer that is IEEE802.11p and an upper layer that is IEEE1609, or DSRC (Dedicated Short Range Communications). The dedicated communication I/F 2630 typically carries out V2X communication that is a concept including one or more of V2V (Vehicle to Vehicle) communication, V2I (Vehicle to Infrastructure) communication, and V2P (Vehicle to Pedestrian) communication.

The positioning section 2640 receives, for example, a GNSS (Global Navigation Satellite System) signal from a GNSS satellite (for example, a GPS (Global Positioning System) signal from a GPS satellite) to execute positioning, and generates position information including a latitude, a longitude, and an altitude of the vehicle. It is to be noted that the positioning section 2640 may locate a current position by signal exchange with the wireless access point or acquire the position information from a terminal having a positioning function such as a cellular telephone, a PHS, or a smartphone.

The beacon receiving section 2650 receives radio waves or electromagnetic waves transmitted from, for example, wireless stations installed on a road, and acquires information such as a current position, traffic congestion, suspension of traffic, or required time. It is to be noted that functions of the beacon receiving section 2650 may be included in the dedicated communication I/F 2630 described above.

The cab apparatus I/F 2660 is a communication interface that intermediates in connection between the microcomputer 2610 and various apparatuses present in the cabin. The cab apparatus I/F 2660 may establish wireless connection using a wireless communication protocol such as wireless LAN, Bluetooth (registered trademark), NFC (Near Field Communication) or WUSB (Wireless USB). Moreover, the cab apparatus I/F 2660 may establish wired connection via a connection terminal (as well as a cable if necessary) that is not depicted. The cab apparatus I/F 2660 exchanges control signals or data signals with, for example, a mobile apparatus or a wearable apparatus owned by the passenger, or an information apparatus loaded into or attached to the vehicle.

The in-vehicle network I/F 2680 is an interface that intermediates in communication between the microcomputer 2610 and the communication network 2010. The in-vehicle network I/F 2680 transmits and receives signals and the like in accordance with a predetermined protocol supported by the communication network 2010.

The microcomputer 2610 in the integrated control unit 2600 controls the vehicle control system 2000 in accordance with various programs on the basis of information acquired via at least one of the general-purpose communication I/F 2620, the dedicated communication I/F 2630, the positioning section 2640, the beacon receiving section 2650, the cab apparatus I/F 2660, and the in-vehicle network I/F 2680. For example, the microcomputer 2610 may compute a control target value for the driving force generator, the steering mechanism, or the brake on the basis of the acquired vehicle internal/external information, and output a control command to the drive system control unit 2100. For example, the microcomputer 2610 may exercise cooperative control for the purpose of vehicle collision avoidance or impact mitigation, and following travelling, vehicle speed maintaining travelling, automatic driving or the like based on an inter-vehicle distance.

The microcomputer 2610 may generate local map information including surrounding information associated with the current position of the vehicle, on the basis of the information acquired via at least one of the general-purpose communication I/F 2620, the dedicated communication I/F 2630, the positioning section 2640, the beacon receiving section 2650, the cab apparatus I/F 2660, and the in-vehicle network I/F 2680. Moreover, the microcomputer 2610 may predict a hazard such as a vehicle collision, coming close by a pedestrian or the like, or approach into a blocked road on the basis of acquired information and generate a warning signal. The warning signal may be, for example, a signal for producing a warning tone or turning on a warning lamp.

The audio visual output section 2670 transmits an output signal that is at least one of an audio signal and an image signal to an output apparatus that can visually or auditorily notify the passenger of the vehicle or outside of the vehicle of information. In the example of FIG. 25, an audio loudspeaker 2710, a display section 2720, and an instrument panel 2730 are exemplarily depicted as the output apparatuses. The display section 2720 may include at least one of, for example, an on-board display and a head-up display. The display section 2720 may have an AR (Augmented Reality) display function. The output apparatus may be an apparatus such as a headphone, a projector, or a lamp other than these apparatuses. If the output apparatus is a display apparatus, the display apparatus visually displays results obtained by various processes performed by the microcomputer 2610 or the information received from the other control units in various forms such as text, images, tables, and graphs. Moreover, if the output apparatus is an audio output apparatus, the audio output apparatus converts an audio signal configured with reproduced audio data, acoustic data or the like into an analog signal, and auditorily outputs the analog signal.

Incidentally, in the example depicted in FIG. 25, at least two control units connected to each other via the communication network 2010 may be integrated into one control unit. Alternatively, the individual control units may be each configured with a plurality of control units. In another alternative, the vehicle control system 2000 may include another control unit that is not depicted. Furthermore, in the explanation above, a part of or all of the functions assumed by any of the control units may be taken on by another control unit. In other words, as long as information is transmitted and received via the communication network 2010, a predetermined computing process may be performed by any of the control units. Likewise, the sensor or the apparatus connected to any of the control units may be connected to the other control units, and a plurality of control units may transmit and receive detection information to/from one another via the communication network 2010.

In the vehicle control system 2000 described so far, the photographing apparatus 11 depicted in FIG. 1 can be applied to, for example, the imaging section 2410 depicted in FIG. 25. Furthermore, the image processing apparatus 12 depicted in FIG. 1 can be applied to, for example, the vehicle external information detection unit 2400 depicted in FIG. 25. Moreover, the display apparatus 13 depicted in FIG. 1 can be applied to, for example, the display section 2720 depicted in FIG. 25.

When the photographing apparatus 11 depicted in FIG. 11 is applied to the imaging section 2410 depicted in FIG. 25, for example, the photographing apparatus 11 can be installed as the imaging section 2918 provided in the upper portion of the cab windshield depicted in FIG. 26.

In this case, the photographing section 2918 serving as the photographing apparatus 11 often pick up an image, such as the image img3 depicted in FIG. 5, in which the street scene appears over the glass (windshield) onto which raindrops are attached.

The vehicle external information detection unit 2400 serving as the image processing apparatus 12 can generate the obstacle-removed image in which the raindrops acting as the obstacle do not appear, from the image, such as the image img3, in which the street scene appears over the glass onto which the raindrops are attached.

Therefore, when the photographing section 2918 serving as the photographing apparatus 11 and the vehicle external information detection unit 2400 serving as the image processing apparatus 12 are applied to, for example, a drive recorder, it is possible to record the obstacle-removed image in which the obstacle does not appear.

It is to be noted herein that the processes performed by the computer in accordance with the program in the present specification are not necessarily performed in time series in the orders described as the flowcharts. In other words, the processes performed by the computer in accordance with the program include processes executed either in parallel or independently (for example, parallel processes or object-oriented processes).

Moreover, the program may be processed by one computer (processor) or may be processed by a plurality of computers in a decentralized fashion. Furthermore, the program may be transferred to a distant computer and executed by the distant computer.

Furthermore, a system means in the present specification a collection of a plurality of constituent elements (apparatuses, modules (components), and the like), regardless of whether or not all the constituent elements are provided in the same casing. Therefore, a plurality of apparatuses accommodated in different casings and connected to one another via a network and one apparatus in which a plurality of modules are accommodated in one casing can be both referred to as "system."

Moreover, the embodiments of the present technique are not limited to the embodiment described above and various changes and modifications can be made without departing from the spirit of the present technique.

For example, the present technique can have a cloud computing configuration for causing a plurality of apparatuses to process one function in a sharing or cooperative fashion via a network.

Furthermore, each step described in the above flowcharts can be not only executed by one apparatus but also executed by a plurality of apparatuses in a sharing fashion.

Moreover, when one step includes a plurality of processes, the plurality of processes included in the one step can be not only executed by one apparatus but also executed by a plurality of apparatuses in a sharing fashion.

Furthermore, the effects described in the present specification are given as an example only, and the effects are not limited to those described in the present specification and may contain other effects.

It is to be noted that the present technique can be configured as follows.

<1> An image processing apparatus including:
a removal section that generates after-removal photographic images at a plurality of viewpoints by removing part of subjects from respective photographic images at the plurality of viewpoints using disparity information associated with the photographic images at the plurality of viewpoints; and
an image generation section that generates an obstacle-removed image at a predetermined viewpoint by registering the after-removal photographic images at the plurality of viewpoints generated by the removal section using the disparity information.

<2> The image processing apparatus according to <1>, further including:
a disparity information generation section that generates the disparity information using the photographic images at the plurality of viewpoints, the plurality of viewpoints being equal to or more than three viewpoints.

<3> The image processing apparatus according to <1> or <2>, in which
the removal section removes a pixel in each of the photographic images as a pixel in which an obstacle that is the part of the subjects appears, the pixel in each of the photographic images corresponding to a real space point within a removal area, in which the obstacle is present, in a real space in which the photographic images are photographed among real space points in the real space.

<4> The image processing apparatus according to <3>, further including:
a removal area setting section that sets the removal area.

<5> The image processing apparatus according to <4>, in which
the removal area setting section sets a predetermined two-dimensional plane in the real space to the removal area.

<6> The image processing apparatus according to <5>, in which
the removal area setting section sets a two-dimensional plane serving as the removal area in response to user's operation.

<7> The image processing apparatus according to <6>, further including:
a control section that exercises control to display the removal area as well as the photographic images or the disparity information.

<8> The image processing apparatus according to <5>, in which
the removal area setting section sets the predetermined two-dimensional plane to the removal area using the disparity information.

<9> The image processing apparatus according to <8>, in which
the removal area setting section sets a two-dimensional plane that encompasses a subject located on a most front side and distributed in a planar shape in the real space to the removal area using the disparity information.

<10> The image processing apparatus according to <8>, in which
the removal area setting section sets a two-dimensional plane obtained by main component analysis performed on the real space point corresponding to the pixel in each of the photographic images to the removal area using the disparity information.

<11> The image processing apparatus according to <4>, in which
the removal area setting section sets the real space point corresponding to a pixel similar to a pixel designated by a user in pixel value or disparity information in each of the photographic images to the removal area.

<12> The image processing apparatus according to any one of <1> to <11>, in which
the image generation section generates the obstacle-removed image by registering viewpoint-transformed images obtained by viewing the respective after-removal photographic images at the plurality of viewpoints from the predetermined viewpoint.

<13> The image processing apparatus according to <12>, in which
the image generation section transforms the after-removal photographic images at the plurality of viewpoints into the respective viewpoint-transformed images viewed from the predetermined viewpoint using the disparity information.

<14> The image processing apparatus according to <12>, in which
the image generation section determines, in registration of registering the viewpoint-transformed images into which the respective after-removal photographic images at the plurality of viewpoints are transformed, a pixel value in the obstacle-removed image using pixel values of one or more pixels in the viewpoint-transformed images into which the respective after-removal photographic images at the plurality of viewpoints are transformed.

<15> The image processing apparatus according to <14>, in which the image generation section determines, in the registration, the pixel value closest to a center of gravity of the pixel values of the one or more pixels in the viewpoint-transformed images into which the respective after-removal photographic images at the plurality of viewpoints are transformed, as the pixel value in the obstacle-removed image among the pixel values of the one or more pixels.

<16> The image processing apparatus according to <14>, in which the image generation section determines, in the registration, the pixel value closest to a center of gravity of remaining pixel values that are the pixel values of the one or more pixels in the viewpoint-transformed images into which the respective after-removal photographic images at the plurality of viewpoints are transformed except for the pixel value farthest from the center of gravity of the pixel values of the one or more pixels, as the pixel value in the obstacle-removed image among the remaining pixel values.

<17> The image processing apparatus according to any one of <12> to <16>, in which the image generation section generates the obstacle-removed image by interpolating a missing pixel having no pixel value in a registered image that is obtained by registering the viewpoint-transformed images into which the respective after-removal photographic images at the plurality of viewpoints are transformed, using pixel values of pixels near the missing pixel.

<18> The image processing apparatus according to <17>, in which the image generation section interpolates the missing pixel using pixel values of non-missing pixels that are among adjacent pixels adjacent to the missing pixel and that are not the missing pixel, in interpolation of the missing pixel.

<19> The image processing apparatus according to <17>, in which the image generation section interpolates the missing pixel using pixel values of non-missing pixels that are in equiangular directions around the missing pixel and that are not the missing pixel, in interpolation of the missing pixel.

<20> An image processing method including:

generating after-removal photographic images at a plurality of viewpoints by removing part of subjects from respective photographic images at the plurality of viewpoints using disparity information associated with the photographic images at the plurality of viewpoints; and generating an obstacle-removed image at a predetermined viewpoint by registering the after-removal photographic images at the plurality of viewpoints using the disparity information.

REFERENCE SIGNS LIST

11: Photographing apparatus
12: Image processing apparatus
13: Display apparatus
$21_1$ to $21_7$: Camera unit
31: Disparity information generation section
32: Obstacle-removed image generation section
33: Control section
41: Removal area setting section
42: Removal section
43: Image generation section
51: Viewpoint transformation section
52: Registration section
53: Interpolation section
101: Bus
102: CPU
103: ROM
104: RAM
105: Hard disc
106: Output section
107: Input section
108: Communication section
109: Drive
110: Input/output interface
111: Removable recording medium

The invention claimed is:

1. An image processing apparatus comprising:
a removal section that generates after-removal photographic images at a plurality of viewpoints by removing part of subjects from respective photographic images at the plurality of viewpoints using disparity information associated with the photographic images at the plurality of viewpoints, wherein the removal section removes a pixel in each of the photographic images as a pixel in which an obstacle that is the part of the subjects appears, the pixel in each of the photographic images corresponding to a real space point within a removal area, in which the obstacle is present, in a real space in which the photographic images are photographed among real space points in the real space;
an image generation section that generates an obstacle-removed image at a predetermined viewpoint by registering the after-removal photographic images at the plurality of viewpoints generated by the removal section using the disparity information; and
a removal area setting section that sets the removal area,
wherein the removal area setting section sets a predetermined two-dimensional plane in the real space to the removal area, and
wherein the removal section, the image generation section, and the removal area setting section are each implemented via at least one processor.

2. The image processing apparatus according to claim 1, further comprising:
a disparity information generation section that generates the disparity information using the photographic images at the plurality of viewpoints, the plurality of viewpoints being equal to or more than three viewpoints,
wherein the disparity information generation section is implemented via at least one processor.

3. The image processing apparatus according to claim 1, wherein
the removal area setting section sets a two-dimensional plane serving as the removal area in response to user's operation.

4. The image processing apparatus according to claim 3, further comprising:
a control section that exercises control to display the removal area as well as the photographic images or the disparity information,
wherein the control section is implemented via at least one processor.

5. The image processing apparatus according to claim 1, wherein the removal area setting section sets the predetermined two-dimensional plane to the removal area using the disparity information.

6. The image processing apparatus according to claim 5, wherein
the removal area setting section sets a two-dimensional plane that encompasses a subject located on a most front side and distributed in a planar shape in the real space to the removal area using the disparity information.

7. The image processing apparatus according to claim 5, wherein
the removal area setting section sets a two-dimensional plane obtained by main component analysis performed on the real space point corresponding to the pixel in each of the photographic images to the removal area using the disparity information.

8. The image processing apparatus according to claim 1, wherein
the removal area setting section sets the real space point corresponding to a pixel similar to a pixel designated by a user in pixel value or disparity information in each of the photographic images to the removal area.

9. The image processing apparatus according to claim 1, wherein
the image generation section generates the obstacle-removed image by registering viewpoint-transformed images obtained by viewing the respective after-removal photographic images at the plurality of viewpoints from the predetermined viewpoint.

10. The image processing apparatus according to claim 9, wherein
the image generation section transforms the after-removal photographic images at the plurality of viewpoints into the respective viewpoint-transformed images viewed from the predetermined viewpoint using the disparity information.

11. The image processing apparatus according to claim 9, wherein
the image generation section determines, in registration of registering the viewpoint-transformed images into which the respective after-removal photographic images at the plurality of viewpoints are transformed, a pixel value in the obstacle-removed image using pixel values of one or more pixels in the viewpoint-transformed images into which the respective after-removal photographic images at the plurality of viewpoints are transformed.

12. An image processing apparatus comprising:
a removal section that generates after-removal photographic images at a plurality of viewpoints by removing part of subjects from respective photographic images at the plurality of viewpoints using disparity information associated with the photographic images at the plurality of viewpoints; and
an image generation section that generates an obstacle-removed image at a predetermined viewpoint by registering the after-removal photographic images at the plurality of viewpoints generated by the removal section using the disparity information,
wherein the image generation section generates the obstacle-removed image by registering viewpoint-transformed images obtained by viewing the respective after-removal photographic images at the plurality of viewpoints from the predetermined viewpoint,
wherein the image generation section determines, in registration of registering the viewpoint-transformed images into which the respective after-removal photographic images at the plurality of viewpoints are transformed, a pixel value in the obstacle-removed image using pixel values of one or more pixels in the viewpoint-transformed images into which the respective after-removal photographic images at the plurality of viewpoints are transformed,
wherein the image generation section determines, in the registration, the pixel value closest to a center of gravity of the pixel values of the one or more pixels in the viewpoint-transformed images into which the respective after-removal photographic images at the plurality of viewpoints are transformed, as the pixel value in the obstacle-removed image among the pixel values of the one or more pixels, and
wherein the removal section and the image generation section are each implemented via at least one processor.

13. An image processing apparatus comprising:
a removal section that generates after-removal photographic images at a plurality of viewpoints by removing part of subjects from respective photographic images at the plurality of viewpoints using disparity information associated with the photographic images at the plurality of viewpoints; and
an image generation section that generates an obstacle-removed image at a predetermined viewpoint by registering the after-removal photographic images at the plurality of viewpoints generated by the removal section using the disparity information,
wherein the image generation section generates the obstacle-removed image by registering viewpoint-transformed images obtained by viewing the respective after-removal photographic images at the plurality of viewpoints from the predetermined viewpoint,
wherein the image generation section determines, in registration of registering the viewpoint-transformed images into which the respective after-removal photographic images at the plurality of viewpoints are transformed, a pixel value in the obstacle-removed image using pixel values of one or more pixels in the viewpoint-transformed images into which the respective after-removal photographic images at the plurality of viewpoints are transformed,
wherein the image generation section determines, in the registration, the pixel value closest to a center of gravity of remaining pixel values that are the pixel values of the one or more pixels in the viewpoint-transformed images into which the respective after-removal photographic images at the plurality of viewpoints are transformed except for the pixel value farthest from the center of gravity of the pixel values of the one or more pixels, as the pixel value in the obstacle-removed image among the remaining pixel values, and
wherein the removal section and the image generation section are each implemented via at least one processor.

14. An image processing apparatus comprising:
a removal section that generates after-removal photographic images at a plurality of viewpoints by removing part of subjects from respective photographic images at the plurality of viewpoints using disparity information associated with the photographic images at the plurality of viewpoints; and
an image generation section that generates an obstacle-removed image at a predetermined viewpoint by registering the after-removal photographic images at the plurality of viewpoints generated by the removal section using the disparity information, wherein the image generation section generates the obstacle-removed image by registering viewpoint-transformed images obtained by viewing the respective after-removal photographic images at the plurality of viewpoints from the predetermined viewpoint, wherein the image generation section generates the obstacle-removed image by interpolating a missing pixel having no pixel value in a registered image that is obtained by registering the viewpoint-transformed images into which the respective after-removal photographic images at the plurality of viewpoints are transformed, using pixel values of pixels near the missing pixel, and wherein the removal section and the image generation section are each implemented via at least one processor.

15. The image processing apparatus according to claim 14, wherein the image generation section interpolates the missing pixel using pixel values of non-missing pixels that are among adjacent pixels adjacent to the missing pixel and that are not the missing pixel, in interpolation of the missing pixel.

16. The image processing apparatus according to claim 14, wherein the image generation section interpolates the missing pixel using pixel values of non-missing pixels that are in equiangular directions around the missing pixel and that are not the missing pixel, in interpolation of the missing pixel.

17. An image processing method comprising:

setting a removal area;

generating after-removal photographic images at a plurality of viewpoints by removing part of subjects from respective photographic images at the plurality of viewpoints using disparity information associated with the photographic images at the plurality of viewpoints, wherein a pixel in each of the photographic images is removed as a pixel in which an obstacle that is the part of the subjects appears, the pixel in each of the photographic images corresponding to a real space point within the set removal area, in which the obstacle is present, in a real space in which the photographic images are photographed among real space points in the real space; and generating an obstacle-removed image at a predetermined viewpoint by registering the after-removal photographic images at the plurality of viewpoints using the disparity information, wherein a predetermined two-dimensional plane in the real space is set to the removal area.

18. An image processing method comprising:

generating after-removal photographic images at a plurality of viewpoints by removing part of subjects from respective photographic images at the plurality of viewpoints using disparity information associated with the photographic images at the plurality of viewpoints; and generating an obstacle-removed image at a predetermined viewpoint by registering the after-removal photographic images at the plurality of viewpoints using the disparity information, wherein the obstacle-removed image is generated further by registering viewpoint-transformed images obtained by viewing the respective after-removal photographic images at the plurality of viewpoints from the predetermined viewpoint, and wherein the obstacle-removed image is generated further by interpolating a missing pixel having no pixel value in a registered image that is obtained by registering the viewpoint-transformed images into which the respective after-removal photographic images at the plurality of viewpoints are transformed, using pixel values of pixels near the missing pixel.

* * * * *